United States Patent
Smith et al.

(10) Patent No.: US 12,493,740 B2
(45) Date of Patent: Dec. 9, 2025

(54) GENERATIVE COLLABORATIVE PUBLISHING SYSTEM

(71) Applicant: Microsoft Technology Licensing, LLC, Redmond, WA (US)

(72) Inventors: Alana M. Smith, New York, NY (US); Lakshman Somasundaram, San Francisco, CA (US); Saarth Shah, Hoboken, NJ (US); Laura Lorenzetti Soper, Hoboken, NJ (US); Adam Kaplan, Brooklyn, NY (US); Manas Somaiya, Sunnyvale, CA (US); Yao Pan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 18/169,786

(22) Filed: Feb. 15, 2023

(65) Prior Publication Data
US 2024/0273291 A1    Aug. 15, 2024

(51) Int. Cl.
*G06F 40/279*    (2020.01)
*G06F 16/383*    (2019.01)

(52) U.S. Cl.
CPC .......... *G06F 40/279* (2020.01); *G06F 16/383* (2019.01)

(58) Field of Classification Search
CPC ............................ G06F 40/279; G06F 16/383
See application file for complete search history.

(56) References Cited

U.S. PATENT DOCUMENTS

| | | |
|---|---|---|
| 6,091,930 A | 7/2000 | Mortimer et al. |
| 10,073,923 B2 | 9/2018 | Koren |
| 10,146,419 B2 | 12/2018 | Geva |
| 10,467,336 B2 | 11/2019 | Romney |

(Continued)

FOREIGN PATENT DOCUMENTS

| | | | | |
|---|---|---|---|---|
| CN | 118468868 A | * | 8/2024 | ........... G06F 40/216 |
| WO | 2014134571 A1 | | 9/2014 | |

(Continued)

OTHER PUBLICATIONS

Notice of Allowance mailed on May 3, 2024, in U.S. Appl. No. 18/169,808, 09 pages.

(Continued)

*Primary Examiner* — Mohammad K Islam
(74) *Attorney, Agent, or Firm* — Nicholson De Vos Webster & Elliott LLP

(57) ABSTRACT

Embodiments of the disclosed technologies include, in response to input of a first prompt to a generative language model, outputting, by the generative language model, a first document including a first piece of writing, where the first piece of writing is based on the first prompt. Feedback is received for the first document, where the feedback includes a rating for the first piece of writing. Using the generative language model, a second prompt different from the first prompt is generated, where the second prompt is based on the feedback. In response to input of the second prompt to the generative language model, the generative language model outputs a second document different from the first document, where the second document includes a second piece of writing based on the second prompt. The second document is published to a network.

20 Claims, 23 Drawing Sheets

(56) References Cited

U.S. PATENT DOCUMENTS

| | | | |
|---|---|---|---|
| 10,628,457 B2 | 4/2020 | Barkie | |
| 10,796,075 B2 | 10/2020 | Koren | |
| 10,803,245 B2 | 10/2020 | Alonso | |
| 11,049,055 B2 | 6/2021 | Voit | |
| 11,074,395 B2 | 7/2021 | Anders | |
| 11,468,143 B2 | 10/2022 | Saar | |
| 11,481,545 B1 | 10/2022 | Aviles | |
| 11,520,461 B2 | 12/2022 | Wald | |
| 11,531,808 B2 | 12/2022 | Vis | |
| 11,551,652 B1 | 1/2023 | Pajjuri | |
| 11,574,131 B2 | 2/2023 | Shazeer | |
| 11,727,190 B1 | 8/2023 | Hahn | |
| 11,727,708 B2 | 8/2023 | Geng | |
| 11,747,970 B2 | 9/2023 | Ross | |
| 11,748,555 B2 | 9/2023 | Tran | |
| 11,748,577 B1 | 9/2023 | Aberle | |
| 11,769,017 B1 | 9/2023 | Gray | |
| 11,928,762 B2 | 3/2024 | Kumar | |
| 11,960,848 B2 | 4/2024 | Shazeer | |
| 11,983,553 B2 | 5/2024 | Bent, III | |
| 12,032,922 B2 | 7/2024 | Li | |
| 12,086,219 B2 | 9/2024 | Hwang | |
| 12,105,747 B2 | 10/2024 | Cai | |
| 12,141,556 B2 | 11/2024 | Cai | |
| 12,216,674 B2 | 2/2025 | Sokolov | |
| 2009/0198565 A1 | 8/2009 | Pluschkell, Jr. | |
| 2009/0199104 A1 | 8/2009 | Pluschkell | |
| 2010/0030765 A1 | 2/2010 | Chi | |
| 2014/0081626 A1 | 3/2014 | Chang et al. | |
| 2014/0108422 A1 | 4/2014 | Taylor | |
| 2015/0339616 A1 | 11/2015 | Pursche | |
| 2016/0041961 A1 | 2/2016 | Romney | |
| 2016/0117355 A1 | 4/2016 | Krishnamurthy | |
| 2016/0314122 A1 | 10/2016 | Platakis | |
| 2017/0046317 A1 | 2/2017 | Geva et al. | |
| 2017/0337287 A1 | 11/2017 | Gill | |
| 2017/0344656 A1 | 11/2017 | Koren et al. | |
| 2017/0353744 A1 | 12/2017 | Kunisetty | |
| 2018/0067910 A1 | 3/2018 | Alonso et al. | |
| 2018/0129725 A1 | 5/2018 | Barkie | |
| 2018/0285818 A1 | 10/2018 | Soltani | |
| 2019/0073415 A1 | 3/2019 | Franceschini | |
| 2019/0147024 A1 | 5/2019 | Anders | |
| 2019/0163728 A1 | 5/2019 | Koren | |
| 2019/0266204 A1 | 8/2019 | Chandra | |
| 2019/0272827 A1* | 9/2019 | Vozila | G10L 25/51 |
| 2019/0392029 A1 | 12/2019 | Anders | |
| 2020/0090098 A1 | 3/2020 | Voit | |
| 2020/0142545 A1 | 5/2020 | Wald et al. | |
| 2020/0380061 A1 | 12/2020 | Saar | |
| 2021/0142000 A1 | 5/2021 | Vis | |
| 2021/0165829 A1 | 6/2021 | Dornbush | |
| 2021/0397666 A1 | 12/2021 | Zheng | |
| 2022/0237368 A1 | 7/2022 | Tran | |
| 2022/0366153 A1 | 11/2022 | Li et al. | |
| 2022/0374608 A1 | 11/2022 | Shazeer | |
| 2022/0391591 A1* | 12/2022 | Ronen | G06F 16/345 |
| 2022/0414320 A1 | 12/2022 | Dolan | |
| 2023/0076196 A1 | 3/2023 | Kumar | |
| 2023/0088175 A1 | 3/2023 | Ross | |
| 2023/0092123 A1 | 3/2023 | Silverstein | |
| 2023/0112921 A1 | 4/2023 | Cai | |
| 2023/0237980 A1 | 7/2023 | Pajjuri | |
| 2023/0244848 A1 | 8/2023 | Hahn | |
| 2023/0326107 A1 | 10/2023 | Bosua | |
| 2023/0385320 A1 | 11/2023 | Cai | |
| 2023/0393871 A1 | 12/2023 | Religa | |
| 2024/0020538 A1* | 1/2024 | Socher | G06N 3/084 |
| 2024/0037154 A1 | 2/2024 | Baek | |
| 2024/0038226 A1 | 2/2024 | Nouri | |
| 2024/0062019 A1 | 2/2024 | Aberle | |
| 2024/0104309 A1 | 3/2024 | Hsu | |
| 2024/0126576 A1 | 4/2024 | Bent, III | |
| 2024/0126981 A1 | 4/2024 | Shahinian | |
| 2024/0134611 A1 | 4/2024 | Ross | |
| 2024/0193234 A1 | 6/2024 | Hwang | |
| 2024/0220735 A1 | 7/2024 | Gray | |
| 2024/0242037 A1 | 7/2024 | Heller | |
| 2024/0256311 A1 | 8/2024 | Bent, III | |
| 2024/0256762 A1 | 8/2024 | Beauchamp | |
| 2024/0273282 A1 | 8/2024 | Muralidharan | |
| 2024/0273286 A1 | 8/2024 | Iu | |
| 2024/0273306 A1 | 8/2024 | Somaiya | |
| 2024/0303247 A1 | 9/2024 | Sokolov | |
| 2024/0311424 A1* | 9/2024 | Qian | G06F 16/906 |
| 2024/0320444 A1 | 9/2024 | Maschmeyer | |
| 2024/0320451 A1 | 9/2024 | Li | |
| 2024/0346060 A1* | 10/2024 | Brown | G06Q 50/163 |
| 2024/0354130 A1 | 10/2024 | Cadoni | |
| 2024/0362518 A1 | 10/2024 | Yerli | |
| 2024/0370660 A1* | 11/2024 | Cha | G06T 11/00 |
| 2024/0377932 A1 | 11/2024 | Zhao | |
| 2024/0378801 A1 | 11/2024 | Rivas Vetencourt | |
| 2024/0386707 A1* | 11/2024 | Ungureanu | G06V 10/761 |
| 2024/0394754 A1* | 11/2024 | Mokadam | G06V 10/70 |
| 2024/0419465 A1 | 12/2024 | Riscutia | |
| 2025/0060864 A1 | 2/2025 | Bouton | |
| 2025/0077765 A1* | 3/2025 | Xu | G06F 40/56 |
| 2025/0078200 A1* | 3/2025 | Zhang | G06T 3/10 |
| 2025/0104106 A1 | 3/2025 | Manova | |
| 2025/0117573 A1 | 4/2025 | Azose | |

FOREIGN PATENT DOCUMENTS

| | | | | |
|---|---|---|---|---|
| WO | 2020096803 A1 | 5/2020 | | |
| WO | 2022005566 A1 | 1/2022 | | |
| WO | WO-2022071917 A1 * | 4/2022 | | G06F 16/345 |
| WO | WO-2025048842 A1 * | 3/2025 | | G06F 40/30 |

OTHER PUBLICATIONS

Non-Final Office Action mailed on Oct. 6, 2023, in U.S. Appl. No. 18/169,808, 9 pages.

Notice of Allowance mailed on Aug. 21, 2024, in U.S. Appl. No. 18/169,808, 9 pages.

"How do I create engaging content for social media marketing?", Retrieved From: https://www.linkedin.com/pulse/how-do-i-create-engaging-content-social-/?published=t, Oct. 20, 2022, 7 Pages.

"Machine Learning", Retrieved From: https://www.linkedin.com/showcase/skills-machine-learning/, Dec. 20, 2022, 8 Pages.

"Product Management's Post", Retrieved From: https://www.linkedin.com/feed/update/urn:li:activity:7000461717847580672, Dec. 20, 2022, 14 pages.

"What are machine learning's primary performance challenges?", Retrieved From: https://www.linkedin.com/pulse/what-machine-learnings-primary-performance-challenges-/, Nov. 4, 2022, 6 Pages.

"What real-world problems can machine learning address?", Retrieved From: https://www.linkedin.com/pulse/what-real-world-problems-can-machine-learning-/, Oct. 20, 2022, 7 Pages.

Bruell, Alexandra, "BuzzFeed to Use ChatGPT Creator OpenAI to Help Create Quizzes and Other Content", Wall Street Journal, Retrieved from https://www.wsj.com/articles/buzzfeed-to-use-chatgpt-creator-openai-to-help-create-some-of-its-content-11674752660, Jan. 26, 2023, 3 Pages.

Bruell, Alexandra, "Sports Illustrated Publisher Taps AI to Generate Articles, Story Ideas", Wall Street Journal, Retrieved from https://www.wsj.com/articles/sports-illustrated-publisher-taps-ai-to-generate-articles-story-ideas-11675428443, Feb. 3, 2023, 3 Pages.

Lee, et al., "CoAuthor: Designing a Human-AI Collaborative Writing Dataset for Exploring Language Model Capabilities", arxiv:2201.06796, Jan. 25, 2022, 19 pages.

Non-Final Office Action mailed on Nov. 21, 2024, in U.S. Appl. No. 18/169,793, 26 pages.

Non-Final Office Action mailed on Nov. 21, 2024, in U.S. Appl. No. 18/169,802, 21 pages.

Promotion (Rank), Wikipedia, retrieved on: https://en.wikipedia.org/w/index.php?title=Promotion_(rank)&oldid=1129627550, accessed on 2023, 2 pages.

(56) References Cited

OTHER PUBLICATIONS

Wikipedia:Five Pillars, retrieved from internet: https://web.archive.org/web/20230130220639/https://en.wikipedia.org/w/Index.php?title=Wikipedia:Five_pillars&oldId=1134532186, accessed on: Jan. 19, 2023, 3 pages.
Yuan, et al., "Wordcraft: Story Writing With Large Language Models", Proceedings of The 27th ACM Symposium on Virtual Reality Software and Technology, ACMPUB27, Mar. 2022, pp. 841-852.
"GitHub -adieyal/dynamicprompts: Templating language for generating prompts for text to image generators such as Stable Diffusion", Retrieved from the Internet: URL—https://web.archive.org/web/20230204003550/https://github.com/adieyal/dynamicprompts, Feb. 4, 2023, 14 pages.
International Search Report and Written Opinion received for PCT Application No. PCT/US2024/016049, Jun. 24, 2024, 14 pages.
Wu, et al., "AI Chains: Transparent and Controllable Human-AI Interaction by Chaining Large Language Model Prompts", Proceedings of the 2022 CHI Conference on Human Factors in Computing Systems, Apr. 29, 2022, pp. 1-22.
Final Office Action mailed on May 8, 2025, in U.S. Appl. No. 18/169,802 23 Pages.
Final Office Action mailed on May 2, 2025, in U.S. Appl. No. 18/169,793, 26 pages.
Notice of Allowance mailed on Jul. 23, 2025, in U.S. Appl. No. 18/169,808, 09 pages.
Notice of Allowance mailed on Oct. 7, 2025, in U.S. Appl. No. 18/169,802, 18 Pages.

\* cited by examiner

LEGEND:

◯ = First entity type (e.g., user)

⊜ = Second entity type (e.g., user attribute, such as a skill set)

⊞ = Third entity type (e.g., document attribute, such as a topic)

◐ = Fourth entity type (e.g., activity attribute, such as a channel)

◌ = Fifth entity type (e.g., a document)

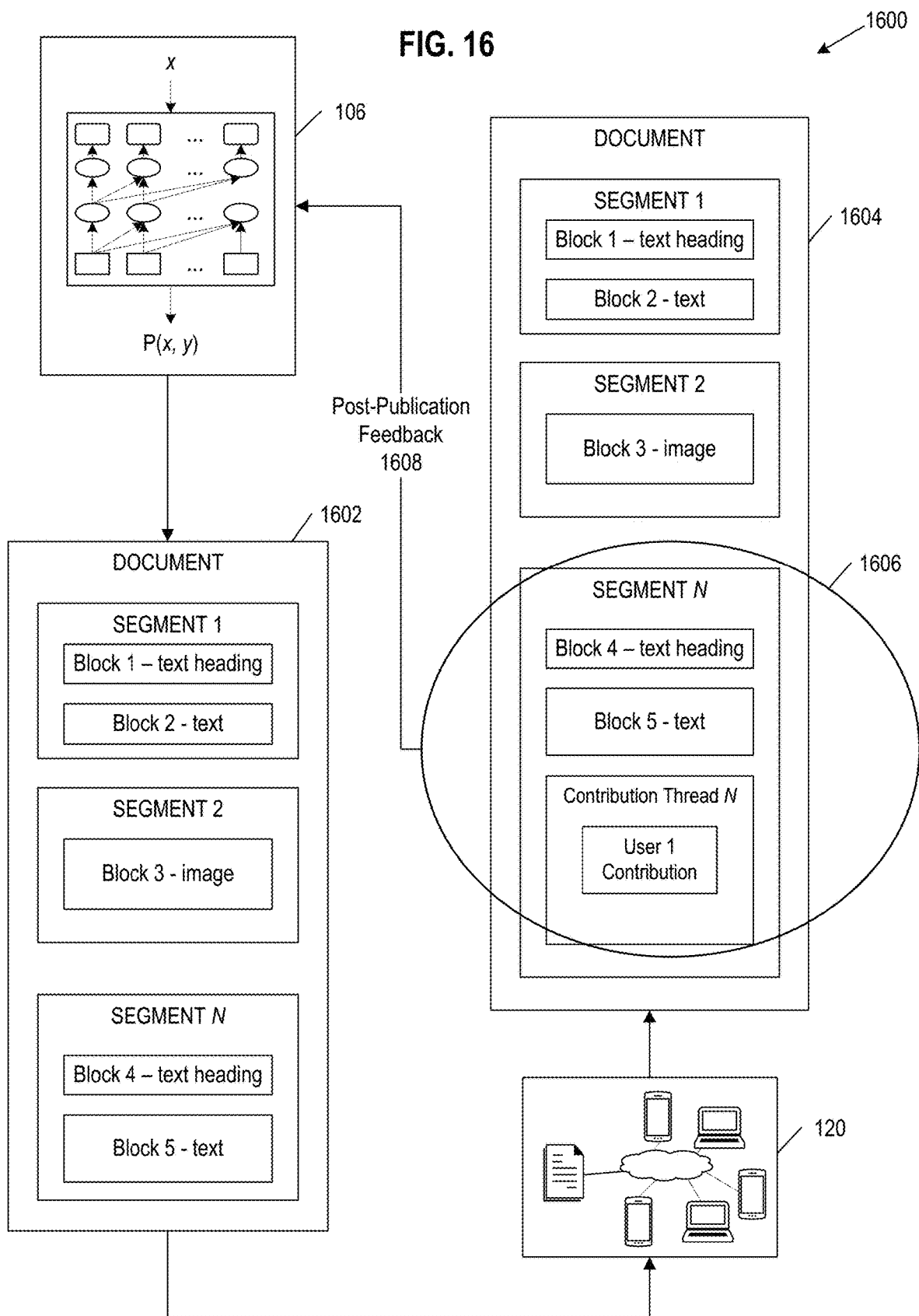

How can you use body language in a negotiation?

A note from the editorial team at CompanyX
We started this collaborative article with the help of AI. You're one of our selected experts invited to contribute.

When used effectively, body language can be a powerful tool. For example, leaning in while speaking with the other side can signal that you are engaged and interested in what they have to say. Maintaining eye contact can show that you are confident and trustworthy, while nodding your head can demonstrate that you are actively listening and understanding the other side's point of view.

The way you carry yourself, your facial expressions and gestures can all have an impact on the outcome of your negotiations. Here are a few ways to use body language to your advantage.

Use open body language

Your body language to signal confidence and reliability. For example, leaning in while speaking with the other side can signal that you are engaged and interested in what they have to say. Maintaining eye contact can show that you are trustworthy, while nodding your head can demonstrate that you are actively listening and understanding the other side's point of view.

If the negotiation is reaching a stalemate, using open body language (arms uncrossed, palms up) can signal that you are open to working together to find a solution. And if you're asking for a big concession, sitting back comfortably can show that you're at ease and confident in your position.

> Professional presence is often initiated with physical posture. Before you ever say a word, people will gauge your confidence, knowledge, and status by how you represent yourself. Stand tall, lean in, actively listen, dress for the part you wa... see more
> Firstname3 Lastname3 - 2nd | Executive Coach | Project Manager | Keynote Speaker | Military Spouse Employment... 👍 24 | 7h

[+] Add your perspective | 2

Don't Fidget

It's important to remember that body language can also work against you. For example, crossing your arms across your chest can be seen as defensive or hostile. Leaning back in your chair could signal boredom or disinterest. Fidgeting (tapping your foot, playing with your pen, etc.) can send the message that you are nervous or lack confidence.

[+] Add your perspective

Be aware of the messages you're sending

Remember to use body language in combination with your words. If you're asking for a concession, for example, don't just sit back confidently, but use strong language to make your case. When the two are in sync, you're more likely to have a positive impact on the negotiation.

> Body language is everything for an Italian like me. Especially when speaking English, or other languages like I do, I have to "adapt" to the other culture and minder, knowing that most of my "natural" gestures could be misinterpreted. Hence, I... see more
> Firstname4 Lastname4 - 3rd | Partnerships at CompanyZ 👍 11 | 5h

[+] Add your perspective

Rate this article | We used generative AI to write this article. What do you think of the content? ( It's great ) ( It's not great )

( ✓ Following ) 👥 44    👍 Like    🔁 Repost    ➤ Send

┌─────────────────────────────────────────────────────────────────────────┐
│ Create a first set of title prompts by applying a first set of title prompt templates to a seed, │
│ where the seed includes a topic descriptor.                             │
│ 1802                                                                    │
└─────────────────────────────────────────────────────────────────────────┘
                                    ↓
┌─────────────────────────────────────────────────────────────────────────┐
│ In response to input of the first set of title prompts to a first generative language model, │
│ output, by the first generative language model, based on the first set of title prompts, a first │
│ set of document titles.                                                 │
│ 1804                                                                    │
└─────────────────────────────────────────────────────────────────────────┘
                                    ↓
┌─────────────────────────────────────────────────────────────────────────┐
│ Create a first set of document prompts by applying a first set of document prompt templates │
│ different from the first set of title prompt templates to the first set of document titles. │
│ 1806                                                                    │
└─────────────────────────────────────────────────────────────────────────┘
                                    ↓
┌─────────────────────────────────────────────────────────────────────────┐
│ In response to input of the first set of document prompts to a second generative language │
│ model, output, by the second generative language model, based on the first set of │
│ document prompts, a first set of documents.                             │
│ 1808                                                                    │
└─────────────────────────────────────────────────────────────────────────┘

Generate a first version of a first document that includes digital content output by a generative language model.
1902

Generate a second version of the first document by dividing the first version of the first document into segments, where a first segment includes a subset of the digital content output by the generative language model.
1904

Enable contributions to the first segment by linking a first user input graphical user interface (GUI) control element with the first segment, and enable contributions to a second segment of the plurality of segments by linking a second user input GUI control element with the second segment.
1906

Publish the second version of the first document to a network.
1908

Receive, via the network and the first user input GUI control element, a first contribution to the second version of the document, where the first contribution includes digital content generated by a first user of the network.
1910

Create a first segment-contribution pair by linking the first contribution with the first segment.
1912

Create a second segment-contribution pair by linking the second contribution with the second segment, where at least one of the first segment-contribution pair or the second segment-contribution pair is capable of being use to generate, by the generative language model, a second document.
1914

In response to input of a first prompt to a generative language model, output, by the generative language model, a first document that includes a first piece of writing, where the first piece of writing is based on the first prompt.
2002

Receive feedback for the first document, where the feedback includes a rating for the first piece of writing.
2004

Using the generative language model, generate a second prompt different from the first prompt, where the second prompt is based on the received feedback.
2006

In response to input of the second prompt to the generative language model, output a second document different from the first document, where the second document includes a second piece of writing based on the second prompt.
2008

Publish the second document to a network.
2010

FIG. 21

```
┌─────────────────────────────────────────────────────────────────────┐
│ In response to input of a first prompt to a generative language     │
│ model, output, by the generative language model, a first set of     │
│ document packages, where a document package of the first set of     │
│ document packages includes at least one of a document, a summary    │
│ of the document, or a notification about the document, and where    │
│ the at least one of the document, the summary of the document, or   │
│ the notification about the document includes a first piece of       │
│ writing output by the generative language model in response to the  │
│ first prompt.                                                       │
│ 2102                                                                │
└─────────────────────────────────────────────────────────────────────┘
                                  │
                                  ▼
┌─────────────────────────────────────────────────────────────────────┐
│ Receive, from the network, a first contribution to the first piece  │
│ of writing, where the first contribution includes a second piece of │
│ writing generated by a first user of the network in response to a   │
│ publishing of the first set of document packages to the network.    │
│ 2104                                                                │
└─────────────────────────────────────────────────────────────────────┘
                                  │
                                  ▼
┌─────────────────────────────────────────────────────────────────────┐
│ Generate, based on the first contribution, a second prompt          │
│ different from the first prompt.                                    │
│ 2106                                                                │
└─────────────────────────────────────────────────────────────────────┘
                                  │
                                  ▼
┌─────────────────────────────────────────────────────────────────────┐
│ In response to input of the second prompt to the generative         │
│ language model, output, by the generative language model, based on  │
│ the second prompt, a second set of document packages different from │
│ the first set of document packages.                                 │
│ 2108                                                                │
└─────────────────────────────────────────────────────────────────────┘
```

```
┌─────────────────────────────────────────────────────────────────┐
│ Identify a user of a network as a possible contributor of       │
│ digital content to a document that is published via the network.│
│                            2202                                  │
└─────────────────────────────────────────────────────────────────┘
                                │
                                ▼
┌─────────────────────────────────────────────────────────────────┐
│ Identify at least two different channels on the network that    │
│ are each capable of sending, to the user, an invitation for the │
│ user to contribute to the document.                              │
│                            2204                                  │
└─────────────────────────────────────────────────────────────────┘
                                │
                                ▼
┌─────────────────────────────────────────────────────────────────┐
│ Determine respective channel usage data for each of the at      │
│ least two different channels, where the channel usage data      │
│ includes, for a channel of the at least two different channels, │
│ historical data relating to use of the channel by the user to   │
│ interact with content.                                           │
│                            2206                                  │
└─────────────────────────────────────────────────────────────────┘
                                │
                                ▼
┌─────────────────────────────────────────────────────────────────┐
│ Compute respective channel affinity scores for each of the at   │
│ least two different channels based on the respective channel    │
│ usage data, where a channel affinity score includes, for a      │
│ channel of the at least two different channels, an estimate of  │
│ a likelihood of the user contributing to the document through   │
│ the channel.                                                     │
│                            2208                                  │
└─────────────────────────────────────────────────────────────────┘
                                │
                                ▼
┌─────────────────────────────────────────────────────────────────┐
│ Based on the respective channel affinity scores, select an      │
│ optimal channel from the at least two different channels.       │
│                            2210                                  │
└─────────────────────────────────────────────────────────────────┘
                                │
                                ▼
┌─────────────────────────────────────────────────────────────────┐
│ Send the invitation to the user through the optimal channel.    │
│                            2212                                  │
└─────────────────────────────────────────────────────────────────┘
```

GENERATIVE COLLABORATIVE PUBLISHING SYSTEM

TECHNICAL FIELD

A technical field to which the present disclosure relates is digital content distribution through online systems. Another technical field to which the present disclosure relates is automated content generation using artificial intelligence.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software applications can use computer networks to distribute digital content among computing devices on a very large scale. Online systems can regularly receive and distribute millions of content items to hundreds of millions of user devices worldwide, every day. The content items received and distributed by online systems can include text, images, audio, video, and combinations of different forms of digital content. Currently, research and experimentation are being done on the use of artificial intelligence technologies to automatically generate content items.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 16 is a flow diagram of an example method for processing post-publication contributions to a document using a generative collaborative publishing system in accordance with some embodiments of the present disclosure.

FIG. 17 is a screen capture of an example contributor-document interface in accordance with some embodiments of the present disclosure.

FIG. 18 is a flow diagram of an example method for prompt and content generation in accordance with some embodiments of the present disclosure.

FIG. 19 is a flow diagram of an example method for pre-publication content processing in accordance with some embodiments of the present disclosure.

FIG. 20 is a flow diagram of an example method for tuning prompt generation based on pre-publication feedback in accordance with some embodiments of the present disclosure.

FIG. 21 is a flow diagram of an example method for tuning prompt generation based on post-publication feedback in accordance with some embodiments of the present disclosure.

FIG. 22 is a flow diagram of an example method for selecting a notification channel for contributors in accordance with some embodiments of the present disclosure.

DETAILED DESCRIPTION

Figure 1:
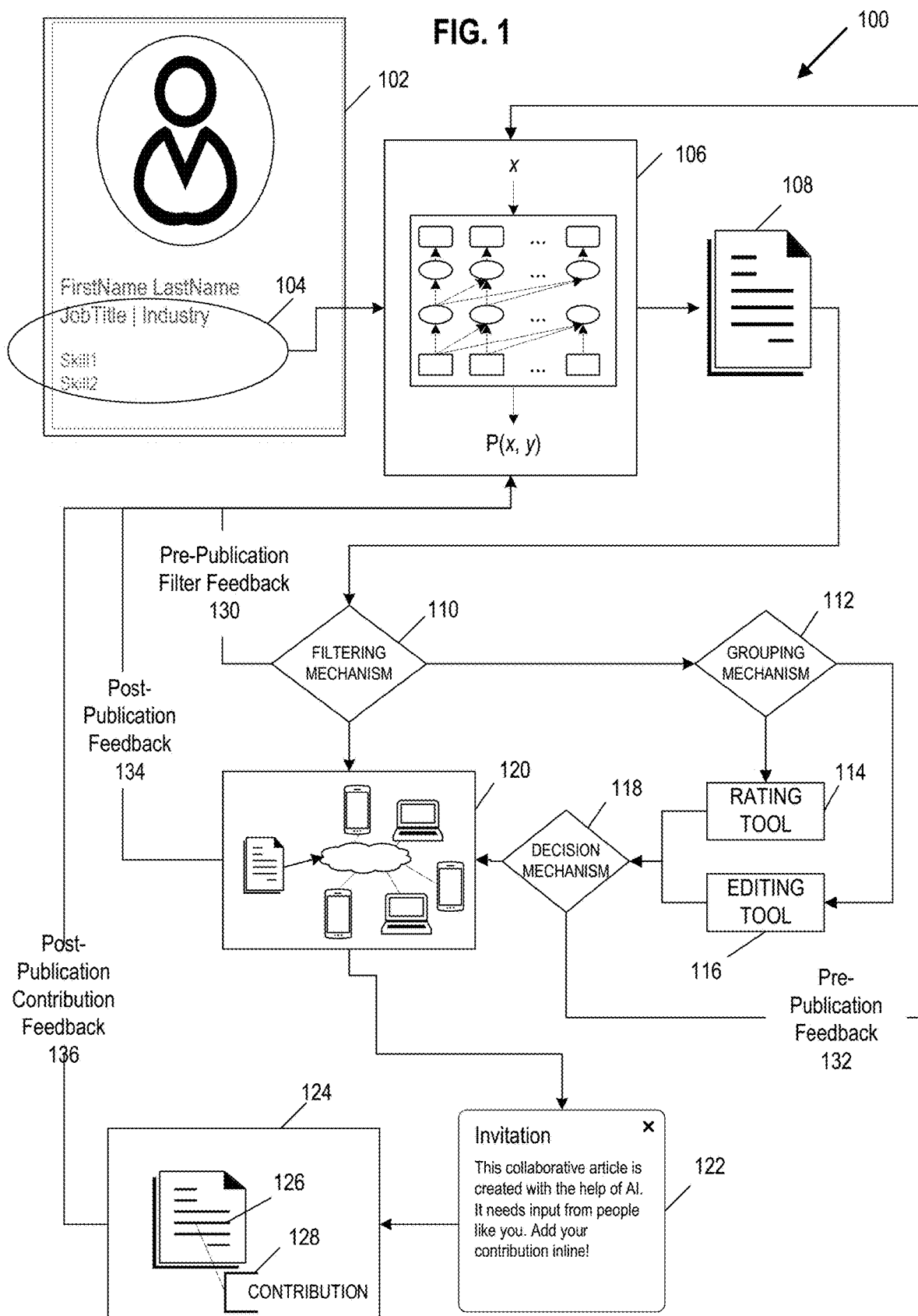
FIG. 1 illustrates an example of a generative collaborative publishing system in accordance with some embodiments of the present disclosure.

A generative model uses artificial intelligence technology to machine-generate new digital content based on model inputs and the data with which the model has been trained. Whereas discriminative models are based on conditional probabilities $P(y|x)$, that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model generates new text in response to model input. The model input includes a task description, also referred to as a prompt. The task description can include an instruction and/or an example of digital content. A task description can be in the form of natural language text, such as a question or a statement, and can include non-text forms of content, such as digital imagery and digital audio. In some implementations, an input layer of the generative language model converts the task description to an embedding or a set of embeddings. In other implementations, the embedding or embeddings are generated based on the task description by a pre-processor, and then the embeddings are input to the generative language model.

Given a task description, a generative model can generate a set of task description-output pairs, where each pair contains a different output. In some implementations, the generative model assigns a score to each of the generated task-description-output pairs. The output in a given task description-output pair contains text that is generated by the model rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer that represents the desired number of pairs to be returned for a particular design or implementation of the generative model. For example, the model could discard the lower-scoring pairs and only output the top-scoring pair as its final output.

Generative language models have many potential uses. However, there are shortcomings that present technical challenges to the widespread use of the conventional generative language models for generating new content at scale. For example, the conventional generative language models require a significant amount of human intervention for many reasons. First, human review of the output of the conventional generative language models is necessary to ensure that model output does not diverge from a given task description in a way that introduces irrelevant or inconsistent information. Additionally, human evaluation of the model output is needed to prevent the model from generating output that is too similar to the task description or previous outputs. Further, the output of the conventional generative language models needs substantial human revision to avoid sounding robotic and instead sound more like human-generated writing. For these and other reasons, the conventional generative language models rely heavily on human labor to generate task descriptions in a highly manual, trial-and-error manner.

Additionally, some generative models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional generative language model systems, determining what constitutes a well-designed task description is a trial-and-error process that involves a human engineer formulating task descriptions, observing model outputs, and modifying the task descriptions based on the model outputs. Further, training a generative model is a resource intensive process that involves time-consuming experimentation conducted by human engineers to generate training data and requires subject matter expertise to configure the model architecture and hyperparameters to produce reliable output for real world tasks.

The shortcomings of generative language models are particularly acute when the models are tasked with generating a large amount of data, such as long form output, in a format that can be presented to human users in an easily consumable way, e.g., so that the writing flows according to a logical progression of topics and sub-topics. Long form output as used herein may refer to a piece of content, for example, a piece of writing that has a word count of at least one hundred words. Many types of documents, such as news articles, FAQs (frequently asked questions), advice columns, and educational materials, can have word counts in the range of about three hundred to about five hundred words or more. Conventional generative language models require substantial effort by human prompt engineers to ensure that the models structure the long form output appropriately for human readers.

Further, the technical limitations of the conventional generative language models also become apparent when the conventional generative language models are tasked with generating multiple different but related outputs. For example, in some applications, it may be desirable to design a task description to cause a generative language model to output both an article and a summary of the article. However, the architecture of the conventional generative language models has been shown to produce inconsistent output that varies depending upon how the task description is written and whether or not certain instructions are included in the task description. For instance, conventional generative language models may produce a different article depending upon whether the task description includes both an instruction to generate the article and an instruction to summarize the article, or the task description only includes an instruction to generate the article without an instruction to summarize it.

Training a conventional generative language model for a specific task is a technical challenge because conventional generative language models limit or cap the size or length of the task description. For example, conventional generative language models can only receive a limited number of parameters in the task description or set a maximum length for the task description. However, more parameters or a longer task description may be desirable for tasks that include generating long form text because a shorter task description or a task description with fewer parameters may not produce the desired model output.

In the context of online content distribution, for the reasons described above, it is a technical challenge to configure a task description that causes the generative model to simultaneously output not only a long-form document (e.g., an article), but also other elements related to the online distribution of the document via search engines and/or other mechanisms. Those other related elements can include, for example, a summary of the article, message text related to the article, which can be included in a notification, post or share of the article, and/or search engine optimization data related to the online distribution of the article.

Thus, while in some use cases it may be desirable to use generative language models to produce long form documents, multiple related documents, or many documents at scale, e.g., for online distribution, in view of the limitations outlined above, the conventional generative language model systems are not up to the task because of the heavily human-resource intensive nature of the required prompt engineering and model training, and the need for substantial human review and editing of the model output.

A generative collaborative publishing system as described herein includes a number of different components that alone or in combination address the above and other shortcomings of the conventional generative language model technologies, particularly when applied to the machine generation of large amounts of data, such as long form documents, at scale. As described in more detail below, the generative collaborative publishing system described includes a prompt generation subsystem, a content generation sub-system, a pre-publication feedback subsystem, a pre-publication content processing subsystem, and a post-publication feedback subsystem.

The prompt generation subsystem generates and refines prompts before a generative language model (GLM) is applied to the prompts to improve the likelihood that the GLM will produce output that does not need human review or only needs minimal human review. The content generation subsystem uses a trained GLM to machine-generate documents based on the prompts. The pre-publication feedback subsystem generates output that can act as proxies for the expected output of the GLM or as labels or scores for the actual GLM output. As such, the pre-publication feedback can be used to measure the quality of the GLM output prior to publication. The pre-publication feedback subsystem is configured to minimize the amount of pre-publication human review required for GLM-generated documents.

The pre-publication document processing subsystem divides GLM-produced documents into segments, also referred to as chunks, to facilitate the generation of post-publication feedback. The post-publication feedback subsystem invites selected online contributors to add contributions to the GLM-produced documents. The post-publication contributions, as well as other feedback indicators such as various different types of network activity signals, also can act as proxies for the expected output of the GLM, or as labels or scores for the GLM output. As a result, the contributions and other post-publication feedback can be used to measure the quality of the actual GLM output.

Some or all of the output of the pre-publication feedback subsystem and/or the feedback generated by the post-publication feedback subsystem are returned to the prompt generation subsystem to further improve prompts and subsequent GLM output. Additionally or alternatively, feedback generated by the pre-publication feedback subsystem and/or the post-publication feedback subsystem are provided to the content generation subsystem to fine tune the GLM itself. As described, the generative collaborative publishing system can use the feedback to generate its own training data on the fly, in an automated way, and use that training data to further improve the prompts and/or to fine tune the GLM itself.

As a result of these and other aspects of the described generative collaborative publishing system, at least some of the GLM-produced documents can be published to an online system without human intervention or with minimal human intervention. Additionally, the described feedback subsystems reduce the likelihood that the GLM will produce documents that diverge from a given task description or that are too similar to the documents previously generated by the GLM.

Aspects of the disclosed technologies are described in the context of generative language models that output pieces of writing, i.e., text. However, the disclosed technologies are not limited to uses in connection with machine-generated pieces of writing. For example, aspects of the disclosed technologies, such as the prompt generation technologies and various feedback mechanisms can be used in connect with non-text forms of machine-generated output, such as digital imagery, videos, and/or audio output by one or more generative models. Additionally, aspects of the disclosed technologies are described in the context of online systems including network-based digital content distribution systems, such as social network services. An example of a content distribution use case is the distribution of user-generated content such as text, images, video, audio, or combinations of different forms of content through an online social network or social graph-based application. However, aspects of the disclosed technologies are not limited to social media applications, but can be used to improve the use of generative collaborative publishing systems for other applications. Further, any network-based application software system can act as a content distribution system. For example, news, entertainment, and e-commerce apps installed on mobile devices, enterprise systems, messaging systems, search engines, document management systems, collaboration tools, and social graph-based applications can all function as content distribution systems.

The disclosure will be understood more fully from the detailed description given below, which references the accompanying drawings. The detailed description of the drawings is for explanation and understanding, and should not be taken to limit the disclosure to the specific embodiments described.

FIG. 1 illustrates an example of a generative collaborative publishing system in accordance with some embodiments of the present disclosure.

In the example of FIG. 1, a generative collaborative publishing system 100 includes a generative language model 106, a pre-publication filtering mechanism 110, a pre-publication grouping mechanism 112, a pre-publication decision mechanism 118, and a post-publication feedback mechanism 124. The generative language model 106 interfaces with one or more components of an application software system that create, edit, and store entity profiles, network activity data, and related data such as rankings, scores, and labels. For example, in FIG. 1, a user profile 102 has been created and stored by an online system, such as a professional social network system or another type of application software system. The user profile 102 contains attribute data 104. The attribute data 104 includes descriptors of the skills and capabilities of the user associated with the profile 102. These descriptors include, for example, a job title, an industry, an organization name (e.g., company name or name of an educational institution), and skills, e.g., {Skill1, Skill2} as shown in FIG. 1.

Descriptor as used herein may refer to a piece of digital data, such as a word, phrase, feature, digital image, digital audio, digital video, or graphic, that can be used to describe or identify an entity or an activity. In some embodiments, descriptors include one or more of: a job title, an industry, a skill or set of skills, a history of work experience, a certification, a publication, an honor or award, an education experience, and similar descriptors. Entity as used herein may refer to a user of an online system or another type of entity, such as a company or organization, a content item, or an attribute. For example, in a social networking application, an entity can include a page with which a user of the online system can interact. For example, an entity could be a user profile, a profile for a group of people, an organization profile, a job posting, etc.

Activity as used herein may refer to network activity, such as digital communications between computing devices and systems. Examples of network activity include initiating a session with an online system by, e.g., logging in to an application, initiating a page load to load a web page into a browser, uploading, downloading, creating, and sharing digital content items on the network, and executing social actions, such as sending messages, adding comments, and/or inputting social reactions to articles or posts on the network.

The attribute data 104 is extracted from the online system by, for example, the generative collaborative publishing system 100 executing one or more queries on one or more data stores of the online system. In some embodiments, the attribute data 104 is extracted from the online system in response to a user input received by an application software system. The attribute data 104 includes data that is specific to a user or a user group of the online system, in some implementations. In other words, output of the generative language model 106 can be customized for a particular user or user group of the online system based on the attribute data 104 that is selected and used to generate the task descriptions (e.g., prompts) to which the generative language model 106 is applied. For example, if a particular skill set is common to many users of a particular user group of the online system, a prompt can be configured based on that skill set so that the generative language model 106 generates documents pertaining to the skill set.

The generative language model 106 includes a generative model that is configured using artificial intelligence-based technologies to machine-generate natural language text. In some embodiments, generative language model 106 also or alternatively includes one or more generative models that are configured to machine-generate other forms of digital content, such as images, audio, video, etc. Thus, while the term generative language model can be used to refer to generative models that machine-generate text, as used herein, a generative language model can include one or more components that generate non-text output or a combination of text and non-text output.

In some implementations, the generative language model 106 is constructed using a neural network-based machine learning model architecture. In some implementations, the neural network-based architecture includes one or more input layers that receive task descriptions (or prompts), generate one or more embeddings based on the task descriptions, and pass the one or more embeddings to one or more other layers of the neural network. In other implementations, the one or more embedding are generated based on the task description by a pre-processor, the embeddings are input to the generative language model, and the generative language model outputs digital content, e.g., natural language text or a combination of natural language text and non-text output, based on the embeddings.

In some implementations, the neural network-based machine learning model architecture includes one or more self-attention layers that allow the model to assign different weights to different words or phrases included in the model input. Alternatively or in addition, the neural network architecture includes feed-forward layers and residual connections that allow the model to machine-learn complex data patterns including relationships between different words or phrases in multiple different contexts. In some implementations, the generative language model 106 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the generative collaborative publishing system 100.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on textual input. Accordingly, in some examples, a multimodal neural network of the generative collaborative publishing system is capable of outputting digital content that includes a combination of two or more of text, images, video or sound.

The generative language model 106 is trained on a large dataset of natural language text. For example, training samples of natural language text extracted from publicly available data sources are used to train the generative language model 106. The size and composition of the dataset used to train the generative language model 106 can vary according to the requirements of a particular design or implementation of the generative collaborative publishing system 100. In some implementations, the dataset used to train the generative language model 106 includes hundreds of thousands to millions or more different natural language text training samples. In some embodiments, generative language model 106 includes multiple generative language models trained on differently sized datasets. For example, generative language model 106 can include a comprehensive but low capacity model that is trained on a large data set and used for generating examples, and the same generative language model also can include a less comprehensive but high capacity model that is trained on a smaller data set, where the high capacity model is used to generate outputs based on examples obtained from the low capacity model. In some implementations, reinforcement learning is used to further improve the output of the generative language model 106. In reinforcement learning, ground-truth examples of desired model output are paired with respective prompts, and these prompt-output pairs are used to train or fine tune the generative language model 106.

At the generative language model 106, one or more prompts, x, are formulated based on the extracted attribute data 104. For each prompt, x, the generative language model 106 produces one or more outputs y and, for each output y, a score P(x, y) that indicates a likelihood of the prompt x and the respective output y occurring together. Using the output(s) y and corresponding score(s) P(x, y), the generative language model 106 generates first versions of one or more documents 108. The first versions of the one or more documents 108 each include at least one piece of writing that has been machine-generated by the generative language model 106. Implementations of the disclosed prompt and content generation technologies are described in more detail below, for example with reference to FIG. 6, FIG. 4, FIG. 5, FIG. 7, FIG. 8, and FIG. 16.

Output of the generative language model 106 includes one or more documents 108. While not specifically shown in FIG. 1, one or more documents output by the generative language model 106 can be forwarded directly to a publishing subsystem for publication to a user network, in some cases. For example, prompt refinements and/or model fine tuning performed by one or more pre-publication and/or post-publication feedback mechanisms on documents previously output by the generative language model can improve the quality of the generative language model output to the extent that no pre-publication review or filtering of the documents is needed, such that the documents 108 produced by the generative language model can be published directly by the publishing subsystem 120. Documents 108 that are not directly routed from the generative language model 106 to the publishing subsystem 120 are sent to one or more pre-publication feedback mechanisms, such as one or more filtering mechanisms 110, grouping mechanisms 112, rating tools 114, editing tools 116, and/or decision mechanisms 118. For instance, any or all of the functionality represented by the one or more pre-publication feedback mechanisms, such as the one or more filtering mechanisms 110, grouping mechanisms 112, rating tools 114, editing tools 116, and/or decision mechanisms 118, can be omitted from the computing system 100 on any iteration of the computing system 100, in some implementations.

The pre-publication filtering mechanism 110 applies one or more filters to the first versions of the documents 108 that have not been sent directly to the publishing subsystem 120. Examples of filters that can be applied to documents 108 by pre-publication filtering mechanism 110 include discriminative machine learning models that have been trained to label documents based on a probabilistic or statistical likelihood of the documents containing particular types of content (e.g., spam filters, inappropriate content filters, etc.) and discriminative models that have been trained to score documents based on a mathematical similarity to one or more particular scoring criteria (e.g., relevance filters, ranking models, etc.). Other examples of filters that can be applied to documents 108 by pre-publication filtering mechanism 110 include discriminative models that have been trained on feedback that has been previously received on output of the generative language model 106. For example, a discriminative model is trained on generative model output-feedback pairs such as article titles output by generative language model 106 and corresponding rating values assigned to the article titles by human reviewers. Once trained, the discriminative model is used to automatically score newly generated article titles output by generative language model 106 that haven't been rated by human reviewers. The discriminative model trained in this manner functions as a filter when a threshold rating value is specified, such that output of the generative language model that is assigned a rating by the discriminative model that falls below the threshold rating value is not published but rather is redirected to a feedback subsystem or another component of the generative collaborative publishing system.

In some implementations, generative models are configured to perform discriminative tasks. Thus, pre-publication filtering mechanism 110 uses a generative model as an alternative to a discriminative model or in addition to a discriminative model, in some implementations. For example, by configuring a prompt with instructions to exclude certain phrases, a generative language model can be used to filter out, from document topics or document titles, for instance, unrelated phrases such as, in the jobs context, non-work related phrases. As such, the generative language model can be configured to only generate work-related phrases or article titles.

Based on the output of the one or more filters, the pre-publication filtering mechanism 110 forwards the documents 108 to grouping mechanism 112 or, in some cases, directly to an online publishing system 120. Alternatively or in addition, the pre-publication filtering mechanism 110 generates pre-publication filter feedback 130 based on the filter output, and returns the pre-publication filter feedback 130 to the generative language model 106 to be used to refine prompts and/or fine tune the generative language model 106. The pre-publication filter feedback 130 is used to refine the prompt x, e.g., by modifying at least a portion of the prompt based on the pre-publication filter feedback 130. Alternatively or in addition, the pre-publication filter feedback 130 is used to fine tune the generative language model 106, e.g., by modifying one or more parameters of the generative language model 106 or by modifying the architecture of the generative language model 106, based on the pre-publication filter feedback 130.

In some cases, documents 108 are rejected based on the pre-publication filter feedback 130. When the pre-publication filtering mechanism 110 forwards documents 108 that have not been rejected based on pre-publication filter feedback 130 to grouping mechanism 112, the grouping mechanism 112 groups the documents 108 based on one or more grouping criteria. Examples of grouping criteria include metadata associated with the documents 108, such as document type, subject matter, topic, document length, etc. In some implementations, grouping mechanism 112 includes a set of heuristics or a rules engine that groups the documents 108 based on whether the document metadata matches particular rules or heuristics. Alternatively or in addition, grouping mechanism 112 uses machine learning technologies to associate the documents 108 with particular groups. For example, grouping mechanism 112 can use the output of a ranking model of the pre-publication filtering mechanism 110 to group the documents 108 based on similarity to each other or relevance to a particular topic, skill set, job title, industry, or other criterion.

Grouping mechanism 112 divides the documents 108 into at least two groups and forwards each group to a respective destination. In the example of FIG. 1, grouping mechanism 112 divides the documents 108 into two mutually exclusive groups. Grouping mechanism 112 forwards one of the groups to rating tool 114 and forwards the other group to editing tool 116. Rating tool 114 applies a rating to each of the documents 108 received by rating tool 114 from grouping mechanism 112. Examples of ratings include numerical scores in a range of possible score values, such as a scale of one to five.

Editing tool 116 applies one or more edits to one or more of the documents 108 received by editing tool 116 from grouping mechanism 112. Examples of edits include revisions to words, phrases, sentences, or paragraphs of a document, where the revisions can relate to the substance, style, tone, grammar, or structure of the document, for instance. In some implementations, editing tool 116 also includes functionality that enables documents to be rated; for instance, a version of editing tool 116 can contain a version of rating tool 114. On the other hand, rating tool 114 does not include functionality for editing documents; i.e., rating tool 114 does not contain a version of editing tool 116, in some implementations.

Either or both of rating tool 114 and editing tool 116 can be implemented as a fully automated or semi-automated subsystem of the generative collaborative publishing system 100. For example, rating tool 114 can be implemented using a machine learning model or a rules engine that automatically assigns a rating to a document based on how well the document matches one or more rating criteria, such as how well the document matches a particular writing style, tone, or topic. The automatically-generated document rating can be surfaced to a human reviewer through a front end user interface for verification or modification. In other implementations, the rating is not automatically generated and instead the rating is received from a human reviewer via a front end user interface through which the human reviewer reviews and rates the document 108.

Editing tool 116 can be implemented as an automated document editor or grammar checking tool into which the document 108 is loaded. The automatically-generated document edits can be surfaced to a human reviewer/editor through a front end user interface for verification or modification. In other implementations, the edits are not automatically generated and instead the edits are received from a human editor via a front end user interface through which the human editor reviews and edits the document 108.

The decision mechanism 118 determines whether to forward an edited or rated document 108 to the online publishing system 120. For example, a document 108 may be not published if the rating generated by rating tool 114 falls below a threshold rating value or if a human editor reviewing the document through editing tool 116 signals a rejection of the document through a front end user interface. As described in more detail below, if the document 108 is determined to be not published at decision mechanism 118, the document 108 can be returned to generative language model 106 to be used for prompt refinement and/or fine tuning of the generative language model 106.

Specific values of the threshold rating value and other thresholds and criteria described herein are determined based on the requirements of a particular design or implementation of the generative collaborative publishing system 100. For example, rating levels all have defined thresholds, in some implementations, such that each rating level functions as a category (e.g., a rating level of 1 corresponds to a category of not publishable and a rating level of 5 corresponds to a category of publishable without human review). As another example, a rating value of 1 may mean that a document contains 1 or more policy violations such as hate speech, etc. such that a rating of 2 would indicate that the document passed the requirement for rating value 1 (e.g., the document does not have any policy violations). In another example, a rating value of 1 could cause a feedback report to be routed to a particular destination such as a team responsible for a particular type of content moderation.

Alternatively or in addition, the decision mechanism 118 uses the output of rating tool 114 or the output of editing tool 116 to generate pre-publication feedback 132, and returns pre-publication feedback 132 to generative language model 106. The pre-publication feedback 132 is used to refine the prompt x, e.g., by modifying at least a portion of the prompt based on the pre-publication feedback 132. Alternatively or in addition, the pre-publication feedback 132 is used to fine tune the generative language model 106, e.g., by modifying one or more parameters of the generative language model 106, or by modifying the architecture of the generative language model 106, or by inputting examples of positively rated content into the generative language model 106, based on the pre-publication feedback 132. Implementations of the disclosed pre-publication technologies are described in more detail below, for example with reference to FIG. 9, FIG. 10, FIG. 11, FIG. 12, FIG. 19, and FIG. 22.

Documents 108 that have passed through filtering mechanism 110, grouping mechanism 112, rating tool 114 or editing tool 116, and decision mechanism 118 without being returned to the generative language model 106 to be used for prompt refinement or model training, are distributed by the online publishing system 120 to a network, such as a network of computing devices that are connected to an online system such as a social network service. Network as used herein may refer to a user network, such as a social network service or another type of application software system. In some implementations, documents 108 bypass rating tool 114 or editing tool 116, e.g., some documents 108 are distributed by the publishing system without any human review. In some implementations, the online publishing system 120 uses a content serving system, such as content serving system 260, described below, to determine how to route documents 108 through the network, e.g., to determine whether to place a particular document 108 in a particular slot of a particular user's news feed during a particular login session.

After a document 108 is published by the online publishing system 120, generative collaborative publishing system 100 may send a digital invitation 122 to one or more users of the network that the collaborative publishing system 100 has identified as potential contributors to the document 108. In response to an invitation 122, post-publication feedback mechanism 124 may receive one or more contributions 128 to one or more particular segments 126 of the document 108 from one or more of the invited users. The received contributions 128 can become part of the document 108 to form a new version of the document, as described in more detail below.

The post-publication feedback mechanism 124 generates post-publication contribution feedback 136 based on one or more of the received contributions 128 and returns the post-publication contribution feedback 136 to the generative language model 106. For example, the post-publication contribution feedback 136 includes a segment-contribution pair that has received the highest amount of social reaction. The post-publication contribution feedback 136 is used to refine the prompt x, e.g., by modifying at least a portion of the prompt to generate a new document based on a received contribution 128 or other post-publication contribution feedback 136. Alternatively or in addition, one or more received contributions 128 and/or other post-publication contribution feedback 136 are used to fine tune the generative language model 106, e.g., by modifying one or more parameters of the generative language model 106 or by modifying the architecture of the generative language model 106, based on the one or more received contributions 128 and/or other post-publication contribution feedback 136.

Additionally or alternatively, post-publication feedback 134 is generated as a result of publication of documents 108 by publishing system 120. For example, after a document 108 is published to a network by publishing system 120, one or more users of the network can generate network activity data that is linked with the document 108. For instance, user-generated views, likes, comments, and social reactions on documents 108 can be returned to generative language model 106 as post-publication contribution feedback 136. The post-publication feedback 134 is used to refine the prompt x, e.g., by modifying at least a portion of the prompt to generate a new document based on the post-publication feedback 134. Additionally, in some instances, the post-publication feedback 134 isn't used to refine the prompts or generative language model, but instead can be used as instructions for generating other documents that have been identified as of interest to the user network. Alternatively, the segments of documents 108 that have received strong positive feedback can also be used to fine-tune the generative language model 106. For example, the segments can be labeled as positive examples and used as training data to tune the generative language model 106. Alternatively or in addition, post-publication feedback 134 is used to fine tune the generative language model 106, e.g., by modifying one or more parameters of the generative language model 106 or by modifying the architecture of the generative language model 106, based on the post-publication feedback 134. Implementations of the disclosed post-publication technologies are described in more detail below, for example with reference to FIG. 14, FIG. 15, FIG. 16, FIG. 17, FIG. 21, and FIG. 20.

The examples shown in FIG. 1 and the accompanying description, above, are provided for illustration purposes. This disclosure is not limited to the described examples. Additional or alternative details and implementations are described below.

Figure 2:
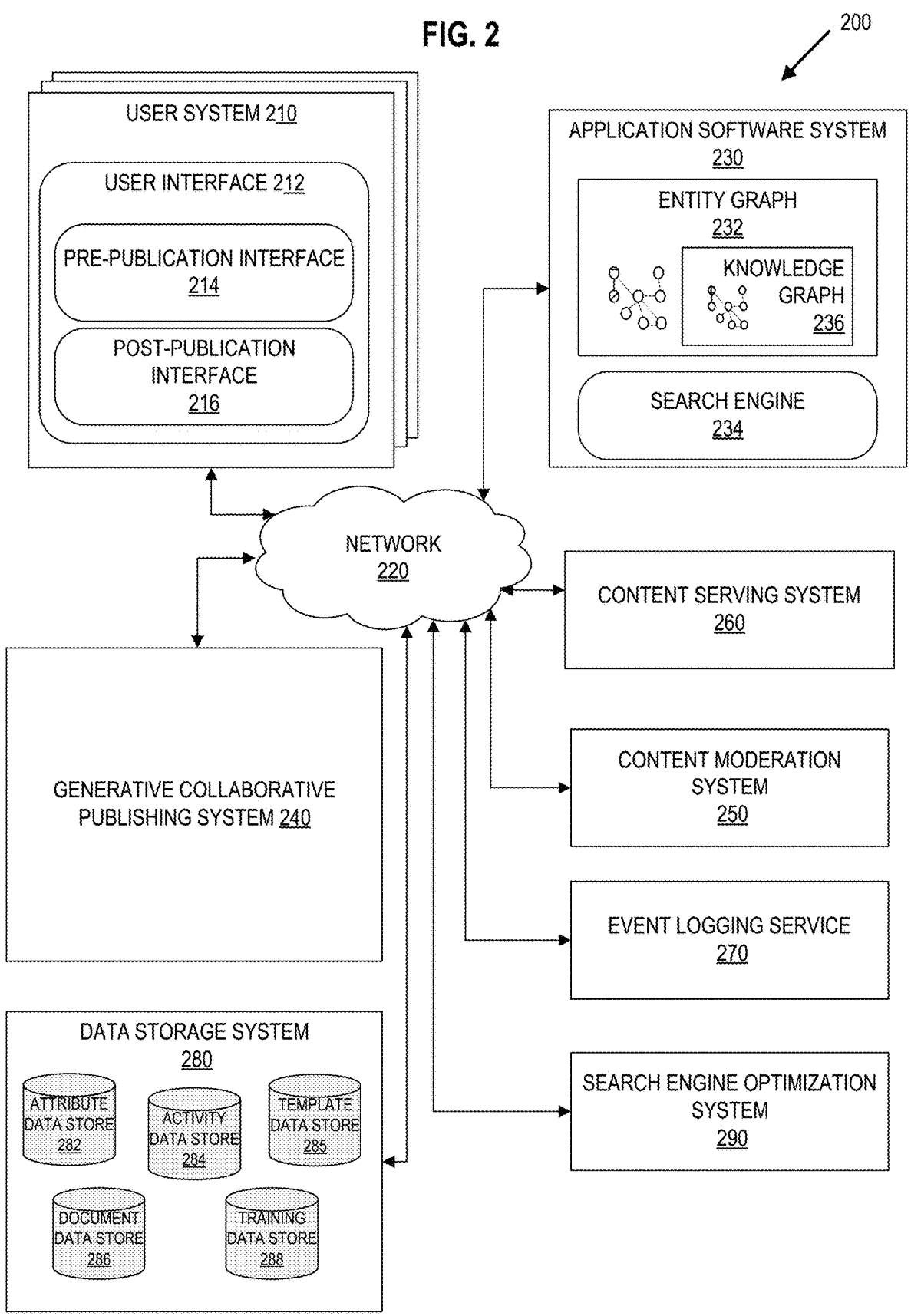
FIG. 2 illustrates an example computing system that includes a generative collaborative publishing system in accordance with some embodiments of the present disclosure.

FIG. 2 illustrates an example computing system that includes a generative collaborative publishing system in accordance with some embodiments of the present disclosure.

In the embodiment of FIG. 2, computing system 200 includes one or more user systems 210, a network 220, an application software system 230, a generative collaborative publishing system 240, a content moderation system 250, a content serving system 260, an event logging service 270, a data storage system 280, and a search engine optimization system 290. Components of the computing system 200 including the generative collaborative publishing system 240 are described in more detail below.

A user system 210 includes at least one computing device, such as a personal computing device, a server, a mobile computing device, or a smart appliance, and at least one software application that the at least one computing device is capable of executing, such as an operating system or a front end of an online system. Many different user systems 210 can be connected to network 220 at the same time or at different times. Different user systems 210 can contain similar components as described in connection with the illustrated user system 210. For example, many different end users of computing system 200 can be interacting with many different instances of application software system 230 through their respective user systems 210, at the same time or at different times.

User system 210 includes a user interface 212. User interface 212 is installed on or accessible to user system 210 by network 220. For example, embodiments of user interface 212 include a graphical display screen that includes at least one slot. A slot as used herein refers to a space on a graphical display such as a web page or mobile device screen, into which digital content items such as documents can be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 212 can be used to input data, upload, download, receive, send, or share content items, including documents and contributions, initiate user interface events, and view or otherwise perceive output such as data and/or documents produced by application software system 230, generative collaborative publishing system 240, content moderation system 250, and/or content serving system 260. For example, user interface 212 can include a graphical user interface (GUI), a conversational voice/speech interface, a virtual reality, augmented reality, or mixed reality interface, and/or a haptic interface. User interface 212 includes a mechanism for logging in to application software system 230, clicking or tapping on GUI user input control elements, and interacting with digital content items such as documents. Examples of user interface 212 include web browsers, command line interfaces, and mobile app front ends. User interface 212 as used herein can include application programming interfaces (APIs).

In the example of FIG. 2, user interface 212 includes a pre-publication interface 214 and/or a post-publication interface 216. Each of pre-publication interface 214 and post-publication interface 216 are front end user interface components of generative collaborative publishing system 240 or application software system 230. Pre-publication interface 214 and post-publication interface 216 are shown as components of user interface 212 for ease of discussion, but access to either or both of pre-publication interface 214 and post-publication interface 216 can be limited to specific user systems 210. For example, in some implementations, access to pre-publication interface 214 is limited to users of generative collaborative publishing system 240 or application software system 230 who have been designated as document reviewers or editors, while access to post-publication interface 216 is limited to users of generative collaborative publishing system 240 or application software system 230 who have been invited to contribute to one or more documents output by a generative language model.

Figure 10:
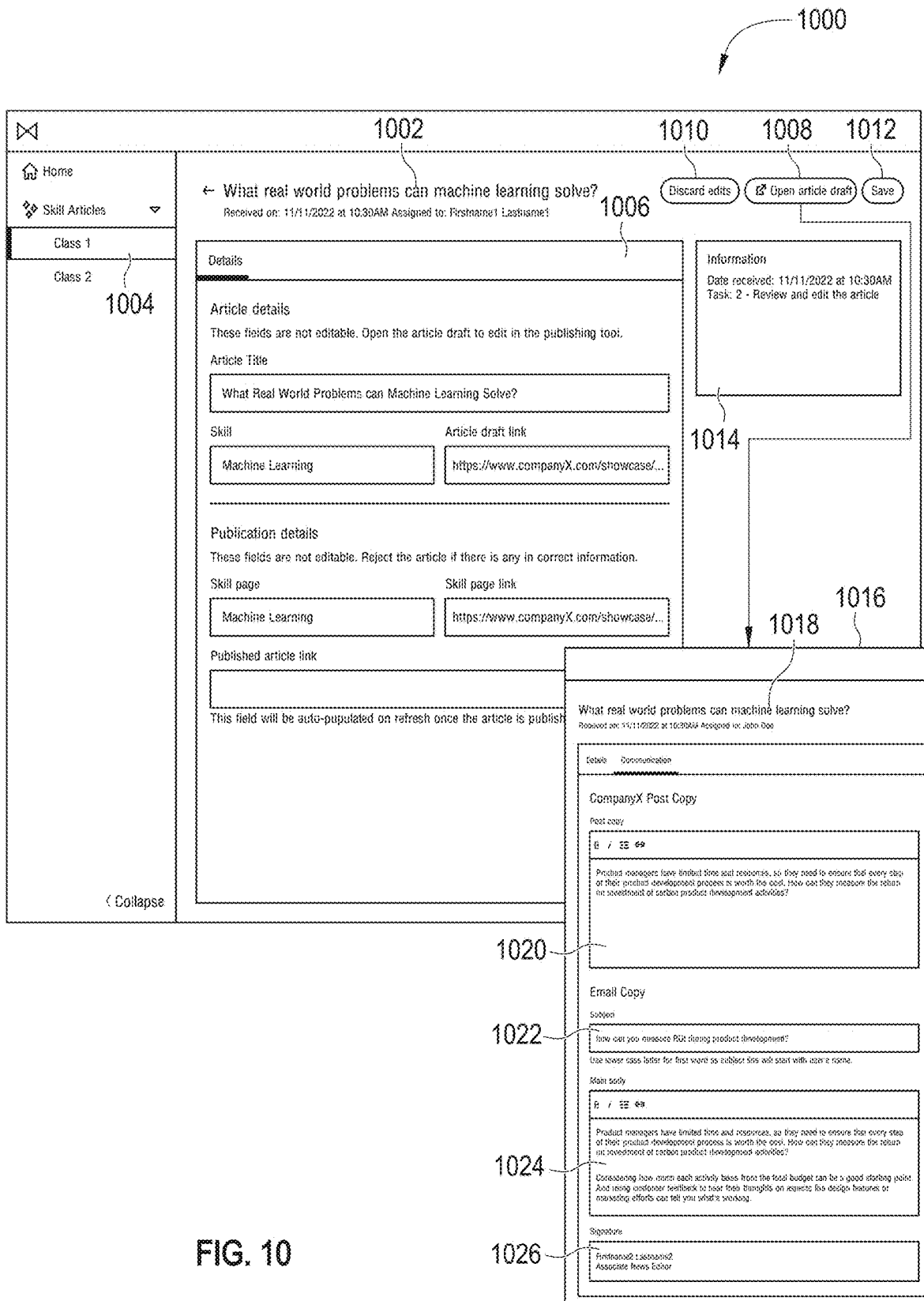
FIG. 10 is a screen capture of an example editor interface in accordance with some embodiments of the present disclosure.
Figure 11:
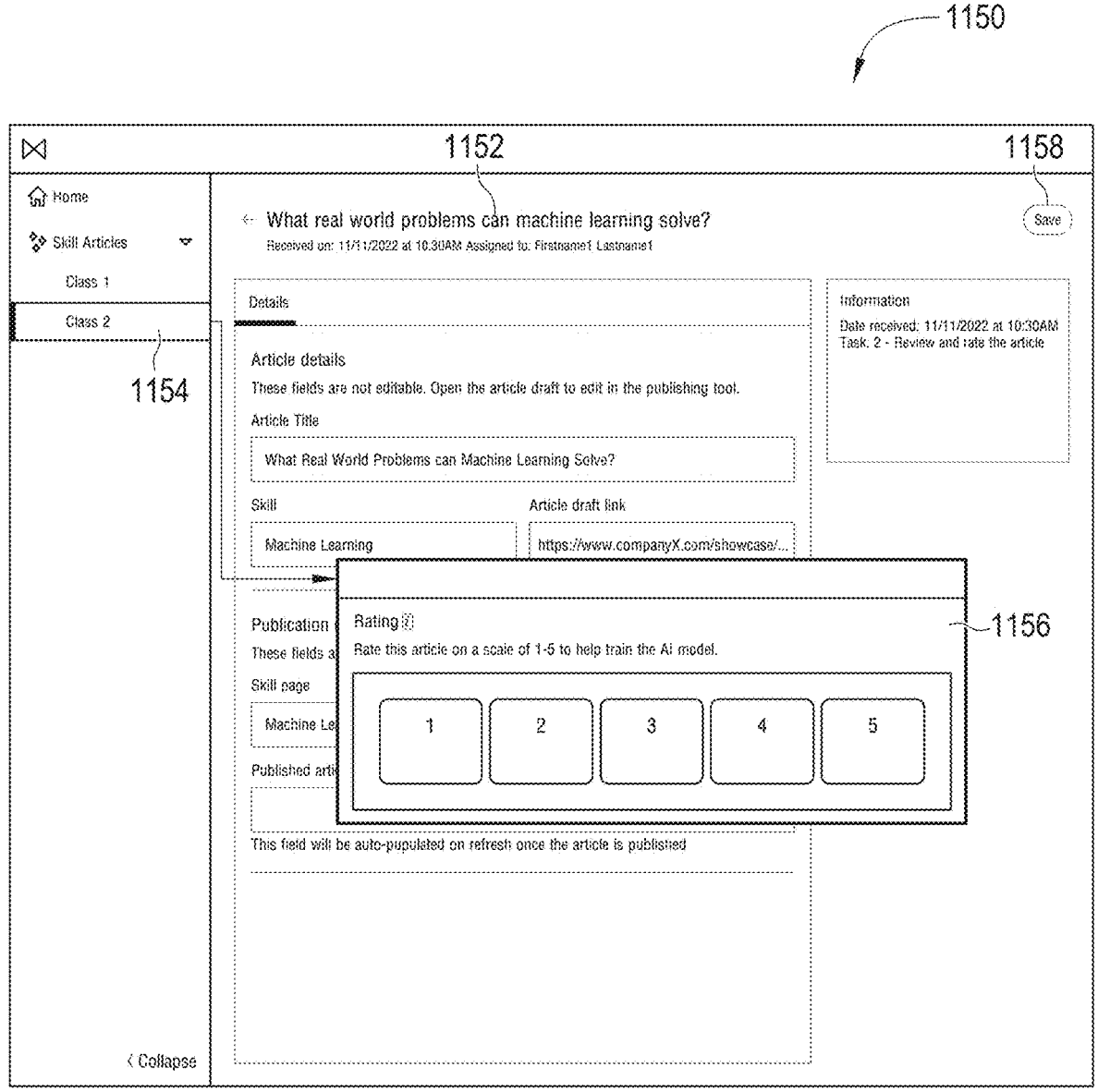
FIG. 11 is a screen capture of an example editor interface in accordance with some embodiments of the present disclosure.

Pre-publication interface 214 includes rating tool 114 and/or editing tool 116, described above, in some implementations. Post-publication interface 216 includes a contributor interface that generates contributor invitations, such as invitation 122, and enables contributors to add contributions, such as contribution 128, to documents or to segments of documents, such as segment 126, in some implementations. An example of an editing interface that can be implemented as a component of pre-publication interface 214, such as 214 editing tool 116, is shown in FIG. 10, described below. An example of a document rating interface that can be implemented as a component of pre-publication interface 214, such as rating tool 114, is shown in FIG. 11, described below. An example of a contributor interface that can be used as part of post-publication interface 216 is shown in FIG. 17, described below.

Network 220 is an electronic communications network. Network 220 can be implemented on any medium or mechanism that provides for the exchange of digital data, signals, and/or instructions between the various components of computing system 100. Examples of network 220 include, without limitation, a Local Area Network (LAN), a Wide Area Network (WAN), an Ethernet network or the Internet, or at least one terrestrial, satellite or wireless link, or a combination of any number of different networks and/or communication links.

Application software system 230 is any type of application software system that provides or enables the creation, upload, and/or distribution of at least one form of digital content, including documents and contributions, between user systems, such as user system 210, through user interface 212. In some implementations, portions of generative collaborative publishing system 240 are components of application software system 230. Examples of application software system 230 include but are not limited to online services such as professional social network software and/or other social graph-based applications, as well as other online systems that do not provide social network services, such as general-purpose search engines, specific-purpose search engines, messaging systems, content distribution platforms, e-commerce software, enterprise software, or any combination of any of the foregoing or other types of software.

A front end portion of application software system 230 can operate in user system 210, for example as a plugin or widget in a graphical user interface of a web application, mobile software application, or as a web browser executing user interface 212. In an embodiment, a mobile app or a web browser of a user system 210 can transmit a network communication such as an HTTP request over network 220 in response to user input that is received through a user interface provided by the web application, mobile app, or web browser, such as user interface 212. A server running application software system 230 can receive the input from the web application, mobile app, or browser executing user interface 212, perform at least one operation using the input, and return output to the user interface 212 using a network communication such as an HTTP response, which the web application, mobile app, or browser receives and processes at the user system 210.

Figure 15:
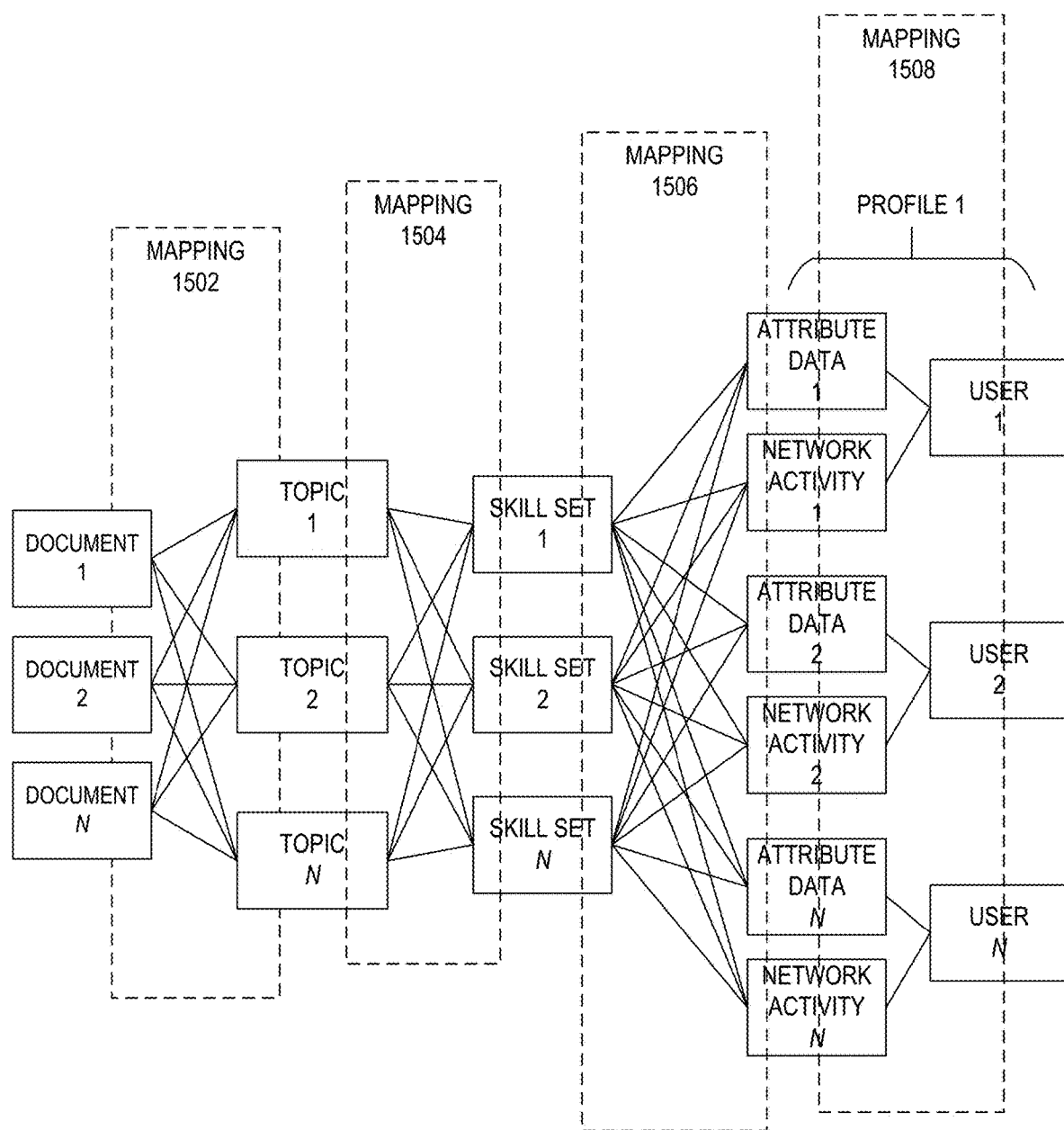
FIG. 15 is a graphical representation of examples of mappings that can be used for generating contributor notifications in accordance with some embodiments of the present disclosure.

In the example of FIG. 2, application software system 230 includes an entity graph 232. As described in more detail below, entity graph 232 can be used to compute various types of affinity scores and/or statistics between or relating to entities. Entity graph 232 is a graph-based representation of data stored in data storage system 280, described below. For example, entity graph 232 represents entities, such as users, organizations, and content items, such as documents, as nodes of a graph. Entity graph 232 represents relationships, also referred to as mappings, between entities as edges, or combinations of edges, between the nodes of the graph. In some implementations, mappings between different pieces of data used by application software system 230 are represented by one or more entity graphs. Mappings can be created based on explicit relationships between entities in the entity graph 232 and/or implicit relationships between entities that are based on, for example, statistics. For instance, a statistical analysis of online interactions between users and documents can be used to identify or determine implicit relationships between, for example, users and document topics. As an example, a statistical correlation between a user and a document topic can be determined based on the user's online interactions with various documents. If the statistical correlation between a user and a skill is higher than a threshold confidence value (e.g., greater than eighty or ninety percent), a link between the user and the skill can be implied. If the statistical correlation between the user and the skill is lower than the threshold confidence value (e.g., lower than eighty or ninety percent), a link between the user and the skill may not be implied based on the statistics. A graphical representation of examples of mappings is shown in FIG. 15, described below.

Figure 5:
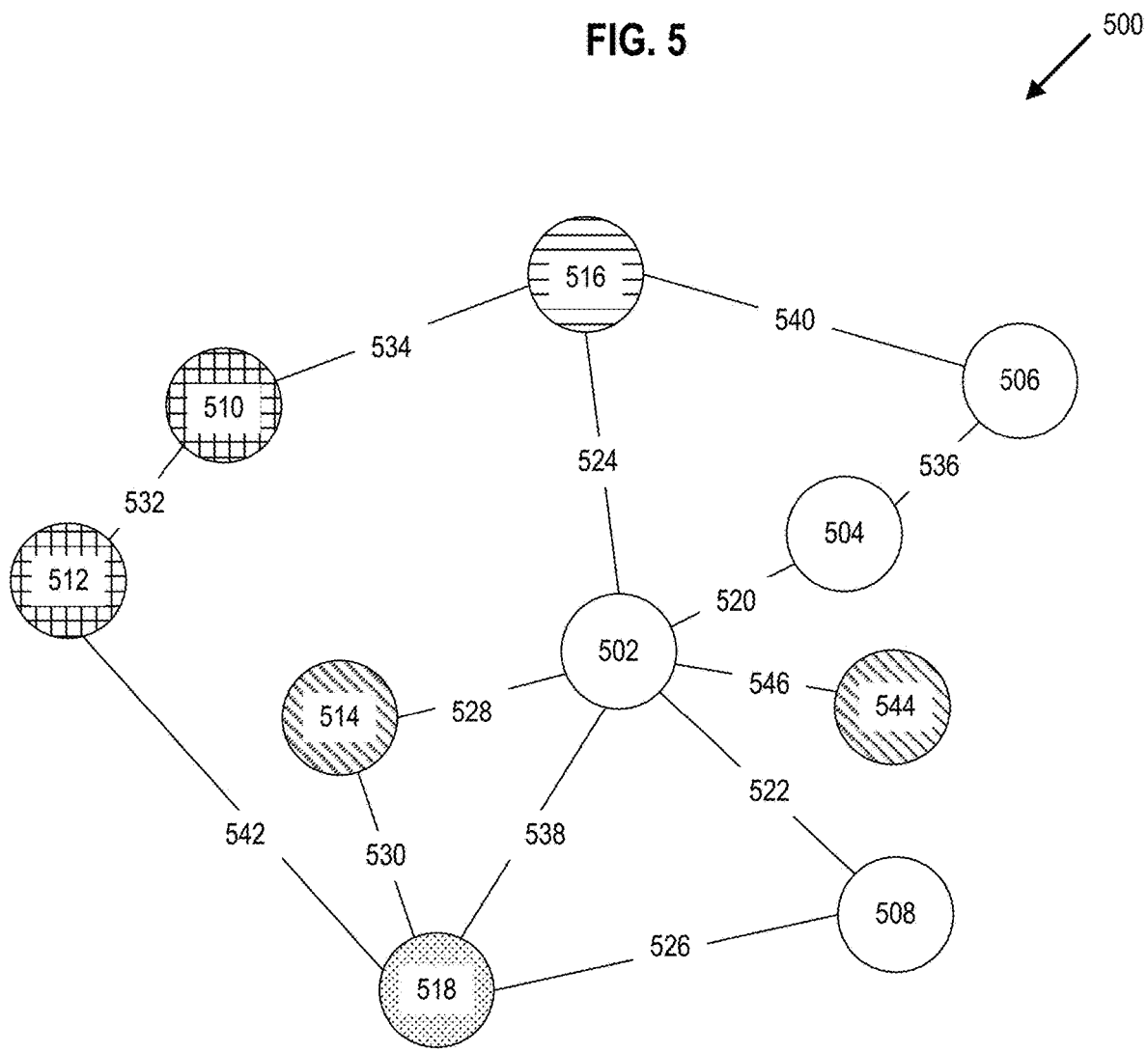
FIG. 5 is an example of an entity graph in accordance with some embodiments of the present disclosure.

Portions of entity graph 232 can be re-generated or updated based on changes and updates to the stored data. Also, entity graph 232 can refer to an entire system-wide entity graph or to only a portion of a system-wide graph. For instance, entity graph 232 can refer to a subset of a system-wide graph, where the subset pertains to a particular user or group of users of application software system 230, or to a particular document or group of documents distributed by application software system 230. An example of an entity graph is shown in FIG. 5, described below.

In some implementations, a knowledge graph 236 is a subset or a superset of entity graph 232. For example, in some implementations, knowledge graph 236 includes multiple different entity graphs 232 that are joined by edges. For instance, knowledge graph 236 can join entity graphs 232 that have been created across multiple different databases or software products. In some implementations, the entity nodes of the knowledge graph 236 represent concepts, such as product surfaces, verticals, or application domains. In some implementations, knowledge graph 236 includes a platform that extracts and stores different concepts across multiple different software applications. Examples of concepts include job, resume, learning course, and news feed. The knowledge graph 236 can be used to generate and export content and entity-level embeddings that can be used to discover new interrelationships between entities and/or concepts, which then can be used to identify related topics or phrases. As with other portions of entity graph 232, knowledge graph 236 can be used to compute various types of affinity scores and/or statistical correlations between entities and/or concepts. Knowledge graph 236 is a graph-based representation of data stored in data storage system 280, described below. Knowledge graph 236 represents relationships, also referred to as mappings, between entities or concepts as edges, or combinations of edges, between the nodes of the graph. In some implementations, mappings between different pieces of data used by application software system 230 or across multiple different application software systems are represented by the knowledge graph 236. Mappings can be created based on explicit relationships between entities in the knowledge graph 236 and/or implicit relationships between entities that are based on, for example, statistical calculations. For instance, a statistical analysis of online interactions between users and online job applications can be used to identify or determine implicit relationships between, for example, users and skills. As an example, a statistical correlation between a user and a skill can be determined based on the user's online interactions with various job postings. If the statistical correlation between a user and a skill is higher than a threshold confidence value (e.g., greater than eighty or ninety percent), a link between the user and the skill can be implied. If the statistical correlation between the user and the skill is lower than the threshold confidence value (e.g., lower than eighty or ninety percent), a link between the user and the skill may not be implied based on the statistics. Portions of knowledge graph 236 can be re-generated or updated based on changes and updates to the stored data. Also, knowledge graph 236 can refer to an entire system-wide knowledge graph or to only a portion of a system-wide knowledge graph.

In the example of FIG. 2, application software system 230 includes a search engine 234. Search engine 234 is a software system designed to search for and retrieve information by executing queries on data stores, such as databases and/or online systems. The queries are designed to find information that matches specified criteria, such as keywords and phrases. For example, search engine 234 is used to retrieve data by executing queries on various data stores of data storage system 280 or by traversing entity graph 232.

Content moderation system 250 includes a system that provides an online portal for human review of submissions of digital content items, such as documents. Content moderation submissions include user-generated reports that identify content items for human review. For example, a user viewing a document output by a generative language model and published by the generative collaborative publishing system can submit a report on the document if the user believes that the document violates a community standard or policy of the online system. For example, if an invited contributor to a document created by a generative language model identifies the document as containing profanity or explicit content, the contributor can report the document through content moderation system 250.

Content moderation submissions are created using, e.g., an online form, and are routed to content moderation system 250 through, e.g., the network 220. Content moderation submissions can also or alternatively include reports that are generated by automated or semi-automated systems such as components of filtering mechanism 110, grouping mechanism 112, rating tool 114, editing tool 116 or decision mechanism 118. Content moderation system 250 can be implemented as a component of application software system 230 or content serving system 260. Output of content moderation system 250 can be used to control the distribution of documents through the online system. For example, the distribution of a user-reported document may be reduced or modified after a human reviewer using content moderation system 250 reviews and verifies the report. For instance, in response to a content moderation submission, a document can be automatically marked as low quality, which reduces the distribution of the document on the network. Alternatively or in addition, in response to a content moderation submission, a document can be automatically marked for take down, which removes the document from distribution on the network. Any content moderation action affecting the distribution of a document on the network may occur prior to any human review of the document, for example based on the volume of reports being received for the document, and a human review may be used to confirm or reverse the result of the automatic review.

Content serving system 260 includes a data storage service, such as a web server, which stores digital content items, including documents generated by generative language models, and distributes digital content items, including documents generated by generative language models, to, for example, web sites and mobile apps or to particular slots of web sites or mobile app user interface display screens, using network 220. For instance, content serving system 260 scores and ranks digital content items, including documents, for placement in user feeds.

In some embodiments, content serving system 260 processes requests from, for example, application software system 230, and distributes digital content items, including documents generated by generative language models, to user systems 210 or other destinations, such as content moderation system 250, in response to requests. A request is, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click or a page load. In some implementations, content serving system 260 is part of application software system 230 or generative collaborative publishing system 240. In other implementations, content serving system 260 interfaces with a publishing subsystem of generative collaborative publishing system 240. For example, once the publishing subsystem has published a document to the network, content serving system 260 determines the target destinations and timing for delivery of the document to various end user devices on the network.

Event logging service 270 captures and records network activity data generated during operation of application software system 230, including user interface events generated at user systems 210 via user interface 212, in real time, and formulates the user interface events into a data stream that can be consumed by, for example, a stream processing system. Examples of network activity data include page loads, clicks on content items or graphical user interface control elements, views of content items, contributions, posts, and social action data such as likes, shares, comments, and social reactions (e.g., "insightful," "curious," etc.). For instance, when a user of application software system 230 via a user system 210 clicks on a user interface element, such as a document, a link, or a control such as a view, comment, share, or reaction button, or uploads a file, or creates a contribution or a post, loads a web page, or scrolls through a feed, etc., event logging service 270 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

For instance, when a user creates contribution or a post, or inputs a social action on a contribution or a post, event logging service 270 stores the corresponding event data in a log. Event logging service 270 generates a data stream that includes one record of real-time event data for each user interface event that has occurred. Event data logged by event logging service 270 can be used, for example, to generate affinity scores and/or to train machine learning models.

Data storage system 280 includes data stores and/or data services that store digital data received, used, manipulated, and produced by application software system 230 and/or generative collaborative publishing system 240, including documents, metadata, prompts, attribute data, network activity data, machine learning model training data, machine learning model parameters, and machine learning model inputs and outputs.

In the example of FIG. 2, data storage system 280 includes an attribute data store 282, an activity data store 284, a template data store 285, a document data store 286, and a training data store 288. Attribute data store 282 stores data relating to users, such as skill set data, which is used by the generative collaborative publishing system to, for example, generate prompts, match potential contributors to documents, and generate contributor scores, contribution scores, and affinity scores. Activity data store 284 stores data relating to network activity, e.g., user interface event data extracted from application software system 230 by event logging service 270, which is used by generative collaborative publishing system to, for example, match documents with potential contributors and generate contributor scores, contribution scores, and affinity scores. Template data store 285 stores prompt templates and related metadata, which are generated and used be the generative collaborative publishing system to generate documents. Document data store 286 stores documents generated by generative language models, related metadata, and related contributions, which are generated and processed by the generative collaborative publishing system. Training data store 288 stores data generated by the generative collaborative publishing system that can be used to train or fine tune generative language models and/or other machine learning models, such as pre-publication feedback data and post-publication feedback data.

In some embodiments, data storage system 280 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 280 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 280 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 280 can be part of computing system 100 or accessed by computing system 100 over a network, such as network 220.

Search engine optimization system 290 includes an online service that processes network traffic data relating to search engine results pages. Search engine optimization system 290 generates and publishes search optimization data, such as data about the frequency of use of various search terms over time. Search optimization data can be used, for example, to identify currently upwardly or downwardly trending topics and search terms. In some implementations, the generative collaborative publishing system interfaces with search engine optimization system 290 in the process of generating prompts. For example, search engine optimization system 290 can be used as a filter for prompts. As an example, based on search optimization data produced by search engine optimization system 290 for a particular article title, e.g., an article title generated by a generative language model, the article title may or may not be used to formulate a prompt for the generative language model to generate a document based on the article title. In some implementations, search optimization data produced by search engine optimization system 290 is included in a prompt to a generative language model. For example, search engine optimization data can be used as part of an instruction or as an example of the type of output the generative language model is to produce, such that, in effect, the generative language model mimics the output of the search engine optimization system 290.

While not specifically shown, it should be understood that any of user system 210, application software system 230, generative collaborative publishing system 240, content moderation system 250, content serving system 260, event logging service 270, data storage system 280, and search engine optimization system 290 includes an interface embodied as computer programming code stored in computer memory that when executed causes a computing device to enable bidirectional communication with any other user system 210, application software system 230, generative collaborative publishing system 240, content moderation system 250, content serving system 260, event logging service 270, data storage system 280, and search engine optimization system 290 using a communicative coupling mechanism. Examples of communicative coupling mechanisms include network interfaces, inter-process communication (IPC) interfaces and application program interfaces (APIs).

Each of user system 210, application software system 230, generative collaborative publishing system 240, content moderation system 250, content serving system 260, event logging service 270, data storage system 280, and search engine optimization system 290 is implemented using at least one computing device that is communicatively coupled to electronic communications network 220. Any of user system 210, application software system 230, generative collaborative publishing system 240, content moderation system 250, content serving system 260, event logging service 270, data storage system 280, and search engine optimization system 290 can be bidirectionally communicatively coupled by network 220. User system 210 as well as other different user systems (not shown) can be bidirectionally communicatively coupled to application software system 230.

A typical user of user system 210 can be an administrator or end user of application software system 230, generative collaborative publishing system 240, content moderation system 250, and/or content serving system 260. User system 210 is configured to communicate bidirectionally with any of application software system 230, generative collaborative publishing system 240, content moderation system 250, and/or content serving system 260 over network 220.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 210, application software system 230, generative collaborative publishing system 240, content moderation system 250, content serving system 260, event logging service 270, data storage system 280, and search engine optimization system 290 are implemented using computer software, hardware, or software and hardware, and can include combinations of automated functionality, data structures, and digital data, which are represented schematically in the figures. User system 210, application software system 230, generative collaborative publishing system 240, content moderation system 250, content serving system 260, event logging service 270, data storage system 280, and search engine optimization system 290 are shown as separate elements in FIG. 1 for ease of discussion but, except as otherwise described, the illustration is not meant to imply that separation of these elements is required. The illustrated systems, services, and data stores (or their functionality) of each of user system 210, application software system 230, generative collaborative publishing system 240, content moderation system 250, content serving system 260, event logging service 270, data storage system 280, and search engine optimization system 290 can be divided over any number of physical systems, including a single physical computer system, and can communicate with each other in any appropriate manner.

Figure 23:
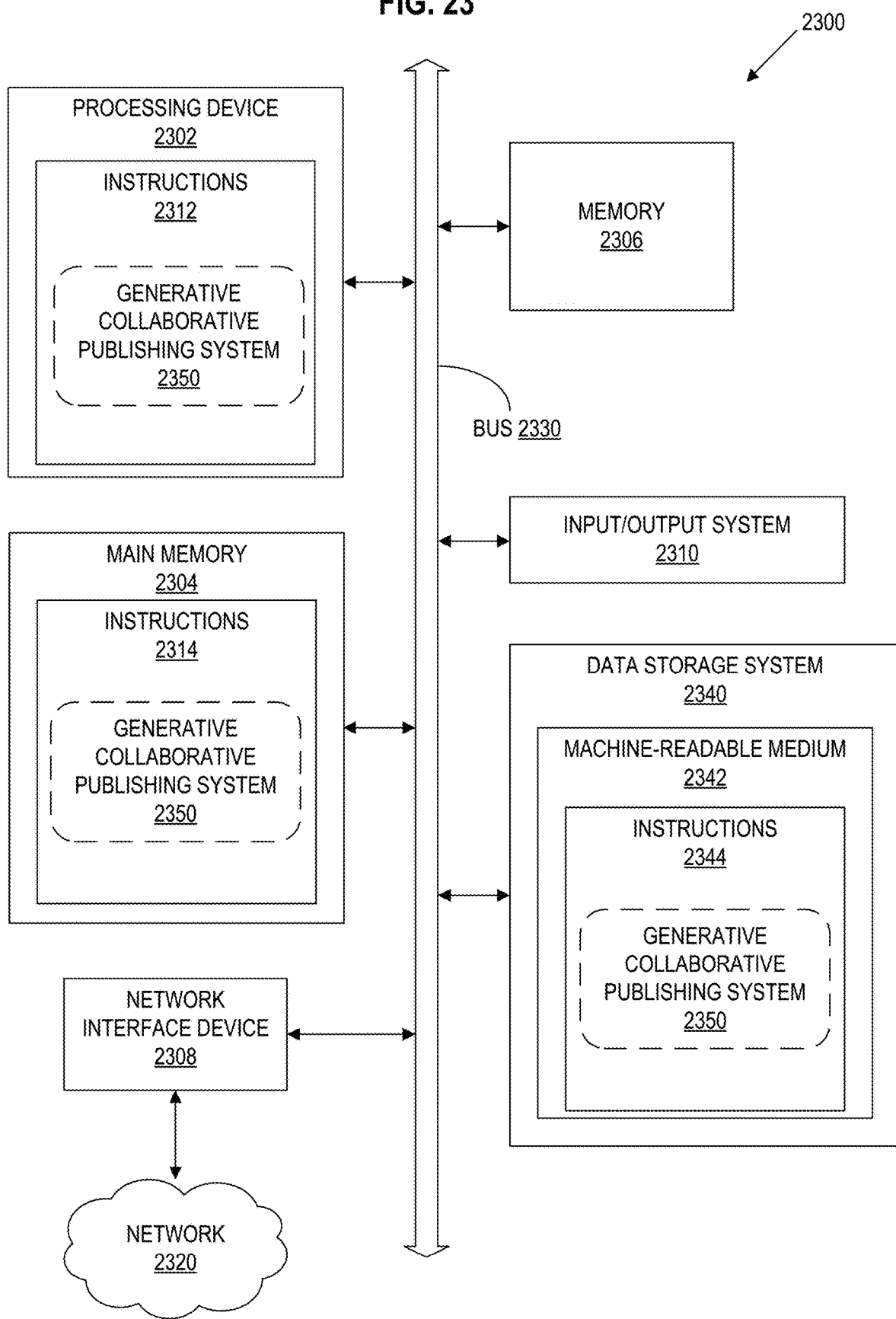
FIG. 23 is a block diagram of an example computer system including components of a generative collaborative publishing system in accordance with some embodiments of the present disclosure.

In FIG. 23, the combination of pre-publication interface 214, post-publication interface 216, and generative collaborative publishing system 240 is collectively represented as generative collaborative publishing system 2350 for ease of discussion only. Pre-publication interface 214, post-publication interface 216, and generative collaborative publishing system 240 are not required to be implemented all on the same computing device, in the same memory, or loaded into the same memory at the same time. For example, access to either or both of pre-publication interface 214 and post-publication interface 216 can be limited to different, mutually exclusive sets of user systems. Additionally, while pre-publication interface 214 and post-publication interface 216 typically may be implemented on user systems, generative collaborative publishing system 2350 typically may be implemented on a server computer or group of servers. Further details with regard to the operations of pre-publication interface 214, post-publication interface 216, and generative collaborative publishing system 240 are described below.

Figure 3:
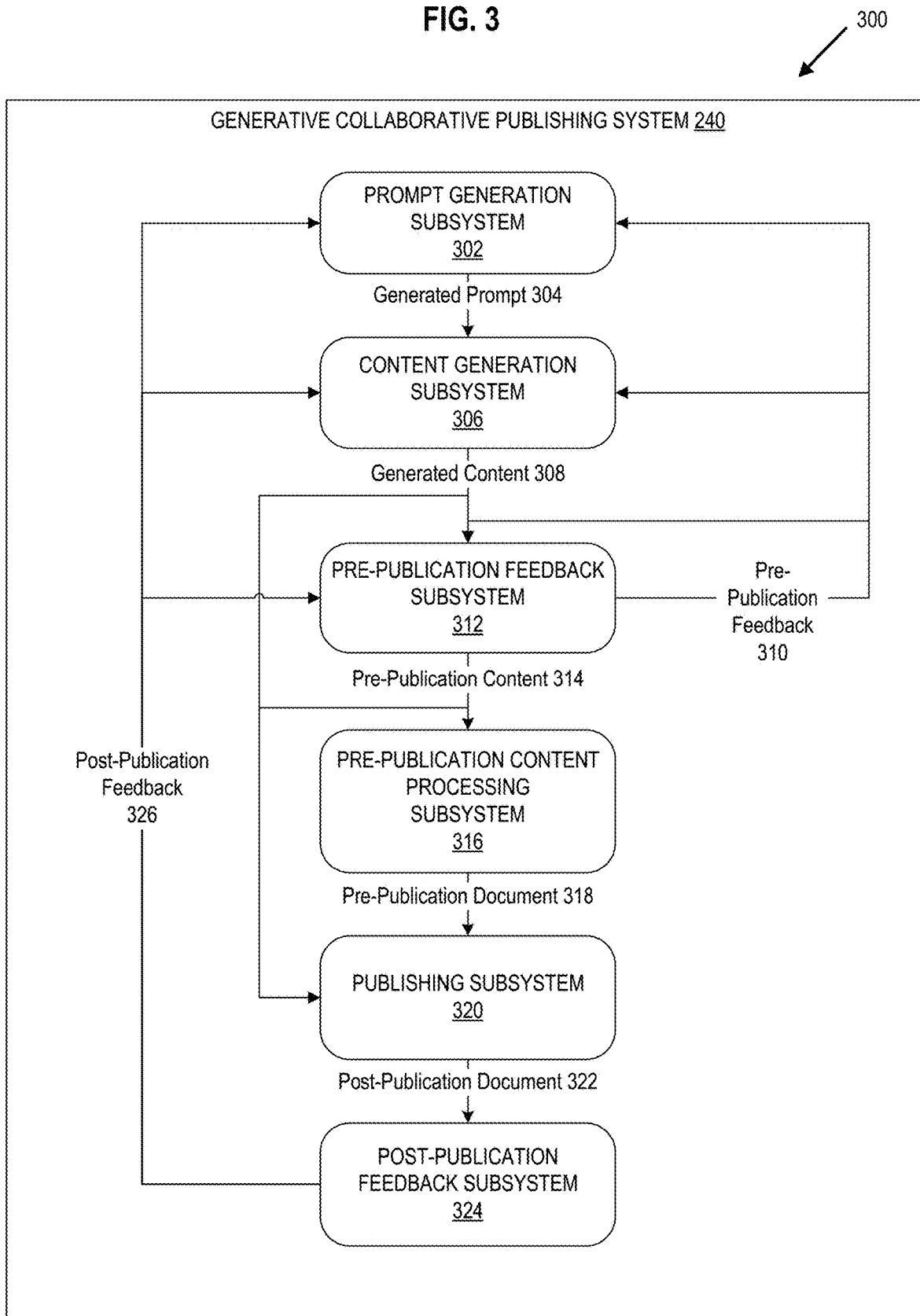
FIG. 3 is a flow diagram of an example method for generative collaborative document publishing using components of a generative collaborative publishing system in accordance with some embodiments of the present disclosure.

FIG. 3 is a flow diagram of an example method for generative collaborative document publishing using components of a generative collaborative publishing system in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 3, generative collaborative publishing system 240 includes a prompt generation subsystem 302, a content generation subsystem 306, a pre-publication feedback subsystem 312, a pre-publication content processing subsystem 316, a publishing subsystem 320, and a post-publication feedback subsystem 324. Other implementations of generative collaborative publishing system 240 include some or all of the components shown in FIG. 3 and/or other components.

Prompt generation subsystem 302 generates and outputs one or more prompts, such as generated prompt 304. In some implementations, prompt generation subsystem 302 determines a seed and outputs a generated prompt 304 based on the seed. As used herein, seed may refer to a piece of content, such as a piece of text, an image, or an audio recording. In some implementations, prompt generation subsystem 302 extracts the seed from application software system 240. For instance, in the domain of professional social network services or search engines, prompt generation subsystem 302 extracts a trending or highly popular skill description from a social network and uses the extracted skill description as a seed for the generated prompt 304.

In some implementations, a skill name or a related phrase associated with a skill name is used as a seed. For instance, if a skill name is advertising, a related phrase could be branding and identity. Related phrases can be generated, for example, by tasking a generative language model to enumerate topics or related phrases associated with a skill name, using co-occurrences across a set of related content, such as related searches, and/or using co-occurrences of words in user profiles that contain the skill. As another example, to determine currently popular skills or topics, a generative language model is used to generate a set of terms, e.g., keywords, skills, or topics, the search engine optimization system 290 is used to determine the currently most popular terms in the set of terms, and then only the most popular terms as determined by the search engine optimization system 290 are used to generate prompts for document titles or documents. In other implementations, the seed is obtained by prompt generation subsystem 302 as a parameter value, e.g., the seed is passed to prompt generation subsystem 302 from another application, process, or service, using an application program interface (API), or the seed is received as input from a front end user interface, such as a front end of application software system 230.

To produce generated prompt 304, prompt generation subsystem 302 applies a prompt template to the seed. A prompt template includes a format and/or specification for arranging data and/or instructions, including the seed, for input a generative language model so that the generative language model can read and process the inputs and generate corresponding output. For instance, a prompt template contains a placeholder for the seed as well as one or more other placeholders for other data and/or parameter values or instructions. An example of a prompt template is: [seed] [instructions or examples] [model parameters], where [seed] is the placeholder for the current input (e.g., a document topic or title), [instructions or examples] are placeholders for instructions for the generative model (e.g., write an article) or examples of the kind of output the generative language model is to produce (e.g., text written in a particular language, such as French), and [model parameters] are placeholders for required or optional parameter values used by the generative language model to generate output (e.g., output length, tone, style). Table 1 below illustrates examples of prompt configurations in which the prompt template is provided in a type of "wrapper."

TABLE 1

Examples of Prompt Configuration.

Write a III-JJJ token article on [subtopic] in the context of [skillName] with [title] in N separate steps: generate an outline (but do not output it) and then expand on each section in ONE paragraph. NEVER USE BULLET POINTS. The article will be composed of M sections composed of a single subheading followed by ONE paragraph.
Follow these rules EXACTLY:
RULE 1. Every section has a NN-MM word subhead starting with ### and is followed by a SINGLE paragraph that has NNN-MMM sentences.
RULE 2. Introduction does NOT have a subhead. Never start a subhead with \'Step\' or \'Section\' or similar lead in.
RULE 3. Write with INFORMATIVE and CONVERSATIONAL tone.
RULE 4. Use second person, no 'I.'
RULE 5. Define acronyms and technical terms. Assume some basic knowledge but explain concepts.
RULE 6. No statistics, studies, or links.
RULE 7. Do NOT write a conclusion.
RULE 8. Each section MUST be written as a complete paragraph. NO bullet points, hyphen lists, or other structured lists.
XXXXX
Write a SHORT SHARE POST for the article with a CONVERSATIONAL tone. Follow these 5 rules.
RULE 1: IT MUST BE 1 paragraph with NNNN to MMMM sentences.
RULE 2: End with ONLY 1 question that prompts someone to add their opinion.
RULE 3: Do NOT be promotional.
RULE 4: Do NOT use the phrase "in the comments".
RULE 5: Do NOT use the word 'I'.
XXXXX
SEO Headline Rules:
1. Write a SEO headline for the article '{seoQuery}' in the context of '{skillName}' with '{prompt}'.
2. The SEO headline MUST be between I-J tokens.
XXXXX
SEO Description Rules:
1. Write a SEO description for the article '{seoQuery}' in the context of '{skillName}' with '{prompt}'.
2. The SEO description MUST be between II-JJ tokens.
Output according to following structure instructions: Separate each output with XXXXX.
[Example]
ARTICLE
XXXXX
SHORT SHARE POST
XXXXX
SEO HEADLINE
XXXXX
SEO DESCRIPTION
[End of Example]
ARTICLE As shown in Table 1, the example prompt configuration contains specific instructions on how to generate multiple discrete sub-outputs in a single output, for example, an article, a share post, and inputs for a search optimization system. Additionally, the example prompt configuration contains requirements that pertain to the structure of the output, e.g., instructions for how the generative language model is to structure the output so that a machine can determine which output corresponds to which input instruction. In the example prompt configuration, brackets denote parameters that can be filled in or replace with specific data values, e.g., at runtime.

Additionally, the example prompt configuration contains multiple lists or sets of rules and a machine parable delimited output format. The number of lists or sets of rules and the number of rules in each set are determined by the requirements of a particular design or implementation of the generative collaborative publishing system. For example, the number of rule sets and/or the number of rules in each rule set may be larger for long-form text implementations or smaller for non-long-form text. Further, the example prompt configuration uses parameters such as N, M, I, J, etc., to signify data values that can be set according to the requirements of a particular design or implementation of the generative collaborative publishing system. For example, the values of N, M, I, J, etc. may be larger for long-form text implementations or smaller for non-long-form text.

Additional examples of seeds, prompt templates, and prompts are described in more detail below with reference to FIG. 4, FIG. 5, FIG. 6, FIG. 7, and FIG. 8.

Content generation subsystem 306 obtains generated prompt 304 produced by prompt generation subsystem 302 and applies a generative language model to generated prompt 304. In response to input of generated prompt 304 into the generative language model, the generative language model of content generation subsystem 306 produces and outputs machine-generated content 308, which is based on the generated prompt 304. Generated content 308 includes, for example, a document topic, a document title, or content of one or more documents. Examples of generated content 308 are described below with reference to FIG. 13. An implementation of content generation subsystem 306 is described in more detail below with reference to FIG. 7.

Content generation subsystem 306 outputs generated content 308 directly to publishing subsystem 320, in some instances. In other instances, content generation subsystem 306 outputs generated content 308 to pre-publication content processing subsystem 316, and pre-publication content processing subsystem 316 outputs pre-publication document 318 either directly to publishing subsystem 320 or to pre-publication feedback subsystem 312 (e.g., the order of flow between pre-publication feedback subsystem 312 and pre-publication content processing subsystem 216 is the reverse from the order shown in FIG. 3). In still other instances, content generation subsystem 306 outputs generated content 308 to pre-publication feedback subsystem 312, and pre-publication feedback subsystem 312 outputs pre-publication content 314 either directly to publishing subsystem 320 or to pre-publication content processing subsystem 316.

In some implementations, prompt-content pairs, such as a generated prompt 304 and a corresponding machine-generated content 308 generated by the generative language model of content generation subsystem 306 based on the generated prompt 304, are returned to either or both of prompt generation subsystem 302 and content generation subsystem 306 as pre-publication feedback 310. For example, prompt generation subsystem 302 uses generated prompt 304-content 308 pairs to score and select prompt templates for future prompts. As another example, content generation subsystem 306 formulates training data based on generated prompt 304-content 308 pairs and uses the training data to train or fine tune the generative language model of content generation subsystem 306 or a generative language model used by prompt generation subsystem 302 (which may be the same as the generative language model used by content generation subsystem 306 or one or more different generative language models).

Pre-publication feedback subsystem 312 obtains generated content 308 produced by content generation subsystem 306 and applies a set of pre-publication feedback mechanisms to generated content 308 before the generated content 308 is published or surfaced to a human reviewer for evaluation. In some examples, the set of pre-publication feedback mechanisms can function as a substitute for human review using, e.g., scoring models that have been trained on the results of actual previously conducted human reviews. The set of pre-publication feedback mechanisms includes filtering mechanism 110 and/or grouping mechanism 112, described above, in some implementations. For example, pre-publication feedback subsystem 312 includes a set of scoring models and/or a set of classification models that score or label the generated content 308 based on a comparison of the generated content 308 to one or more different categories. The different categories against which the generated content 308 are compared can be determined and varied based on the requirements of a particular design of the generative collaborative publishing system 240, and can include, for example, various types of spam filters and/or relevance ranking models. In some implementations, pre-publication feedback subsystem 312 also or alternatively includes one or more tools for human reviewers, such as rating tool 114 and/or editing tool 116, described above. An example implementation of pre-publication feedback subsystem 312 is described in more detail below with reference to FIG. 9. Examples of pre-publication review tools are shown in FIG. 10 and FIG. 11, described below.

Any one or more of the outputs generated by any of the components of pre-publication feedback subsystem 312 can be returned to prompt generation subsystem 302 and/or content generation subsystem 306 to be used to formulate pre-publication feedback 310. For example, pre-publication feedback 310 can include a score or label generated by a spam filter or relevance model of pre-publication feedback subsystem 312 for a particular item of generated content 308 based on a particular prompt 304, where the score or label is joined with the respective generated content 308 and/or the respective prompt 304 to form the pre-publication feedback 310. Join as used herein may refer to a concatenation function, a database join operation, a reference or pointer, or another mechanism that links different pieces of data with each other.

Similarly, the pre-publication feedback 310 can include a rating generated by rating tool 114 and/or one or more edits generated by editing tool 116 for a particular item of generated content 308 based on a particular prompt 304, where the rating and/or edits are joined with the respective generated content 308 and/or the respective prompt 304 to form the pre-publication feedback 310. The pre-publication feedback 310 generated by pre-publication feedback subsystem 312 is used by prompt generation subsystem 302 to, for example, score and select prompt templates for future prompts. As another example, content generation subsystem 306 formulates training data based on pre-publication feedback 310 generated by pre-publication feedback subsystem 312 and uses the training data to train or fine tune the generative language model of content generation subsystem 306 or a generative language model used by prompt generation subsystem 302.

Pre-publication feedback subsystem 312 generates and outputs pre-publication content 314. In some cases, pre-publication content 314 includes machine-generated content 308 that has passed through one or more of the filters, review tools, and/or rating tools of pre-publication feedback subsystem 312. For example, pre-publication content 314 includes machine-generated content 308 that is not labeled as any type of spam, has a relevance score that exceeds a relevance score threshold, has a rating score that exceeds a rating score threshold, or has been reviewed and/or edited and/or approved by a human reviewer through a pre-publication editing tool.

The threshold values for content relevance and ratings are determined based on the requirements of a particular design of the generative collaborative publishing system 240. The threshold values can be different for different groupings (e.g., topics) of generated documents. For instance, skills related to health care or other sensitive domains could have higher thresholds than skills related to software engineering or cooking, in order to prevent the publication of harmful or incorrect auto-generated content. In some cases the thresholds can be set high enough for a particular grouping of documents such that every document in that grouping needs to go through human review before publication. In some implementations, there are different levels of ratings, where the rating levels are based on readability and/or relevance of content output by a generative language model relative to ground-truth examples of human-generate content. For instance, the rating levels can include a range of scores between 1 and 5, inclusive, where a score of 5 could represent content that closely matches the ground-truth human-generated content in style, syntax, substance, etc. and a score of 1 could represent content that does not match the ground-truth human-generated content at all. If the generated content 308 has passed through an editing tool, pre-publication content 314 can include a combination of machine-generated content 308 and one or edits that have been applied to the machine-generated content 308 through the pre-publication editing tool.

In some implementations, certain types or groups of documents bypass the pre-publication feedback subsystem 312 or at least those portions of the pre-publication feedback subsystem 312 that allow for human review. For example, based on confidence scores output by one or more pre-publication scoring models or classification models, e.g., filtering mechanisms, those particular types or groups of documents can be published without pre-publication human review. It should be noted that the confidence scores can improve based on pre-publication feedback and/or post-publication feedback, such that over time, the generative collaborative publishing system is able to refine prompts and/or fine tune the generative language model so that more and more of the documents generated by generative language models can be published without any human review.

Figure 13:
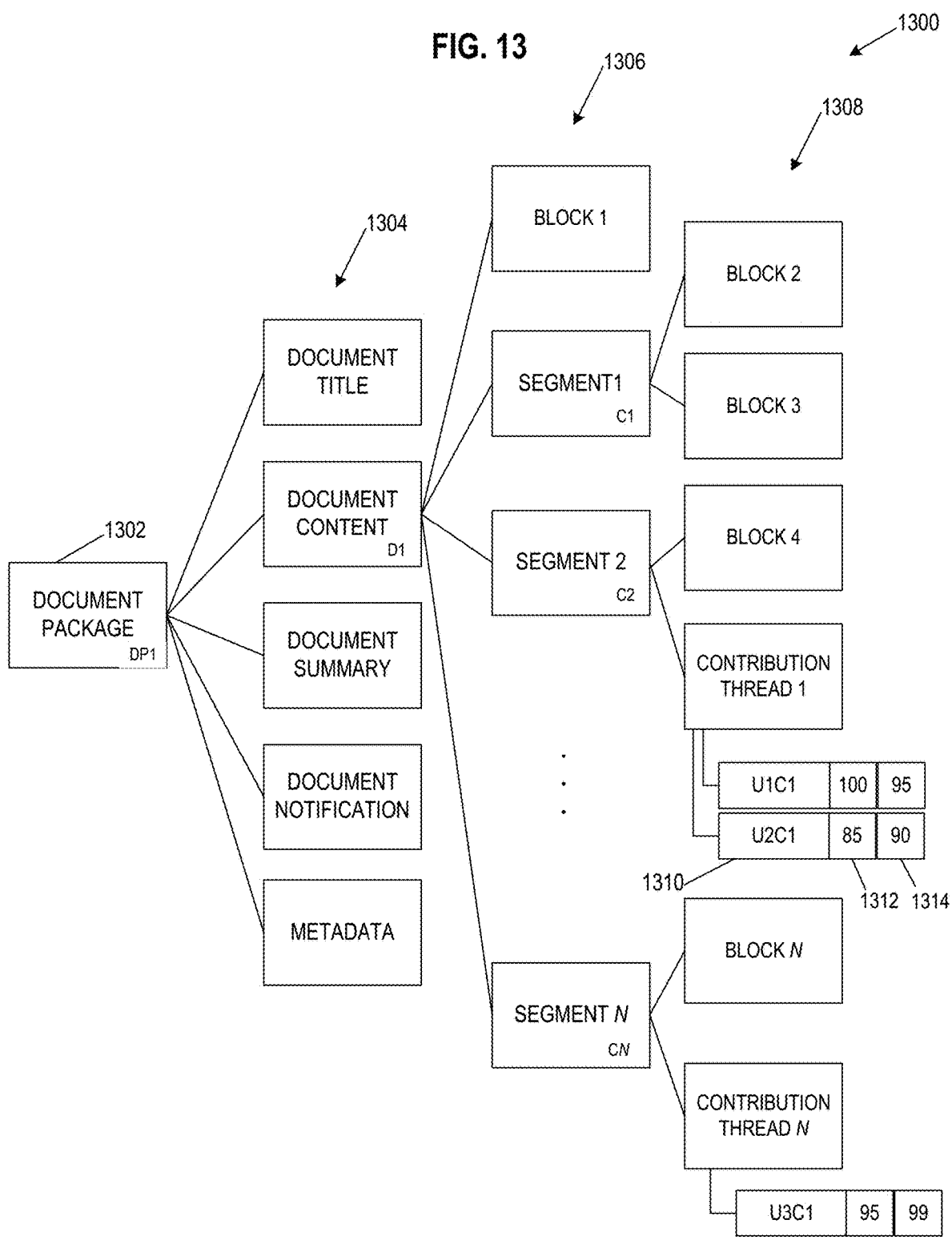
FIG. 13 is a graphical representation of an example of components of a document package in accordance with some embodiments of the present disclosure.

Pre-publication content processing subsystem 316 converts the pre-publication content 314 into a pre-publication document 318. In some implementations, pre-publication content processing subsystem 316 organizes the pre-publication content 314 into separately contributable segments to which invited contributors can add post-publication contributions via post-publication feedback subsystem 324, described below. An example of a segment architecture used by pre-publication content processing subsystem 316 in some implementations is shown in FIG. 13, described below.

In some implementations, pre-publication processing subsystem 316 is positioned between content generation subsystem 306 and pre-publication feedback subsystem 312. For example, pre-publication content processing subsystem 316 segments the pre-publication content 314 before the document is sent to pre-publication feedback system 312. After segmentation by pre-publication content processing subsystem 316, human editors can interact with, re-arrange, review, rate, or reject content on a segment-wise level, and/or can create new segments, rather than being required to evaluate only the entire document as a whole.

Publishing subsystem 320 formulates pre-publication document 318 into a publishable document and causes the publishable document to be published to a network. Publishing a document as described herein includes distributing a document to one or more user accounts of an online system such as application software system 230, over a network. In some implementations, formulating a publishable document includes dividing a document into segments. For instance, publishing subsystem 320 can include pre-publication content processing subsystem 316, which divides pre-publication content 314 into segments as described above. In some implementations, publishing subsystem 320 includes or interfaces with content serving system 260. For example, publishing subsystem 320 identifies publishable documents to content serving system 260 and content serving system 260 serves the documents to various user accounts via, for example, assignments of the documents to slots of user feeds. Thus, alone or in combination with pre-publication content processing subsystem 316 and/or content serving system 260, operation of publishing subsystem 320 on pre-publication document 318 results in distribution of a post-publication document 322 to a network, such as a user network, for example, a social network-based service or application.

In some implementations, publishing subsystem 320 alone or in combination with post-publication feedback subsystem 324 publishes a package of related documents and not just a single document. In some examples, the different but related documents of a document package produced using the generative language model are published using different channels. For example, in some implementations, publishing subsystem 320 publishes a document to a web page, publishes a summary of the document in a post to a social network-based service or application, and publishes a notification of the document to selected users of the network via a messaging system. An example of a document package is shown in FIG. 13, described below. In some implementations, while not specifically shown in FIG. 3, documents or document packages can bypass the pre-publication feedback subsystem 312 and proceed straight to publishing subsystem 320, for example, because a confidence score satisfies a readability threshold.

Post-publication feedback subsystem 324 receives and tracks post-publication feedback 326 on post-publication document 322. Examples of post-publication feedback 326 include contributions submitted by selected contributors to published documents, social action data linked with published documents, and content moderation reports on published documents submitted by users of the online system, e.g., application software system 230. Contributions include user-associated digital content. User-associated digital content includes, for example, content that is hand-generated by the user (e.g., typed or uploaded or linked with a document). User-associated content also or alternatively includes content that is machine-generated by, e.g., a generative model, in response to input (e.g., a user-submitted prompt) provided by the user to an automated content generation process. User-submitted prompts include inputs to generative language models, such as prompts that are handcrafted by a human user (as opposed to prompts that are machine-generated by an automated processes such as the automated processes described in connection with prompt generation subsystem 302 and/or FIG. 4).

While described here in connection with post-publication feedback subsystem 324, contributions are, alternatively or additionally, received from contributor users prior to publication, in some implementations. For instance, in some implementations, portions of the post-publication feedback subsystem 324 are included in pre-publication feedback subsystem 312. In some examples, the contributor user interface shown in FIG. 17, described below, is surfaced to contributor users as part of a pre-publication review mechanism or editing tool alternatively or in addition to being provided by a post-publication feedback subsystem.

In some implementations, post-publication feedback subsystem 324 returns post-publication feedback 326 to one or more of pre-publication feedback subsystem 312, content generation subsystem 306, or prompt generation subsystem 306. For example, a contribution to a published document 322 is used by prompt generation subsystem 302 to select a subsequent prompt template or to modify an existing prompt template.

As another example, a post-publication contribution to a published document 322 is joined with the prompt 304 used to generate the machine-generated content of the published document 322 to create training data for the generative language model of content generation subsystem 306, and the generative language model is trained or fine-tuned using the training data. As an additional example, post-publication feedback 326 includes social action data that is used to train one or more scoring models and/or classification models of pre-publication feedback subsystem 312.

Figure 4:
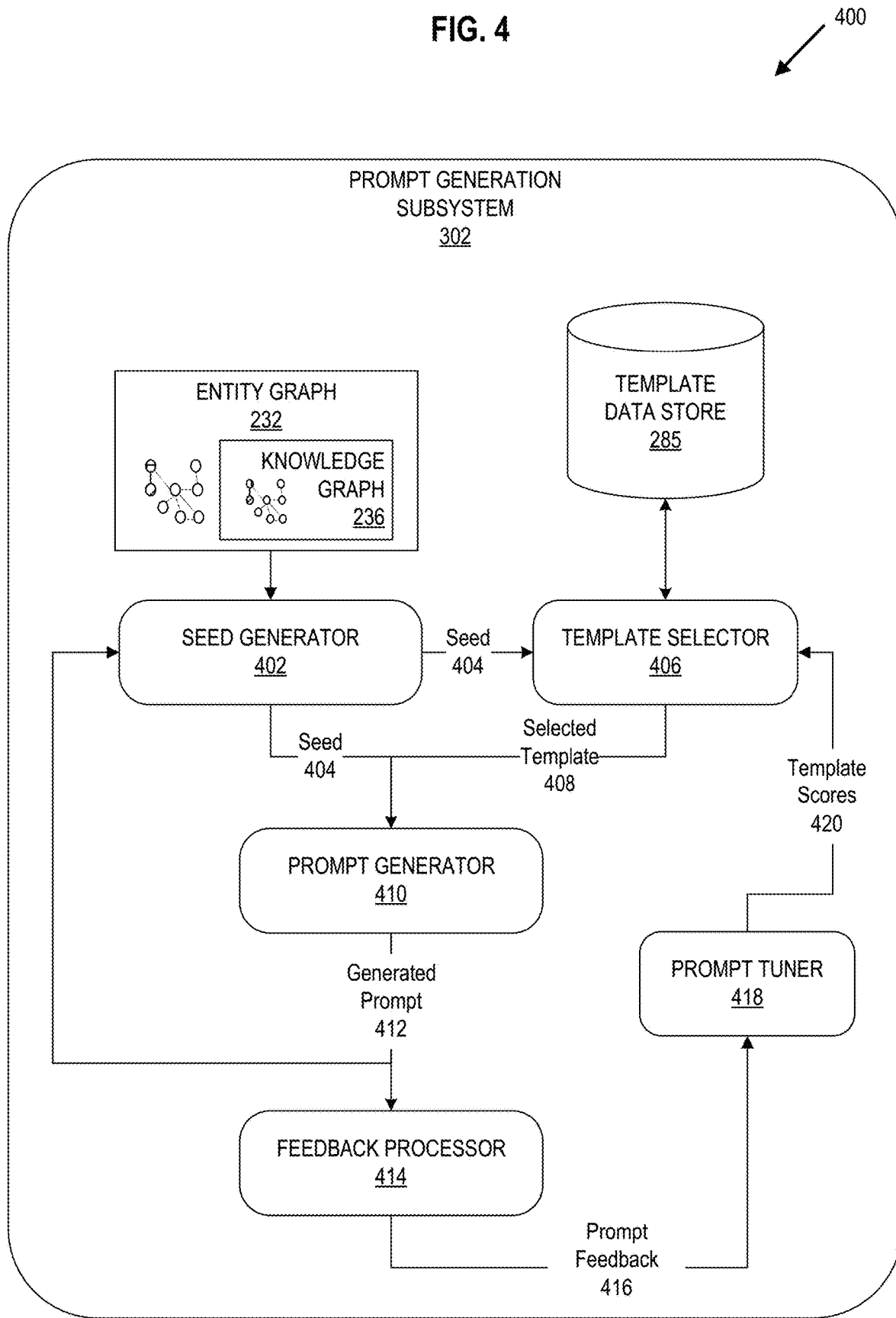
FIG. 4 is a flow diagram of an example method for automated prompt generation using components of a prompt generation subsystem in accordance with some embodiments of the present disclosure.

FIG. 4 is a flow diagram of an example method for automated prompt generation using components of a prompt generation subsystem in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 4, prompt generation subsystem 302 includes a seed generator 402, a template selector 406, a prompt generator 410, a feedback processor 414, and a prompt tuner 418. Seed generator 402 uses at least a portion of entity graph 232 and/or knowledge graph 236 to generate a seed 404. An example of an entity graph at least a portion of which can be used by seed generator 402 to generate a seed 404 is shown in FIG. 5, described below.

The following is an example of how an entity graph 232 can be used by seed generator 404 to generate a seed 404. As used herein, seed may refer to a piece of content, such as a piece of text, an image, or an audio recording. For example, a seed can be or relate to a professional attribute (e.g., a skill, a skill set, experience, a qualification, etc.). In the domain of social network services or search engines, seed generator 402 can traverse entity graph 232 to identify high scoring entities of a particular entity type within the entity graph. An entity may be a high scoring entity if, for example, a count of the number of edges connecting the entity to other entities in the entity graph 232 is greater than a threshold edge count value or if the entity's edge count is in the top k edge counts of all entities of a particular type within the entity graph 232, where k is a positive integer.

For instance, a skill set is a type of entity that includes data pertaining to one or more user's skills or capabilities. Skill set data can include, for example, job titles, job descriptions, skill names, skill descriptions, and/or education descriptions. In cases where a skill set is to be used as a seed, seed generator 402 filters entity graph 232 to create a subset of the entity graph 232 that only includes skill set entities. Seed generator 402 traverses the filtered subset of the entity graph 232 and selects the top k user skill sets of all of the skill sets in the entity graph based on a scoring criterion such as edge count. That is, for each of the skill set entities in the entity graph, seed generator 401 computes an edge count and ranks the skill set entities in descending order based on the computed edge count values.

The value of k is determined based on the requirements of a particular design or implementation of the prompt generation subsystem 302 and/or the generative collaborative publishing system. For instance, in some implementations, the value of k is set to a positive integer less than 10, or less than 100, while in other implementations, the value of k is set to a positive integer greater than 1000, between 1000 and 5000, or greater than 5000. Thus, in some implementations, seed generator 402 produces more than one seed 404 based on entity graph 232. Seed generator 402 assigns a unique seed identifier to each seed 404, in some implementations.

Each of the seeds produced by seed generator 402 can be used by prompt generator 410 to generate a different prompt 412. For example, a seed of "software engineer" and a different seed of "data scientist" each can be used by prompt generator 410 to generate different prompts 412. In other implementations, the seed 404 includes non-text data, such as digital imagery and/or recorded audio. For example, a digital image of a meme that includes a photograph of a person working in a lab could be used to generate a prompt based on "science." As another example, a speech recognition engine or transcription program can be applied to an audio recording to convert the recorded audio to text, and portions of the text transcription can be used as a seed 404.

Template selector 406 selects a prompt template 408 from template data store 285 based on one or more of seed 404 and template scores 420. Prompt templates stored in template data store 285 can include initial templates and engineered templates. An initial template includes a template that is created manually, or in a semi-automated or automated way by, for example, prompt engineers or users of the online system, without any system-generated feedback. An engineered template includes an initial template that has been created or modified, either manually or in a semi-automated or automated way, based on feedback such as prompt feedback 416. Initial templates and engineered templates are stored in template data store 285. The prompt templates stored in template data store 285 are indexed by a unique prompt template identifier and one or more keywords, in some implementations.

In some implementations, template selector 406 randomly selects an initial the prompt template 408 from a set of stored prompt templates. Template selector 406 uses random selection, for example, on an initial iteration of a generative language model, in cases where no engineered prompts are available, or in cases where all of the prompt templates in the set of stored prompt templates have the same template scores 420 (e.g., at initialization). When template scores 420 are available, template selector 406 ranks the set of stored prompt templates based on the template scores 420 and selects the highest-ranking prompt template, in some implementations.

Seed 404 and selected template 408 are inputs to prompt generator 410. Prompt generator 410 generates and outputs generated prompt 412 based on seed 404 and selected template 408. Prompt generator 410 generates a different prompt 412 for each seed 404. Prompt generator 410 can use a different template or the same template for different seeds. Prompt generator 410 includes the seed identifier of the seed 404 used to create the prompt 412 and the prompt template identifier of the prompt template 408 used to create the prompt 412, or references to the respective seed identifier and prompt identifier, in the generated prompt 412, in some implementations. Prompt generator 410 assigns a unique prompt identifier to each prompt 412. The prompt identifier can include, for example, the seed identifier and the prompt template identifier.

Figure 8:
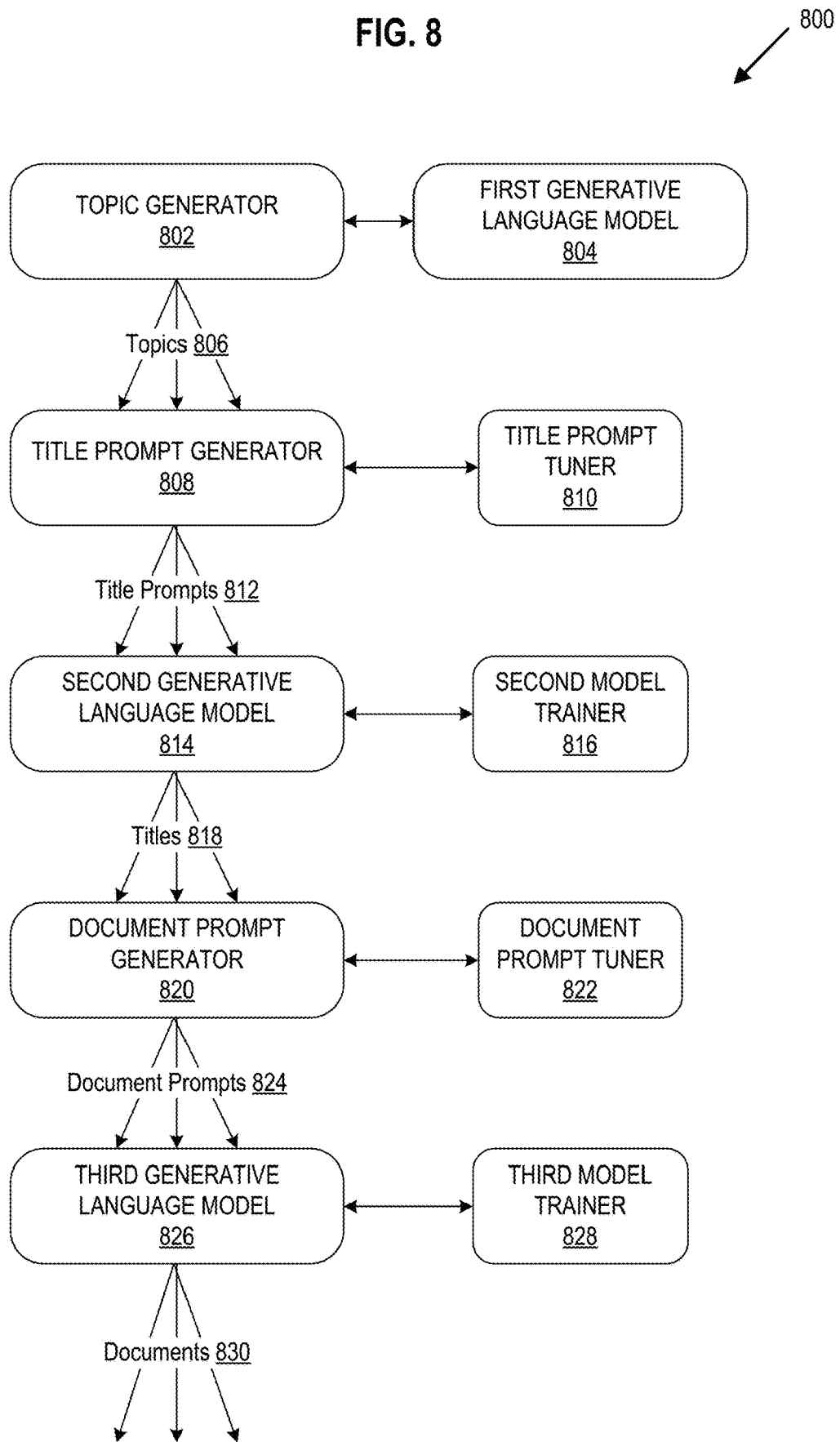
FIG. 8 is a flow diagram of an example method for automated content generation using components of a generative collaborative publishing system in accordance with some embodiments of the present disclosure.

In some implementations, generated prompt 412 is returned to seed generator 402. For example, in an iterative or multi-stage prompt generation process, prompt generator 410 generates a first prompt based on a seed and a first selected template, and then uses the first prompt as a seed to generate a new prompt using the same first selected template or a different prompt template selected from template data store 285. An example of an iterative or multi-stage prompt generation process is shown in FIG. 8, described below.

In some implementations, the generated prompt 412 is processed by feedback processor 414 to generate prompt feedback 416. Feedback processor 414 obtains feedback related to generated prompt 412. Examples of feedback that can be obtained by feedback processor 414 include pre-publication feedback 310 and/or post-publication feedback 326, described above.

Feedback processor 414 formulates prompt feedback 416 based on, for example, various combinations of pre-publication feedback 310 and/or post-publication feedback 416. An example of prompt feedback is a score, a label, or a rating, where the score, label or rating is applied to a prompt pair by a scoring model, a classification model, or a human reviewer. As an example, if a generative language model uses a generated prompt 412 to machine-generate a document that a spam filter classifies as spam, the spam label can be returned by the spam filter to feedback processor 414. In some implementations, feedback processor 414 uses the prompt template identifier to map the spam label to the corresponding prompt template 408 that generated the spam-producing prompt, and sends the labeled prompt to prompt tuner 418 as prompt feedback 416.

Prompt tuner 418 uses prompt feedback 416 to generate template scores 420 for prompt templates stored in template data store 285. To compute template scores 420, prompt tuner 418 computes a measure of similarity between each available prompt template and a set of topics. Thus, each prompt template can have a set of template scores 420, where each set of template scores is specific to a particular topic. For instance, the same prompt template could have a template score of 100 for the topic of "software engineering project leadership" and a template score of 80 for "teaching a course on software engineering."

In some implementations, the template scores 420 are initialized to the same value for all of the prompt templates in the template data store 285 and then the template scores 420 are recomputed by prompt tuner 418 for individual prompt templates when prompt feedback 416 is received for those templates. For example, the template score for a particular prompt template may decrease after prompt tuner 418 receives prompt feedback 416 that indicates that the prompt template produced a machine-generated document that was classified as spam by a spam filter.

FIG. 5 is an example of an entity graph 500 in accordance with some embodiments of the present disclosure. An entity graph includes nodes, edges, and data (such as labels, weights, or scores) associated with nodes and/or edges. Nodes can be weighted based on edge counts, and edges can be weighted based on commonalities between the nodes connected by the edges, such as common attribute values (e.g., two users have the same job title or employer).

A graphing mechanism is used to create, update and maintain the entity graph. In some implementations, the graphing mechanism is a component of the database architecture used to implement the entity graph 500. For instance, the graphing mechanism can be a component of data storage system 280 and/or application software system 230, and the entity graphs created by the graphing mechanism can be stored in one or more of the data stores of data storage system 280.

In the example of FIG. 5, entity graph 500 includes nodes 502, 504, 506, 508, 510, 512, 514, 516, 518, and 544. As indicated in the legend, the nodes 502, 504, 506, 508, 510, 512, 514, 516, 518, and 544 represent various entities of different entity types. For instance, in FIG. 5, nodes E02, 504, 506, and 508 represent entities of a first entity type (e.g., users of an online system); node 516 represents an entity of a second entity type (e.g., a user attribute, such as a skill set, nodes 510 and 512 represent entities of a third entity type (e.g., a document attribute, such as a topic); nodes 514 and 544 represent entities of a fourth entity type (e.g., a network activity attribute, such as a usage channel), and node 518 represents an entity of a fifth entity type (e.g., a content item, such as a document).

Entity graph 500 also includes edges 520, 522, 524, 526, 528, 530, 532, 534, 536, 538, 540, 542, 546. The edges 520, 522, 524, 526, 528, 530, 532, 534, 536, 538, 540, 542, 546 individually and/or collectively represent various different types of relationships between or among the nodes 502, 504, 506, 508, 510, 512, 514, 516, 518, and 544. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 500, edges between user nodes, such as edges 520, 522, 536, can represent online social connections between the users represented by the nodes, such as 'friend' or 'follower' connections between the connected nodes. As an example, in the entity graph 500, user node 504 is a first-degree connection of user node 502 and user node 506, while user node 506 is a second-degree connect of user node 502, and user node 508 is a first degree connection of user node 502 but user node 508 is not connected with either of user node 504 or user node 506.

Alternatively or in addition, in the entity graph 500, edges can represent measures of similarity or affinity between the nodes connected by the edges. For instance, user node 502 may be connected to skill set node 516 by edge 524 because the user associated with the user node 502 has the skill set represented by the skill set node 516 listed in a "skills" section of the user's profile page in an online system (e.g., application software system 230). Similarly, user node 506 may be connected to skill set node 516 by edge 540 because the user associated with the user node 506 has a job title that matches the skill set represented by the skill set node 516 listed in the user's profile page.

The entity graph 500 includes attribute entities that are associated with other, different entity types. For instance, the skill set attribute is an attribute of the user entity type while the topic attribute is an attribute of a document entity type. Thus, whereas the skill set node 516 is linked with the user node 502 by edge 524 and with the user node 506 by edge 540, there are no first-degree links between user nodes and topic nodes 510, 512, 514. Similarly, whereas a document node 518 is linked with topic nodes 512, 510, and 514 by edges 542, 532, 530, respectively, there are no first-degree links between the document node 518 and the skill set node 516.

The lack of first-degree links between document nodes and skill set nodes, and between user nodes and topic nodes, could be due to the use of different database schemas to store data associated with different entity types. Nevertheless, because document nodes, topic nodes, user nodes, and skill set nodes are represented in the same entity graph 500, edges can be created between topic nodes and skill set nodes. For example, edge 534 can represent a first measure of similarity between the skill set node 516 and the topic node 510, and the combination of edges 534 and 532 can represent a measure of similarity between the skill set node 516 and the topic node 516. As a result, seed generator 402, described above, can use entity graph 500 to identify either a skill set or a topic as a seed to be used to generate a prompt 412. Similarly, seed generator 402 can select the skill set node 516 as seed 404 instead of a different skill set node (not shown) or either topic node 510 or topic node 512, based on a comparison of the first-degree edge count (three edges)

associated with the skill set node 516 to the edge counts associated with those other nodes.

Additionally or alternatively, in the entity graph 500, edges can represent measures of activity involving the nodes connected by the edges. For example, edge 546 may have been created between user node 502 and channel node 544 because the user represented by user node 502 used the channel represented by channel node 514 (i.e., a particular mobile version of an online system on a mobile device) to log in to the online system and scroll through the user's feed on the mobile device. Similarly, edge 528 may have been created between user node 502 and channel node 514 because the user represented by user node 502 logged into a web version of the online system on a laptop and uploaded and shared a document represented by document node 518 using the channel (i.e., laptop, web version of application) represented by the channel node 514.

In some implementations, combinations of nodes and edges are used to compute various scores, and those scores are used by various components of the generative collaborative publishing system 240 to, for example, generate prompts, generate documents, identify potential post-publication contributors, and rank feedback such as post-publication contributions. For example, a score that measures the affinity of the user represented by user node 502 to the topic represented by topic node 512 can be computed using a path p1 that includes a sequence of edges 524, 534, 532 and/or a path p2 that includes a sequence of edges 528, 530, 540 and/or a path p3 that includes a sequence of edges 538, 542. As another example, the paths p2 and/or p3 can be used to compute a score that represents an affinity between the user represented by the user node 502 and the channel represented by channel node 514. For instance, based on relative edge counts, a user-channel affinity score computed between the user node 502 and channel node 514 might be higher than the user-channel affinity computed between the user node 502 and channel node 544.

Additionally or alternatively, edges between user nodes and document nodes can be created and added to entity graph 500 to represent online interactions between users and documents. For example, edge 538 may indicate that the user associated with the user node 502 created the document represented by document node 518, and edge 526 may indicate that the user associated with the user node 508 viewed or liked the document represented by the document node 518. Based on user-document edges such as edges 526 and 538, a ranking score can be computed for a document represented by document node 518, e.g., based on edge count. In some implementations, a document having a higher edge count than other documents represented in the entity graph 500 is selected, instead of those other documents, for one or more downstream actions of the generative collaborative publishing system, such as prompt generation. For example, based on the entity graph 500, the generative collaborative publishing system can select a document to be used to formulate a new prompt for machine generation of a new document or select a contributor to invite to submit a post-publication contribution to a machine-generated document. The examples shown in FIG. 5 and the accompanying description, above, are provided for illustration purposes. This disclosure is not limited to the described examples.

Figure 6:
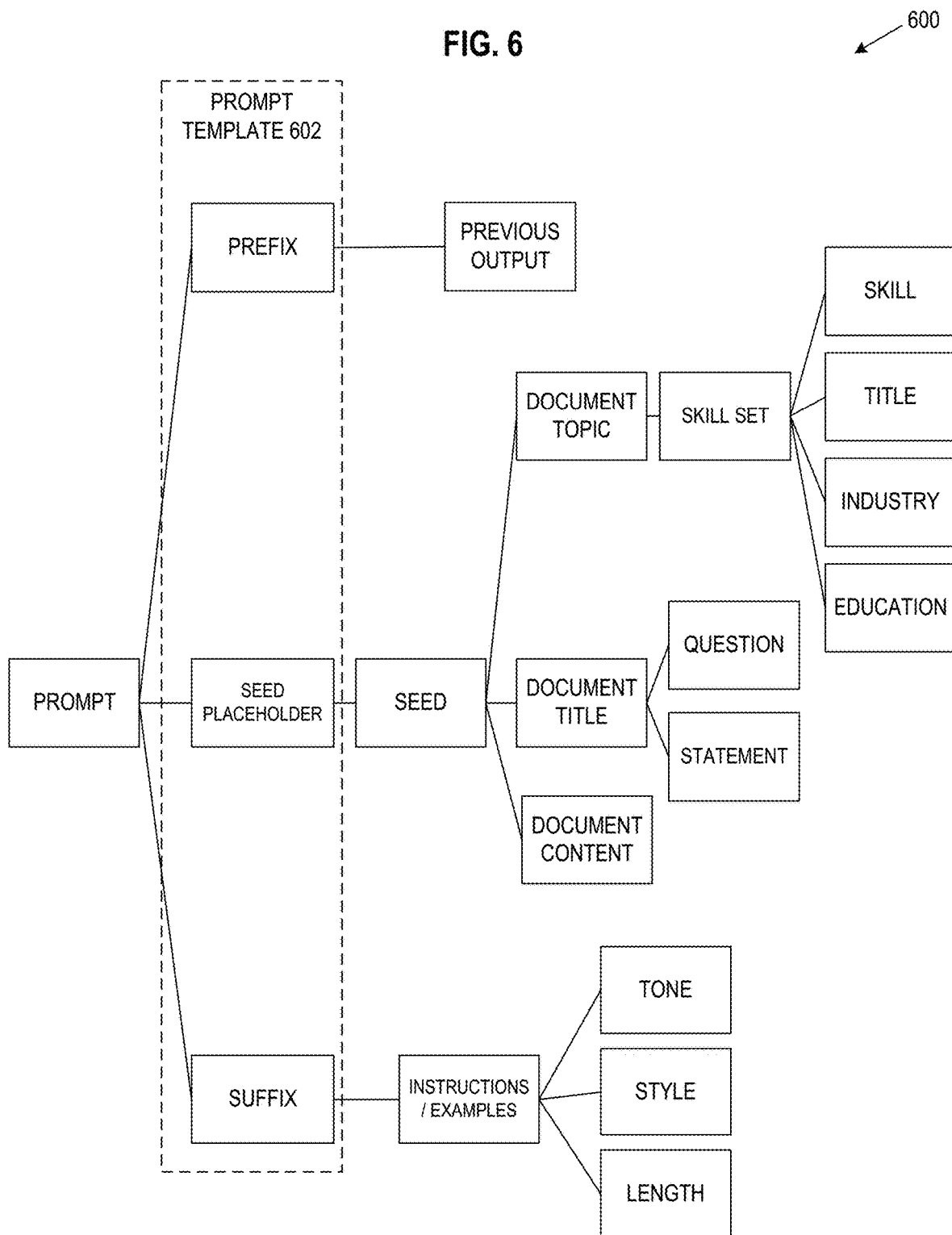
FIG. 6 is a graphical representation of an example of components of a prompt in accordance with some embodiments of the present disclosure.

FIG. 6 is a graphical representation 600 of an example of components of a prompt in accordance with some embodiments of the present disclosure. In the example of FIG. 6, a prompt is structured according to a prompt template 602. The prompt template 602 includes a prefix, a seed placeholder, and a suffix. In other implementations, the prefix and/or the suffix can be omitted from the prompt. The prefix is a parameter that can be filled with context data, such as data that includes previous output produced by a generative language model. The previous output can include, for instance, a piece of writing that was previously generated by the generative language model in response to a different prompt.

In some implementations, the context data included in the prefix includes feedback data generated by, for example, the pre-publication feedback subsystem 312 and/or the post-publication feedback subsystem 324, where the feedback data includes one or more of a score, a label, a rating, or an edit generated by the pre-publication feedback subsystem 312 and/or the post-publication feedback subsystem 324. For instance, if a classification model, e.g., a component of filtering mechanism 110 of the pre-publication feedback subsystem 312, assigns a spam label to a piece of writing produced by the generative language model, the spam-labeled piece of writing can be included in the prefix of a subsequent prompt to reduce the likelihood of the generative language model producing spam in response to the subsequent prompt. Similarly, if a scoring model, e.g., a component of filtering mechanism 110 of the pre-publication feedback subsystem 312, assigns a low relevance score to a piece of writing produced by the generative language model, the low relevance score for that piece of writing can be included in the prefix of a subsequent prompt to reduce the likelihood of the generative language model producing more pieces of writing like the low-relevance piece of writing in response to the subsequent prompt. As another example, a piece of writing assigned a high relevance score can be included in the prefix to increase the likelihood of generating high relevance score content.

If a rating tool such as rating tool 114 produces a low rating for a piece of writing produced by the generative language model, the low rating for that piece of writing can be included in the prefix of a subsequent prompt to reduce the likelihood of the generative language model producing more pieces of writing like the low-rated piece of writing in response to the subsequent prompt. Similarly, if the rating tool produces a high rating for a piece of writing produced by the generative language model, the high rating for that piece of writing can be included in the prefix of a subsequent prompt to increase the likelihood of the generative language model producing more pieces of writing like the high-rated piece of writing in response to the subsequent prompt. If an editing tool such as editing tool 116 generates one or more edits to a piece of writing produced by the generative language model, the edits for that piece of writing, or the difference between the edited piece of writing and the original machine-generated piece of writing, can be included in the prefix of a subsequent prompt to increase the likelihood of the generative language model producing more pieces of writing like the edited piece of writing in response to the subsequent prompt. If a component of a post-publication feedback subsystem such as post-publication feedback subsystem 324 receives a contribution to a published document that includes a piece of writing generated by the generative language model, the contribution can be included in the prefix of a subsequent prompt to increase the likelihood of the generative language model producing a new piece of writing related to the contribution in response to the subsequent prompt. Alternatively or in addition, because received contributions become part of a document, the difference between the original document generated by the generative language model and the updated document that includes the contribution can be included in the prefix of a subsequent prompt to increase the likelihood of the generative language model producing a piece of writing that includes the text of the updated document rather than the text of the original document in response to the subsequent prompt.

The seed placeholder is a parameter that can be filled with data that describes a subject of the current task for the generative language model. For example, the seed can include a document topic, a document title, or document content. An example of a document topic is a skill set descriptor. Examples of skill set descriptors include skills, job titles or descriptions, industry names or descriptions, and educational experience. Examples of skills include skill names, such as Data Science, and descriptions of skill-related experiences, such as "configured a generative language model for a document generation task." Examples of types of document titles include questions and statements. For example, a document title can be a question that is answered in the body of the document or a statement that summarizes the document content.

The suffix is a parameter that can be filled with data that describes one or more instructions and or examples related to the current task for the generative language model. For instance, instructions and/or examples can indicate that the output of the generative language model should be a piece of writing that is written in a particular tone or style, e.g., factual or opinion, scholarly or colloquial, etc., or that the output should be of a certain length (e.g., long-form text). As another example, the suffix can include multi-step instructions that cause the generative language model to generate multiple different pieces of output based on a single prompt.

The following is an example of how a prompt can be refined based on pre-publication feedback and/or post publication feedback. Suppose a prompt template includes the following: "write an article about [title] in the style of the Harvard Business Review," where [title] is a place holder for an article title, such as "What is the impact of big data on the world?" The generative language model generates an article based on the prompt. The generative collaborative publishing system receives the following feedback on the machine-generated article: "rating: 2 out of 5," "boring and confusing." Based on the feedback, a new prompt template is selected that includes: "Articles about big data in the style of Harvard Business Review are boring and confusing. Write an article about [title] in a friendly or witty tone. Start with an introductory paragraph and give concrete examples."

The examples shown in FIG. 6 and the accompanying description, above, are provided for illustration purposes. This disclosure is not limited to the described examples. For example, prompt templates that do not include a prefix or do not include a suffix can be used, in other implementations. Also, in other implementations, context data can be included in other sections of a prompt and need not be limited to the prefix. Similarly, instructions and examples can be included in other sections of a prompt and need not be limited to the suffix.

Figure 7:
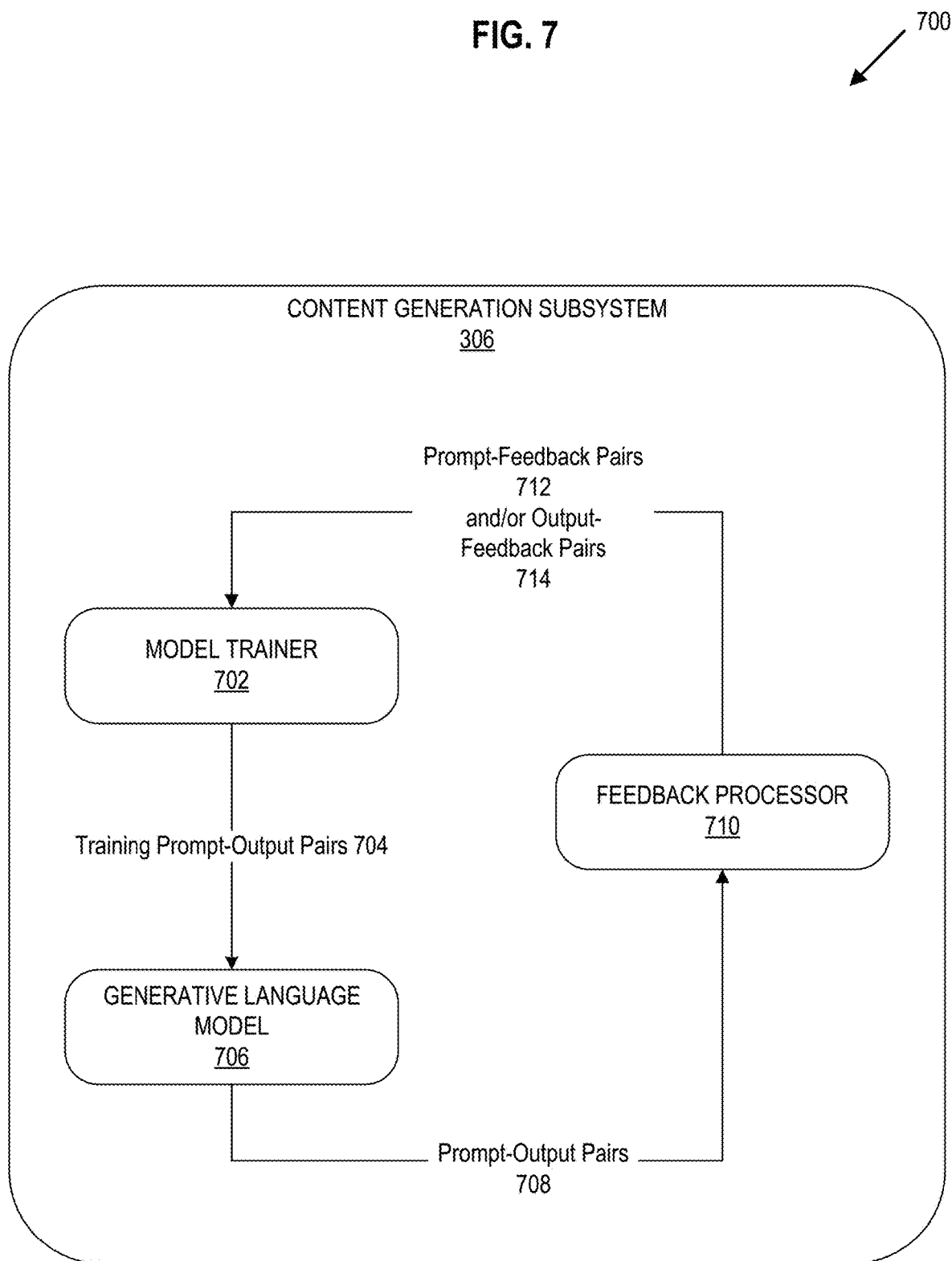
FIG. 7 is a flow diagram of an example method for automated content generation using components of a content generation subsystem in accordance with some embodiments of the present disclosure.

FIG. 7 is a flow diagram of an example method for automated content generation using components of a content generation subsystem in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 7, content generation subsystem 306 includes a model trainer 702, a generative language model 706, and a feedback processor 710 operatively coupled together in a closed loop. Model trainer 702 receives feedback data from a previous iteration of generative language model 706. The feedback data is generated by feedback processor 710 in response to the output of the previous iteration of the generative language model. The feedback data generated by feedback processor 710 includes prompt-feedback pairs 712 and/or output-feedback pairs 714.

To create a prompt-feedback pair 712, in some implementations, feedback processor 710 computes a score, such as a reward score, based on feedback related to a particular prompt. Feedback related to a particular prompt can include feedback directly related to the prompt, such as a rating, a score, or label that is assigned to the prompt by a human reviewer or an automated process, such as a scoring model or a classification model of a feedback subsystem. The feedback related to a particular prompt also or alternatively can include feedback related to output produced by the generative language model 706 based on the prompt. For instance, given a prompt-output pair 708, feedback processor 710 computes a score for the prompt-output pair 708 by applying a reinforcement learning model to the feedback associated with the prompt-output pair.

To create an output-feedback pair 714, in some implementations, feedback processor 710 computes a score, such as a reward score, based on feedback related to a particular output of the generative language model 706. Feedback related to a particular output can include feedback directly related to the output, such as a rating, a score, or label that is assigned to the output by a human reviewer or an automated process, such as a scoring model or a classification model of a feedback subsystem. The feedback related to a particular output also or alternatively can include feedback related to the prompt that was used by the generative language model 706 to create the output. For instance, given a prompt-output pair 708, feedback processor 710 computes a score for the prompt-output pair by applying a reinforcement learning model to the feedback associated with the prompt-output pair.

In some implementations, the generative language model 706 is pre-trained on a large corpus (e.g., millions of training examples) and can be re-trained or fine-tuned for particular applications or domains. Model trainer 702 creates training data based on the prompt-feedback pairs 712 and/or output-feedback pairs 714 received from feedback processor 710. The training data created by model trainer 702, e.g., training prompt-output pairs 704, is used to train or fine tune the generative language model 706 using, for example, supervised machine learning or semi-supervised machine learning. An instance of training data includes ground-truth data for a given prompt-output pair, where the ground-truth data includes, for example, a reward score, a classification, or a label generated by feedback processor 710 in communication with one or more feedback subsystems such as pre-publication feedback subsystem 316 or post-publication feedback subsystem 324. In a training or fine tuning mode, the generative language model 706 is applied to the training prompt-output pairs 704 and one or more model parameters of the generative language model 706 are updated based on the training or fine tuning. Alternatively or in addition, the architecture of the generative language model 706 can be re-engineered based on new instances of training data or based on a new application or domain. In an operational mode, the generative language model 706 generates output in response to prompts. The prompt-output pairs 708 generated by the generative language model 706 are processed by feedback processor 710 to create prompt-feedback pairs 712 and/or output-feedback pairs 714 when the feedback processor 710 receives feedback related to the respective prompt-output pairs 708.

In some implementations, feedback processor 710 includes a reinforcement learning component such as a reinforcement learning model that machine-learns a reward function based on feedback associated with prompt-output pairs. For example, given a prompt-output pair 708, feedback processor 710 receives or identifies feedback that pertains to the prompt-output pair 708. The feedback can include pre-publication feedback and/or post-publication feedback received from one or more other components of the generative collaborative publishing system. The feedback processor 710 applies the reward function to the received or identified feedback to generate a reward score for the corresponding prompt-output pair based on the feedback associated with the prompt-output pair. The reward scores are incorporated into the prompt-feedback pairs 712 and/or output-feedback pairs 714, which are then used to train or fine tune the generative language model 706 using, for example, supervised or semi-supervised machine learning. The examples shown in FIG. 7 and the accompanying description, above, are provided for illustration purposes. This disclosure is not limited to the described examples.

FIG. 8 is a flow diagram of an example method for automated content generation using components of a generative collaborative publishing system in accordance with some embodiments of the present disclosure.

The method 800 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 8, a generative collaborative publishing system includes components that are configured to generate documents at scale. For example, the method 800 can be used to auto-generate a large number of documents for publication to an online system, such as a user network, for example, a social network service or social network-based application software system. Using the method 800, the generative collaborative publishing system can generate up to a million or more documents from a single initial seed, in some implementations. For example, a relatively small seed such as a skill or an idea is used to generate a document title, which is used to auto-generate document content using a generative language model. In other words, once a small seed such as a skill or topic is determined, the generative collaborative publishing system self-supports generating, at scale, document titles and corresponding full documents that are meaningful and relevant to a particular audience because the end to end process includes built-in fine-tuning of prompts and/or fine-tuning of the generative language model based on various forms of feedback including pre-publication feedback and/or post-publication feedback, where the various forms of feedback are generated by automated systems such as filter mechanisms and/or received from human reviewers. Thus, the end to end automated system including the feedback mechanisms, prompt tuning, and model training mechanisms supports implementations of the computing system 100 for the automatic generation of publishable documents that are relevant to a small initial seed.

In FIG. 8, the components of the generative collaborative publishing system include a topic generator 802, a first generative language model 804, a title prompt generator 808, a title prompt tuner 810, a second generative language model 814, a second model trainer 816, a document prompt generator 820, a document prompt tuner 822, a third generative language model 826, and a third model trainer 828.

Topic generator 802 generates a set of topics 806 from an initial seed. In some implementations, topic generator 802 obtains the initial seed from seed generator 402, described above. For example, the initial seed used by topic generator 802 can be a descriptor related to a skill set that is extracted from an online system, e.g., application software system 230.

To generate the set of topics 806, topic generator 802 applies a first generative language model 804 to the initial seed. For example, topic generator 802 formulates a prompt such as "what are keywords or topics that are similar to [initial seed]?" where [initial seed] is a placeholder for the value of the initial seed, e.g., a skill set descriptor. The first generative language model 804 is a generative language model such as generative language model 106, described above. In response to a prompt that contains or references the initial seed, first generative language model 804 machine-generates and outputs the set of topics 806. In some implementations, the set of topics 806 includes the top k keywords and/or topics output by the first generative language model 804 based on the probabilities assigned to the prompt-topic pairs by the first generative language model 804, where k is a positive integer whose value can be determined based on the requirements of a particular design or implementation of the generative collaborative publishing system.

In some implementations, the set of topics generated by the first generative language model 804 are sent to a search engine optimization system such as search engine optimization system 290 before being passed to a downstream process or component. The search engine optimization system generates and returns, to the topic generator 802, a respective search engine optimization score for each topic in the set of topics 806. The search engine optimization score indicates the frequency of occurrence of the topic in a set of search queries executed by one or more online search engines over a specified time period, such as the preceding 24 hours, the preceding 10 days, or the preceding three months. In some implementations, the search engine optimization scores are used to filter out topics from the set of topics generated by the first generative language model 804 that do not have a search engine optimization score greater than a search engine optimization score threshold value, where the threshold is determined based on the requirements of a particular design or implementation of the generative collaborative publishing system.

In some implementations, the set of topics 806 are sent to one or more filter models, such as classification models and/or scoring models that are part of filtering mechanism 110, described above, before being passed to a downstream process or component. The filtering mechanism generates and returns, to the topic generator 802, a respective filter score or filter label for each topic in the set of topics 806. The filter score or filter label is used to determine whether the topic satisfies community standards for the online system; for example whether the topic includes any type of spam, profanity, or nudity. In some implementations, the filter scores and/or filter labels are used to filter out topics from the set of topics generated by the first generative language model 804.

The topics 806 that are ultimately provided to title prompt generator 808 include keywords that have been machine-generated by the first generative language model 804 based on an initial seed that have not been filtered out by the search engine optimization system and have not been filtered out by any of the filtering mechanisms, in some implementations. For example, topic generator 802 can generate, from the initial seed, about 100 or more topics 806 that are sent to title prompt generator 808, in some implementations. For instance, given an initial seed of "data science," topic generator 802 outputs a list of keywords or topics determined by first generative language model 804 to be related to the initial seed, such as "machine learning," "statistics," "neural networks," "big data," etc.

Title prompt generator 808 generates a title prompt for each of the topics 806 received from topic generator 802. A title prompt is a prompt that is used as an input to a generative language model to cause the generative language model to machine-generate and output a title for a document, such as an article title. The title prompt generator 808 includes, for example, a version of prompt generator 410, described above, that is configured to generate title prompts. For example, title prompt generator 808 interfaces with title prompt tuner 810 to select a title prompt template to be used to generate the title prompt, and generates the title prompt by applying the selected title prompt template to the topics 806.

A title prompt template includes, for example, an instruction and a placeholder for a topic, e.g., "generate a question associated with [topic]" where [topic] is a placeholder for a particular topic, such as "big data." When the topic placeholder is replaced with a particular topic, the resulting prompt is, for example, "generate a question about big data." Title prompt tuner 810 includes, for example, a version of prompt tuner 418, described above, which is configured for title prompts.

Title prompt generator 808 in combination with title prompt tuner 810 can select different title prompt templates for different topics 806 or use the same title prompt template for different topics. Whether title prompt generator 808 uses the same title prompt template or different title prompt templates for different topics, title prompt generator 808 outputs a different title prompt 812 for each of the topics 806.

The title prompts 812 generated by title prompt generator 808 are run through a search engine optimization system and/or one or more filtering mechanisms in a similar manner as described above for topics 806 before being passed to second generative language model 814. Thus, the title prompts 812 that are ultimately provided to the second generative language model 814 include title prompts that have successfully passed through the search engine optimization system without being filtered out and have successfully passed through the filtering mechanisms without being filtered out, in some implementations.

The second generative language model 814 is a generative language model such as generative language model 106, described above. In some implementations, the second generative language model 814 is also the first generative language model 804, while in other implementations, the second generative language model 814 is a different generative language model than the first generative language model 804. For example, the second generative language model 814 is a generative language model that is trained or tuned by second model trainer 816 to generate document titles in a particular domain. Second model trainer 816 includes, for example, a version of model trainer 702, described above, that is configured to train a generative language model for document titles.

In response to input of a title prompt 812, the second generative language model 814 machine-generates and outputs a set of titles 818. In some implementations, the set of titles 818 includes the top k titles output by the second generative language model 814 based on the probabilities assigned to the title prompt-title pairs by the second generative language model 814, where k is a positive integer whose value can be determined based on the requirements of a particular design or implementation of the generative collaborative publishing system. The titles 818 generated by second generative language model 814 are run through a search engine optimization system and/or one or more filtering mechanisms in a similar manner as described above for topics 806 and title prompts 812, before being passed to document prompt generator 820. Thus, the titles 818 that are ultimately provided to the document prompt generator 820 include titles that have successfully passed through the search engine optimization system without being filtered out and have successfully passed through the filtering mechanisms without being filtered out, in some implementations.

Document prompt generator 820 generates a document prompt for each of the titles 818 received from second generative language model 814. A document prompt is a prompt that is used as an input to a generative language model to cause the generative language model to machine-generate and output a document, such as an article or advice column. The document prompt generator 820 includes, for example, a version of prompt generator 410, described above, that is configured to generate documents. For example, document prompt generator 820 interfaces with document prompt tuner 822 to select a document prompt template to be used to generate the document prompt, and generates the document prompt by applying the selected document prompt template to the titles 818.

A document prompt template includes, for example, an instruction and a placeholder for a title, e.g., "generate a document about [title]" where [title] is a placeholder for a particular document title, such as "big data's impact in the modern world." When the title placeholder is replaced with a particular title, the resulting prompt is, for example, "generate a document about big data's impact in the modern world." Document prompt tuner 822 includes, for example, a version of prompt tuner 418, described above, which is configured for document prompts.

Document prompt generator 820 in combination with document prompt tuner 822 can select different document prompt templates for different titles 818 or use the same document prompt template for different titles 818. Whether document prompt generator 820 uses the same document prompt template or different document prompt templates for different titles, document prompt generator 820 outputs a different document prompt 824 for each of the titles 818.

The document prompts 824 generated by document prompt generator 820 are run through a search engine optimization system and/or one or more filtering mechanisms in a similar manner as described above for topics 806 and titles 818 before being passed to third generative language model 826. Thus, the document prompts 824 that are ultimately provided to the third generative language model 826 include document prompts that have successfully passed through the search engine optimization system without being filtered out and have successfully passed through the filtering mechanisms without being filtered out, in some implementations.

The third generative language model 826 is a generative language model such as generative language model 106, described above. In some implementations, the third generative language model 826 is also the second generative language model 814 and/or the first generative language model 804, while in other implementations, the third generative language model 826 is a different generative language model than one or more of the first generative language model 804 or the second generative language model 814. For example, the third generative language model 826 is a generative language model that is trained or tuned by third model trainer 828 to generate documents in a particular domain. Third model trainer 828 includes, for example, a version of model trainer 702, described above, that is configured to train a generative language model for documents.

In response to input of a title 818, the third generative language model 826 machine-generates and outputs a set of documents 830. In some implementations, the set of documents 830 includes the top k documents output by the third generative language model 826 based on the probabilities assigned to the document prompt-document pairs by the third generative language model 826, where k is a positive integer whose value can be determined based on the requirements of a particular design or implementation of the generative collaborative publishing system.

The documents 830 generated by third generative language model 826 are, in some examples, run through a search engine optimization system and/or one or more filtering mechanisms in a similar manner as described above for topics 806, title prompts 812, and titles 818, before being output to a downstream component or process of the generative collaborative publishing system such as a pre-publication feedback subsystem or a publishing subsystem. Thus, in some examples, the documents 830 that are ultimately output by the collaborative publishing system include documents that have passed through the search engine optimization system without being filtered out and have successfully passed through the pre-publication filtering mechanisms without being filtered out, in some implementations. The examples shown in FIG. 8 and the accompanying description, above, are provided for illustration purposes. This disclosure is not limited to the described examples.

The documents 830 generated as a result of the components and processes shown in FIG. 8, described above, can be subjected to an automated or semi-automated pre-publication editorial review process which, in addition to editing, rating, or reviewing documents 830, generates various outputs that can be used to formulate feedback for the prompt generation and generative language model training systems.

Not all documents generated by the generative language model require pre-publication review and feedback. For example, in some cases, at least some of the documents 830 are sent directly to a publishing system for publication to an online system, such as a user network, for example, a social network-based service or application. In other instances, certain documents 830 are not directly published, or are not published at all, but instead the documents 830 are used to formulate feedback that can be used for prompt refinement and/or for tuning of the generative language model so that a subsequent iteration of the method 800 may generate a new set of documents 830 based on the feedback.

Figure 9:
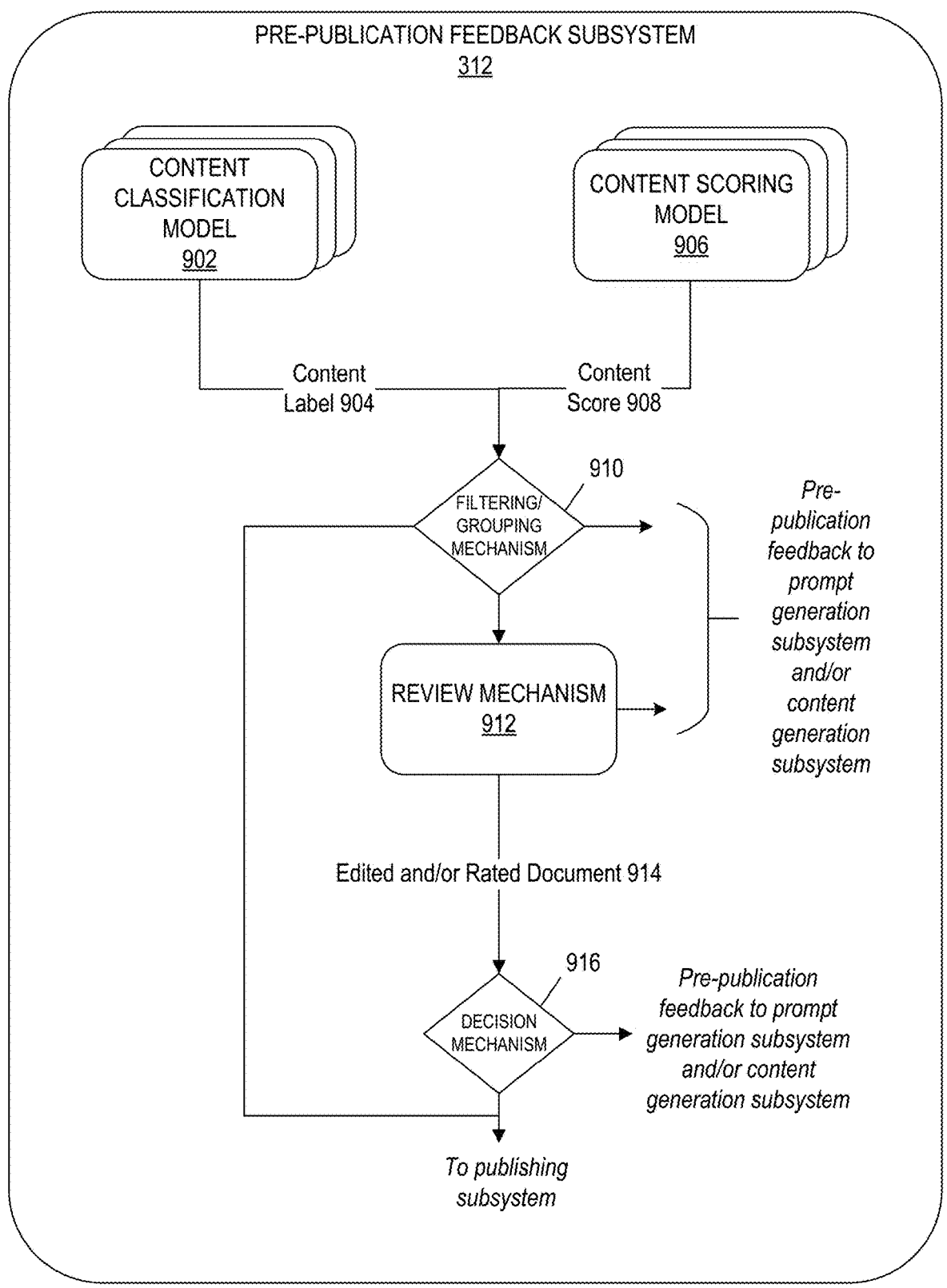
FIG. 9 is a flow diagram of an example method for pre-publication feedback processing using components of a pre-publication feedback subsystem in accordance with some embodiments of the present disclosure.

FIG. 9 is a flow diagram of an example method for pre-publication feedback processing using components of a pre-publication feedback subsystem in accordance with some embodiments of the present disclosure.

The method 900 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 9, the pre-publication feedback subsystem 312 includes a set of filter models including one or more content classification models 902 and/or one or more content scoring models 906, a filtering/grouping mechanism 910, a review mechanism 912, and a decision mechanism 916.

A content classification model 902 includes a machine learning model that has been trained to classify an input by assigning one or more labels 904 to the input based on a statistical or probabilistic similarly of the input to previously-labeled data used to train the model. Content classification model 902 is created by applying a machine learning algorithm, such as linear regression or logistic regression, to a set of training data using, for example, a supervised machine learning technique. In supervised machine learning, the set of training data includes ground-truth labeled data samples. In some implementations, content classification model 902 is created by applying a clustering algorithm to a set of training data that includes unlabeled data samples, using an unsupervised machine learning technique. An example of a content classification model is a binary classifier that identifies inputs as either spam or not spam. Another example of a content classification model is a topic model that assigns an input to one topic or multiple topics based on similarities between the input and the unlabeled data used to train the model. In some implementations, content classification model 902 is used to assign content labels 904 to documents. For example, in generative collaborative publishing system 240, a content classification model 262 can be used to label documents based on similarity to a particular relevant topic, skill set, document title, or prompt, or to label documents based on similarity to a particular non-relevant topic such as spam. Given a set of documents, content classification model 902 outputs a content label 904 for each document in the set of documents.

Content scoring model 906 includes a machine learning model that is trained to generate a score for a pair of inputs, where the score statistically or probabilistically quantifies a relationship, association, strength of relationship, correlation, or affinity between the inputs in the pair. For example, content scoring model 906 can compute a score 908 for a topic-skill set pair, and that score can be used to determine a document's relevance to a particular skill set.

Content scoring model 906 includes, for example, a neural network model that is trained on training data that includes ground-truth sets of data pairs. Examples of content scoring models include ranking models that rank documents for distribution to a particular user or user group, such as for inclusion in a user or user group's news feed, where the ranking is based on training examples of the user's or user group's history of clicking or not clicking on similar documents in an online system such as application software system 230. Given a set of documents, content scoring model 906 outputs a content score 908 for each document in the set of documents.

Content labels 904 and content scores 908 are received by filtering/grouping mechanism 910. Filtering/grouping mechanism 910 includes one or more of filtering mechanism 110 or grouping mechanism 112, described above. For example, filtering/grouping mechanism 910 filters out generative language model-generated documents that have been assigned a content label 904 or content score 908 that satisfies the applicable filtering criteria so that the filtered documents are not published or provided to review mechanism 912. For example, generative language model-generated documents that have been assigned a content label 904 that matches a spam category can be used as feedback that is routed to prompt generation subsystem 302 and/or content generation subsystem 306. Generative language model-generated documents that have not been assigned a content label 904 that matches a spam category can be published or routed to review mechanism 912.

In some implementations, filtering/grouping mechanism 910 includes a grouping mechanism alternatively or in addition to one or more filtering mechanisms. For example, the grouping mechanism groups or ranks generative language model-generated documents according to the assigned content labels 904 and/or content scores 908. For instance, generative language model-generated documents having the top k content scores 908 for a particular topic are routed to review mechanism 912 or directly to a publishing system, e.g., publishing subsystem 320, while the remaining generative language model-generated documents, along with their respective content scores 908 are used as feedback that is returned to prompt generation subsystem 302 and/or content generation subsystem 306.

In some implementations, 110 includes a sampling mechanism alternatively or in addition to the one or more filtering mechanisms and/or grouping mechanisms. For example, the sampling mechanism samples a set of generative language model-generated documents that have assigned content labels 904 and/or content scores 908 that pass through the one or more filtering mechanisms and/or grouping mechanisms successfully by meeting the applicable filtering or grouping criteria. The sampling mechanism creates a sampled subset of that set of documents and routes only the sampled subset to review mechanism 912 while routing the remaining documents in set directly to publishing subsystem 320.

In some implementations, the grouping mechanism divides the set of generative language model-generated documents that have passed through the one or more filtering mechanisms successfully into two groups, e.g., a first group and a second group that are mutually exclusive. The grouping mechanism routes one of the groups, e.g., the first group, directly to review mechanism 912. The sampling mechanism then generates a sampled subset of the other group, e.g., the second group, such that the sampled subset and the remaining portion of the second group are mutually exclusive. The sampling mechanism routes the sampled subset of the second group to review mechanism 912 and routes the remaining portion of the second group directly to publishing subsystem 320.

Review mechanism 912 includes one or more mechanisms for rating and/or editing the generative language model-generated documents that have been routed to review mechanism 912. In some implementations, review mechanism 912 includes rating tool 114 and/or editing tool 116, described above. Review mechanism 912 is fully automated, in some implementations. In other implementations, review mechanism 912 includes a front end user interface through which human reviewers interact with review mechanism 912. Examples of front end user interfaces that can be used in connection with review mechanism 912 are shown in FIG. 10 and FIG. 11, described below.

Review mechanism 912 can route the generative language model-generated documents to either rating tool 114 or editing tool 116 based on the groupings and samplings generated by the filtering/grouping mechanism. In some implementations, only the generative language model-generated documents in the first group described above are routed to editing tool 116 and only the sampled subset of the second group described above are routed to rating tool 114. For instance, the sampled subset of the second group described above are rated but not edited, and the first group of documents are edited but not rated, in some implementations. Accordingly, review mechanism 912 generates edited and/or rated documents 914.

Decision mechanism 916 applies one or more decision criteria to the edited and/or rated documents 914. Edited and/or rated documents 914 that satisfy the one or more decision criteria are routed to publishing subsystem 320, while edited and/or rated documents 914 that do not satisfy the one or more decision criteria are used as feedback that is returned to prompt generation subsystem 302 and/or content generation subsystem 306.

In cases where a component of pre-publication feedback subsystem 312 applies one or more filtering, grouping, sampling, or decision criteria to a generative language model-generated document or its corresponding label, score, or rating data, the filtering, grouping, sampling, or decision criteria are determined based on the requirements of a particular design or implementation of the generative collaborative publishing system. For example, a filter criterion could have a higher value for certain domains in which factual accuracy or professionalism are important factors and a lower value for other domains in which entertainment value is an important factor. As another example, a grouping criterion can be determined based on search optimization data that indicates that network activity related to certain topics is trending upward while the network activity related to other topics is steady or trending downward.

As an additional example, a sampling criterion can be determined based on the number or configuration of content classification models 902 and/or content scoring models 906 that are used. For instance, if a combination of several different models 902, 906 are used, the sampling criterion could be configured so that fewer documents are routed to review mechanism 912 while a greater number of documents are routed directly to the publishing subsystem 320. On the other hand, if only a single content classification model 902 is used without any content scoring models 906, the sampling criterion could be configured so that more documents are routed to review mechanism 912 and fewer documents are routed directly to the publishing subsystem 320.

As another example, a decision criterion can be determined based on the configuration of the review mechanism 912. For example, if the edits and/or ratings generated by review mechanism 912 are fully automated (e.g., generated automatically without human review), the decision criterion could be configured so that a higher rating or a higher number of edits are required before a document is routed to publishing subsystem 320. On the other hand, if the edits and/or ratings generated by review mechanism 912 are not fully automated (e.g., a human reviewer inputs the edits and/or ratings via a user interface), the decision criterion could be configured so that a medium-level rating or a lower number of edits are required before a document is routed to publishing subsystem 320.

The examples shown in FIG. 9 and the accompanying description, above, are provided for illustration purposes. This disclosure is not limited to the described examples. For example, in some implementations, all generative language model-generated documents, along with their respective content labels 904 and/or content scores 908, and not just those documents that do not meet the criteria for publication or passage to the review mechanism 912, are used as feedback that is routed to prompt generation subsystem 302 and/or content generation subsystem 306. In other words, pre-publication feedback subsystem 312 generates both positive and negative examples of feedback for prompt generation system 302 and/or content generation subsystem 306, in some implementations.

FIG. 10 is a screen capture of an example editor interface in accordance with some embodiments of the present disclosure.

In the example of FIG. 10, an editor interface 1000 is a front end user interface component of a review tool, e.g., review mechanism 912 or editing tool 116. The editor interface 1000 illustrates a user interface for a certain group 1004 of generative language model-generated documents, e.g. class 1. Class 1 of editor interface 1000 can correspond to the first group of documents described above with reference to FIG. 9.

In editor interface 1000, a title 1002 of a generative language model-generated document and other information 1006 about the document are displayed. Editor interface 1000 identifies a task 1014 for a human reviewer ("review and edit"). Graphical user interface input control elements 1008, 1010, and 1012, if selected via an input device at the user system, enable the human reviewer to edit portions of the generative language model-generated document, discard edits, and save edits, respectively. Selection of open article draft control 1008 opens an edit window 1016. The edit window 1016 displays the document title 1018 and a set of user input control elements 1020, 1022, 1024. The user input control elements 1020, 1022, 1024 are pre-populated with various texts associated with the generative language model-generated document that also have been machine-generated by the generative language model.

The user input control elements 1020, 1022, 1024 enable the human reviewer of the generative language model-generated document identified by the title 1018 to edit the various texts associated with the generative language model-generated document, which also have been machine-generated by the generative language model. For example, user input control element 1020 enables the human reviewer to read and edit generative language model-generated text of a summary of the document, which could be used, for instance, to create a social media post about the document. User input control element 'R22 enables the human reviewer to read and edit generative language model-generated text for a subject line of a message announcing the publication of the document. User input control element 'R22 enables the human reviewer to read and edit generative language model-generated text of the main body of the document.

Edit window 'R16 also includes an audit section 'R26. Audit section 'R26 receives and displays information that is used to keep track of which generative language model-generated texts have been reviewed and edited by which human reviewers.

The examples shown in FIG. 10 and the accompanying description, above, are provided for illustration purposes. This disclosure is not limited to the described examples.

FIG. 11 is a screen capture of an example editor interface in accordance with some embodiments of the present disclosure.

In the example of FIG. 11, a reviewer interface 1150 is a front end user interface component of a review tool, e.g., review mechanism 912 or rating tool 114. The reviewer interface 1150 illustrates a user interface for a certain group 1154 of generative language model-generated documents, e.g. class 2. Class 2 of reviewer interface 1150 can correspond to the sampled subset of the second group of documents described above with reference to FIG. 9.

In reviewer interface 1100, a title 1152 of a generative language model-generated document and other information 1106 about the document are displayed. Reviewer interface 1150 identifies a task 1114 for a human reviewer ("review and rate"). Graphical user interface input control element 1158, if selected via an input device at the user system, enable the human reviewer to save a rating assigned by the human reviewer to the generative language model-generated document using a rating window 1156. Rating window 1156 is opened and displayed in response to a selection of or hovering over the Class 2 group 1154.

The rating window 1156 displays a rating selection mechanism such as a set of one or more graphical user interface user input control elements that represent different rating scores on a ratings scale. While shown as including separate elements 1, 2, 3, 4, 5 in FIG. 11, the rating selection mechanism can be implemented using any suitable arrangement of user input control elements, such as a slide bar or a text input box. Also, the particular design of the rating mechanism is configurable according to the requirements of a particular design or implementation of the generative collaborative publishing system. For example, the range of values provided as available ratings can be greater than or less than five. Alternatively or in addition, the available ratings can include text labels such as "highly relevant to the topic" and "not relevant to the topic" or "written in a professional tone" and "not written in a professional tone."

The rating window 1156 can be configured to enable the human reviewer of the generative language model-generated document identified by the title 1152 to assign a rating individually or collectively to any of the texts associated with the generative language model-generated document that also have been machine-generated by the generative language model. The examples shown in FIG. 11 and the accompanying description, above, are provided for illustration purposes. This disclosure is not limited to the described examples.

Figure 12:
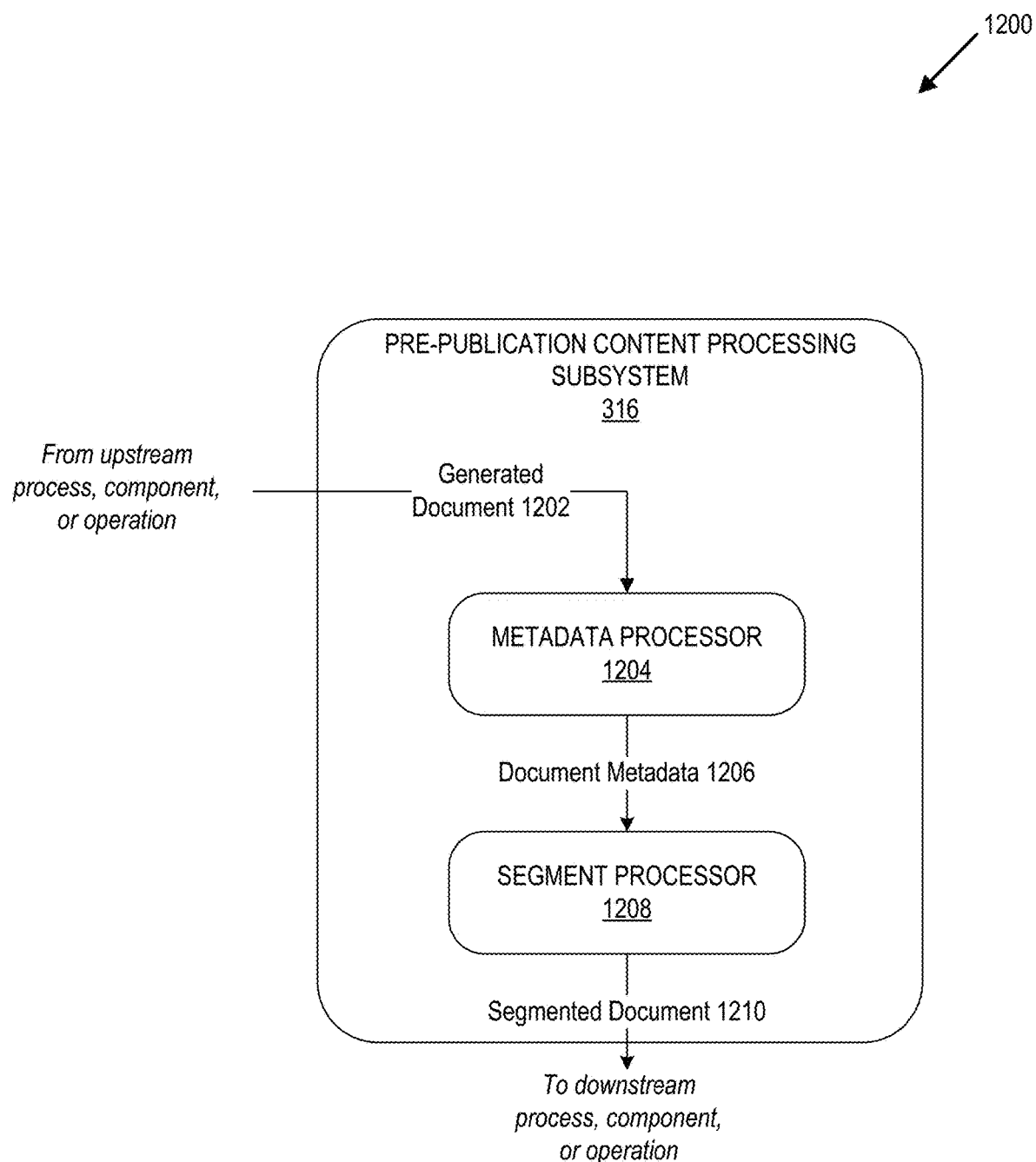
FIG. 12 is a flow diagram of an example method for pre-publication content processing using components of a pre-publication content processing subsystem in accordance with some embodiments of the present disclosure.

FIG. 12 is a flow diagram of an example method for pre-publication content processing using components of a pre-publication content processing subsystem in accordance with some embodiments of the present disclosure.

The method 1200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 12, the pre-publication content processing subsystem 316 includes a metadata processor 1204 and a segment processor 1208. The metadata processor 1204 receives a generated document 1202 from an upstream process, component, or operation of the generative collaborative publishing system. For example, metadata processor 1204 receives generated document 1202 from a generative language model such as generative language model 106 or from a pre-publication feedback subsystem such as pre-publication feedback subsystem 316 or from a post-publication feedback subsystem such as post-publication feedback subsystem 324. The generated document 1202 includes machine-generated content output by a generative language model. The generated document 1202 can include one or more edits generated by a review tool, for example, an editing tool of a pre-publication feedback subsystem. Alternatively or in addition, the generated document 1202 can include one or more contributions generated by, for example, a post-publication feedback subsystem.

Metadata processor 1204 extracts document metadata 1206 from the generated document 1202. Document metadata 1206 includes, for example, special characters or symbols that signify aspects of the structure or organization of the document 1202. Examples of document metadata 1206 include line numbers, paragraph numbers, end of sentence signals, end of line signals, end of paragraph signals, end of document signals, block identifiers, indicators of font characteristics (e.g., bold, underline, font size, etc.), indicators of content type (e.g., text, image, video, audio, graph, drawing, user-generated content, etc.), and references to other contents (e.g., references to other documents or user-generated posts about the documents). Metadata processor 1204 outputs the document metadata 1206.

Segment processor 1208 uses the document metadata 1206 to divide the machine generated document 1202 generated by the generative language model into segments. A segment includes a contributable portion of a document. Contributable as used herein may refer to functionality associated with a segment that enables invited users to submit contributions to the specific segment rather than commenting on the entire document. Whereas conventional comments on documents do not become integrated with the document itself, certain contributions to segments are integrated inline with, incorporated into, and become part of the document. For example, once a contribution is made to a segment, the contribution is linked with the segment and treated as part of the document such that if the document is retransmitted, e.g., reshared, forwarded, or reposted to a network, the contribution is included in the reshare, forward or repost as part of the document. Examples of segments and segment architectures are shown in FIG. 13 and FIG. 16, described below.

In some implementations, segment processor 1208 reads or searches the document metadata 1206 for metadata or sequences of metadata that signal the beginning of a new segment. The determination of which metadata signals the beginning of a segment can be configured according to the requirements of a particular design or implementation of the generative collaborative publishing system. For example, a sequence of document metadata 1206 that identifies a heading and at least one paragraph following the heading can be a signal of the beginning of a segment. On the other hand, a heading that is not followed by at least one paragraph, or a paragraph that is not preceded by a heading, or a non-text element such as an embedded image, video, or audio recording, may not be a signal of the beginning of a segment, in some implementations.

Segment processor 1208 uses the metadata signals of segment beginnings to divide the generated document 1202 into segments to create a segmented version of the generated document 1202, e.g., segmented document 1210. In some implementations, segment processor 1208 generates a new unique segment identifier for each segment and assigns it to the respective segment based on the metadata signals of segment beginnings. For instance, segment processor 1208 creates and stores a data record for each segment that includes the segment identifier and the corresponding metadata signal of the beginning of the segment. Segment processor 1208 also links each segment identifier with the document. For example, segment processor 1208 creates and stores one or more data records for the generated document 1202 that contain the document identifier for the document and the segment identifiers of the segments in the document. In some implementations, segment processor 1208 embeds the segment data, e.g., the segment identifiers and corresponding metadata, into the document 1202 or appends the segment data to the document 1202.

Segment processor 1208 outputs the segmented document 1210 to one or more downstream processes, components, or operations. For example, segment processor 1208 passes the segmented document 1210 to one or more of a publishing subsystem, e.g., publishing subsystem 320, or a post-publication feedback subsystem, e.g., post-publication feedback subsystem 324, of the generative collaborative publishing system.

The examples shown in FIG. 12 and the accompanying description, above, are provided for illustration purposes. This disclosure is not limited to the described examples.

FIG. 13 is a graphical representation 1300 of an example of components of a document package that can be output by a generative collaborative publishing system in accordance with some embodiments of the present disclosure. In the example of FIG. 1 described above, a document 108 can be single document or a component of a document package that includes multiple documents and/or document-related data. Also, references to a document, such as document 108, can be used to refer to a document package. That is, a generative language model such as generative language model 106 can generate document packages alternatively or in addition to individual documents, and the term document can be used to refer to either case.

FIG. 13 illustrates one implementation of a document package that can be output by a generative language model. In FIG. 13, the document package 1302 is assigned a unique document package identifier DP1 and includes a set of document assets 1304. The set of document assets 1304 includes a document title, document content, a document summary, a document notification, and document metadata. In other implementations, the document package 1302 includes a different set of document assets; for instance, the document summary and/or the document notification can be omitted from the document package 1302. Each document asset can be assigned its own document identifier in addition to being linked with the document package identifier. For example, the document content is assigned a unique document identifier D1 and is also linked with the document package identifier DP1.

In some implementations, all components of a document package are generated by a generative language model in response to a multi-step prompt configured using a prompt wrapper such as shown in Table 1, described above. For example, the prompt that is input to the generative language model includes instructions and requirements for generating each of the document content, the document summary, the document notification, and the document metadata. In some implementations, the document metadata includes inputs to be passed to a search engine optimization system or instructions for the generative language model to generate those inputs to the search engine optimization system. Alternatively or in addition, the document metadata includes instructions for the generative language model to output the document summary and/or the document notification in conjunction with the document content.

FIG. 13 also illustrates one implementation of a document architecture 1306, 1308; that is, a way of structuring document content. In FIG. 13, the document architecture 1306, 1308 for document content D1 includes blocks, segments, and contribution threads that are linked with the document identifier D1. A block as used herein includes an item of digital content, such as a piece of text or an image, that has been output by a generative language model or another type of generative model. A segment as used herein includes at least one block and can contain one or more contribution threads. A segment does not contain any other segments, in some implementations.

In the illustration of FIG. 13, the document content D1 includes one block (block 1) and N segments, where N is a positive integer. Segment 1 of the document content D1 contains two blocks (block 2 and block 3). Segment 2 of the document content D1 contains one block (block 4) and a contribution thread (contribution thread 1). Segment N of the document content D1 contains one block (block N) and a contribution thread (contribution thread N).

Each segment is assigned its own segment identifier, which is different from the document identifier D1 and different from the document package identifier DP1. For example, segment 1 is assigned a unique segment identifier C1, and block 2 and block 3 are both linked with the segment identifier C1 as well as the document identifier D1. Segment 2 is assigned a unique segment identifier C2, which is different from the segment identifier C1, and block 4 and contribution thread 1 are both linked with the segment identifier C2 as well as the document identifier D1. Segment N is assigned a unique segment identifier CN, and block N and contribution thread N are linked with the segment identifier CN as well as the document identifier D1.

In the illustrated example, blocks are not assigned unique block identifiers but rather are considered part of a document identified by a document identifier and/or part of a segment identified by a segment identifier. Because segments have unique segment identifiers that are different from the document identifier, any segment can be extracted from the document and used by the generative language model to create a new document.

The segment-based architecture enables segments to be extracted from the document and used to generate new documents. For example, the segment-based architecture enables a relatively small segment of a document to become the subject or basis of an entire new document generated using a generative language model. As described in more detail below, contributors can be invited to contribute to that entire new document and/or its respective segments. As another example, using the segment-based architecture, new documents can be generated using the generative language model based on network activity data linked to a particular contribution, such that the subject matter of the newly generated document is focused on just the contribution that received the network activity data. As a further example, using the segment-based architecture, new documents can be generated by assembling or joining together segments from different documents based on the respective network activity data associated with those segments.

A contribution thread includes one or more contributions 1310 that have been added to a segment by users of an online system who have been invited to contribute to the document containing the segment. For example, contribution thread 1 includes two contributions 1310: a first contribution U1C1 by a user U1 and a second contribution U2C1 by a user U2. Contribution thread N includes a contribution U3C1 from a user U3.

A contribution has an associated contribution score 1312 and an associated contributor score 1314. A contribution score 1312 is computed based on network activity data linked with the contribution. Network activity data includes, for instance, social action data, e.g., one or more digital social actions received by the online system from, e.g., a front end of the online system executing at a client device. For example, a contribution score 1312 can correspond to a count of digital social reactions that are linked with the contribution through a front end graphical user interface of the online system. Digital social reactions can be represented, for example, as graphical user interface user input control elements, such as emojis or icons, which receive input via a graphical user interface (e.g., clicks on buttons such as like, thumbs up, "insightful," "support," "curious," etc.).

A contributor score 1314 is computed based on attribute data and network activity data associated with the contributor who created the contribution. For instance, a contributor score 1314 can correspond to an affinity between the contributor's attribute data (e.g., skill set data) and a topic associated with the segment with which the contribution is linked. Alternatively or in addition, the contributor's historical network activity data can be factored into the contributor score. For example, the contributor score increases if the contributor has previously published content to the online system on the same topic as the document or segment linked with the contribution, in some implementations.

In the example of FIG. 13, the contribution U1C1 has the highest contribution score 1312 (100) while the contribution U3C1 has the highest contributor score 1314 (99). Either or both of the contribution score 1312 and the contributor score 1314 can be used by the generative collaborative publishing system to determine whether to use a segment to generate a new document. For example, the contribution with the highest contribution score can be used, alone or in combination with its associated segment, to generate a new document. As another example, these highest ranked contributions can be featured or highlighted within the overall article, e.g., by displaying the highest ranked contributions at the graphical user interface positions that have the highest visibility to the viewing user. In some implementations, several contributions, such as those with the highest contribution scores, e.g., U1C1 and U3C1, can also be used in combination to generate a new document based on the subject matter of the combination of contributions using the generative language model. The examples shown in FIG. 13 and the accompanying description, above, are provided for illustration purposes. This disclosure is not limited to the described examples.

Figure 14:
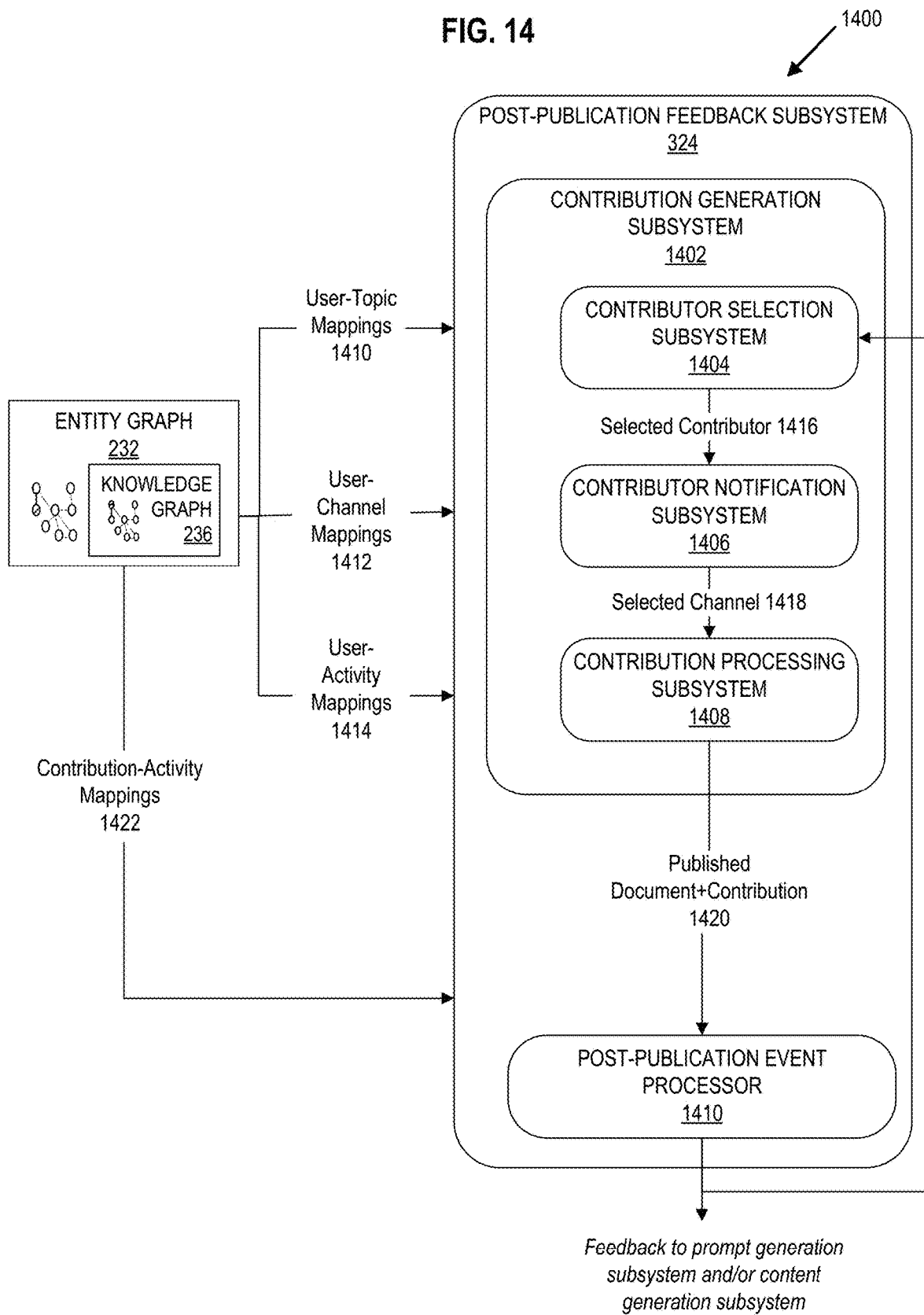
FIG. 14 is a flow diagram of an example method for post-publication feedback generation and processing using components of a post-publication feedback subsystem in accordance with some embodiments of the present disclosure.

FIG. 14 is a flow diagram of an example method for post-publication feedback generation and processing using components of a post-publication feedback subsystem in accordance with some embodiments of the present disclosure.

The method 1400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1400 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 14, post-publication feedback subsystem 324 includes a contribution generation subsystem 1402 and a post-publication event processor 1410. Contribution generation subsystem 1402 generates post-publication contributions to generative language model-generated documents that have been published to a network by a publishing subsystem, e.g., publishing subsystem 320.

While shown and described here in connection with post-publication feedback subsystem 324, portions of contribution generation subsystem 1402 can be implemented in connection with a pre-publication feedback subsystem. For example, contribution generation subsystem 1402 can identify potential contributors, surface contribution invitations, and receive user contributions to documents output by generative language models prior to publication of those documents. Similarly, any of the pre-publication mechanisms can alternatively or additionally be implemented in connection with a post-publication feedback subsystem such that, for example, ratings and/or edits can be generated and received after document publication and used to formulate feedback for prompt refinement and/or model training.

Contribution generation subsystem 1402 includes a contributor selection subsystem 1404, a contributor notification subsystem 1406, and a contribution processing subsystem 1408. As described in more detail below, the various components of post-publication feedback subsystem 324 interface with and obtain data from one or more entity graphs, such as entity graph 232, described above or entity graph 500, shown in FIG. 5 and described above. For example, contribution generation subsystem 324 obtains and uses various mappings, including user-topic mappings 1410, user-channel mappings 1412, user-activity mappings 1414, and contribution-activity mappings 1422. Examples of mappings that can be used by contribution generation subsystem 1402 and/or other components of the generative collaborative publishing system are shown in FIG. 15, described below.

Contributor selection subsystem 1404 identifies and selects, from among a population of users of a network, e.g., users of application software system 230, potential contributors of post-publication contributions to one or more generative language model-generated documents that have been published to the network. For example, in some implementations, only users whose associated user profiles list a skill related to a generative language model-generated document and also have a high skill set affinity score may be selected as potential contributors.

In some implementations, contributor selection subsystem 1404 identifies potential contributors by computing a contributor score for each potential contributor for each potential document topic and ranking the potential contributors according to their respective topic-specific scores. For example, given a set of users that are linked with associated skill sets and a set of generative language model-generated documents that are linked with associated topics, contributor selection subsystem 1404 generates a skill set affinity score for each potential contributor and uses a skill set to topic mapping extracted from an entity graph such as entity graph 232, e.g., entity graph 500, described above, to match potential contributors with documents.

In some implementations, the contributor score for a potential contributor includes the skill set affinity score and an activity score. In some implementations, the skill set affinity score is computed based on attribute data extracted from the user's online profile. For example, if a user's profile contains a current job title and job history data that are related to a particular skill set, the user's skill set score is likely to be higher for that skill set than if the user's profile did not contain either of those elements. As another example, if the user's profile includes a badge for a particular skill set or topic, where the badge indicates, for example, that the user has previously published or contributed to documents related to the particular skill set or topic, the user's skill set score is likely to be higher for that skill set than if the user's profile did not contain either of those elements. In some implementations, contributor selection subsystem 1404 searches entity profiles for badges and identifies potential contributors based on the presence or absence of badges in the entity profiles.

In some implementations, the activity score for a potential contributor is computed based on user-activity mappings 1414 obtained from entity graph 232, e.g., entity graph 500. User-activity mappings 1414 contain links between the user and the user's recent activity in the online system, such as content generation data that includes historical data about the user's content generation activity in the online system. For example, if the user has published an article related to the user's skill set within the preceding week or month, the user's activity score is likely to be higher for that skill set than if the user's recent online activity had not included publishing the article. As another example, a user who publishes more frequently in a skill related to a document can have a higher activity score than another user who does not publish in that related skill. As a further example, a user whose previous posts for the skills related to the document have a higher network engagement (e.g., social reaction data) will have a higher score than another user whose posts for those skills have a lower network engagement.

In some implementations, the skill set affinity score and the activity score are combined or merged to generate a final contributor score for the user for a given skill set. Using a skill set to topic mapping obtained from an entity graph, contributor selection subsystem 1404 maps the user's skill set-specific contributor scores to document topics to obtain user-topic mappings 1410. Based on the user-topic mappings 1410, contributor selection subsystem 1404 generates, for each user, a list of the top k topics, and for each topic, a list of the top k users, where k is a positive integer that can be determined based on the requirements of a particular design or implementation of the generative collaborative publishing system. For example, in some implementations, a list of the top five topics are generated for each user and for each topic, a list of the top ten, twenty, or even hundred thousand users are generated. Also, it should be understood that k is used throughout this disclosure, in various different contexts, to represent the potential size of a set. Thus, the value of k can be different or determined differently in each of the described contexts.

Contributor selection subsystem 1404 determines a set of one or more selected contributors 1404 for a given document or topic based on the contributor scores and the user-topic mappings 1410. For each of the selected contributors 1404, contributor notification subsystem 1406 selects an optimal communication channel to be used to deliver an electronic notification to the selected contributor 1416. Examples of communication channels include software platforms (e.g., mobile or web) and in-app content delivery channels (e.g., email, feed, instant message, notifications screen, home screen, banner, recommendation, etc.).

To determine a selected channel 1418 for a given selected contributor 1416, contributor notification subsystem 1406 determines user-channel mappings 1412. For example, contributor notification subsystem 1406 extracts channel usage data from an entity graph, e.g., entity graph 500, described above, and computes a set of channel affinity scores based on the channel usage data. Channel usage data includes, for example historical data about the selected contributor's usage of the different available delivery channels. A channel affinity score based on channel usage data represents a likelihood of the selected contributor using a particular channel for a particular type of activity.

For example, referring to the entity graph 500, if a user logged in to a social network service on a mobile app and the user's only activity on the mobile app channel has been scrolling a news feed, and the same user also recently logged in to the social network service on a laptop and uploaded and published an article on a particular topic to the network using the web application on the laptop, the user's channel affinity score for the web application channel may likely be higher than the user's channel affinity score for the mobile app channel.

Contributor notification subsystem 1406 selects a delivery channel of a set of available delivery channels that has the highest channel affinity score for the selected contributor 1416, based on the user-channel mappings 1412, and outputs the selected channel 1418. Alternatively, if the selected contributor 1416 has already been sent article notifications or contributor invitations in the selected contributor 1416's most preferred channel, then the channel with the next highest channel affinity score is selected and used for the next article notification or invitation.

Additionally, contributor notification subsystem 1406 causes an electronic contributor invitation to be transmitted to the selected contributor 1416 on the selected channel 1418. An example of a contributor invitation is invitation 122 shown in FIG. 1. For example, the contributor invitation is linked with a generative language model-generated document that is surfaced to the selected contributor 1416 in a news feed, or the contributor invitation is sent to the user by email or placed in the selected contributor's notifications inbox.

The selected channel 1418 is maintained and passed to contribution processing subsystem 1408 so that if a response to the contribution invitation (e.g., a contribution to a segment of a generative language model-generated document) is received from the selected contributor 1416, the channel associated with the selected contributor's response can be compared to the originally selected channel 1418. Whether the selected contributor 1416 submits a contribution to a segment of a generative language model-generated document using the selected channel 1418 or a different channel, or does not respond to the contribution invitation, these data are collected and stored as channel usage data, and the additional channel usage data is used to update and re-compute the channel affinity scores for the selected contributor 1416.

Contribution processing subsystem 1408 receives, processes, and publishes contributions to segments of generative language model-generated documents from selected contributors 1416 on the network. For example, contribution processing subsystem 1408 links received contributions with respective segments of generative language model-generated documents by assigning a corresponding segment identifier and/or graphical user interface position to the respective contribution. If multiple contributions are received for the same segment, contribution processing subsystem 1408 ranks the contributions based on, for example, social action data and/or the contributor score described above. In some implementations, in a user interface, a contribution from a selected contributor 1416 with the highest contributor score is initially displayed in a first position relative to the corresponding segment while contributions from selected contributors 1416 having lower contributor scores are stored in cache but not displayed unless, for example, the user clicks on a "more" button on the user interface.

The contribution processing subsystem 1408 receives and tracks contribution-activity mappings 1422 using entity graph 232, e.g., entity graph 500. Contribution-activity mappings 1422 include social action data received by a contribution after the contribution is linked with the corresponding segment via the user interface. For example, the contribution processing subsystem 1408 counts the total number of social reactions (e.g., like, "insightful," "curious," etc.) received by each contribution and ranks the contributions based on social action count. Thus, while a first contribution from a contributor with the highest contributor score may be displayed in the first position initially, if a second contribution from another contributor with a lower contributor score receives a higher number of social reactions, the second contribution can be re-positioned into the first position on the user interface in place of the first contribution.

The contribution processing subsystem 1408 aggregates the social action counts for all contributions on the same segment of a particular generative language model-generated document. Based on a comparison of the aggregate social action count for a given segment relative to corresponding aggregate social action counts for other segments, the post-publication feedback subsystem 324 can return the highest-ranking segment to the prompt generation subsystem and/or the content generation subsystem to serve as the basis for prompt refinement and/or new document generation. Similarly, based on the contribution-specific social action counts, the post-publication feedback subsystem 324 can return a specific segment-contribution pair (e.g., a segment plus the highest-ranking contribution to that segment) to the prompt generation subsystem and/or the content generation subsystem to serve as the basis for prompt refinement and/or new document generation.

Contribution processing subsystem 1408 causes a received contribution to be published to the network as part of the document that contains the segment with which the contribution is associated, e.g., as published document and contribution 1420. After published document and contribution 1420 is distributed by the network, e.g., served to other users of application software system 230, post-publication event processor 1410 receives and tracks user feedback on the published document and contribution 1420. For example, if a user who is not a selected contributor 1416 inputs a positive social reaction on the published document and contribution 1420, post-publication event processor 1410 identifies the user to contributor selection subsystem 1404 as a potential future contributor. In response to receiving potential future contributor identifying data, contributor selection subsystem 1404 adds the potential future contributor to a waitlist and contributor notification subsystem 1406 notifies the potential future contributor that they have been added to the waitlist, using the techniques described above.

Additionally or alternatively, based on post-publication user interface event counts associated with documents, segments, and/or contributions, the post-publication feedback subsystem 324 can return user interface event data associated with documents, segments, and/or contributions to the prompt generation subsystem and/or the content generation subsystem to serve as the basis for prompt refinement and/or new document generation.

The examples shown in FIG. 14 and the accompanying description, above, are provided for illustration purposes. This disclosure is not limited to the described examples.

FIG. 15 is a graphical representation 1500 of examples of mappings that can be used for generating contributor notifications in accordance with some embodiments of the present disclosure. For example, the mappings shown in FIG. 15 can be, or can be derived from, a portion of an entity graph such as entity graph 232, e.g., entity graph 500.

In the example of FIG. 15, data entities are represented by rectangular boxes and mappings 1502, 1504, 1506, and 1508 are represented by connections between the boxes. The connections or mappings can represent implicit or explicit relationships between data entities. For example, an explicit relationship between a user and a skill can occur when a user lists a particular skill in an online user profile. An implicit relationship between a user and a skill can be created based on statistics that are generated based on the user's online interactions. For instance, a statistical analysis of online interactions between users and online job applications can be used to identify or determine implicit relationships (or mappings) between, for example, users and skills. As an example, a statistical correlation between a user and a skill can be determined based on the user's online interactions with various job postings. If the statistical correlation between a user and a skill is higher than a threshold confidence value (e.g., greater than eighty or ninety percent), a link between the user and the skill can be implied. If the statistical correlation between the user and the skill is lower than the threshold confidence value (e.g., less than eighty or ninety percent), a link between the user and the skill is not implied (or inferred) based on the statistics.

In an online system such as application software system 230, a user can create a profile. In FIG. 15, a user profile includes a mapping 1508 of user identifier data, attribute data, and network activity data. For example, attribute data and network activity data are linked by a user identifier. FIG. 15 shows examples of profile data for N users, where N is a positive integer that represents the number of users having profiles in the online system.

User profile data are linked with skill set data by mapping 1506. For example, a link between a user's attribute data and a skill set is created when the user's attribute data contains information, such as a job title or job description, that matches the skill set. Similarly, a link between a user's network activity data and a skill set is created when the user's network activity includes activity that matches the skill set, such as conducting a job search that includes a search term that matches the skill set.

Skill set data are linked with topic data by mapping 1504. For example, a link between a skill set and a topic is created when a similarity score for a skill set-topic combination is greater than a threshold similarity score value, where the threshold similarity score value can be determined based on the requirements of a particular design or implementation of the generative collaborative publishing system.

Topic data are linked with documents, e.g., generative language model-generated documents, by mapping 1502. For example, a link between a topic and a document is created when a document contains words or phrases that match a topic. Whether a document contains words or phrases that match a topic can be determined using, for example, topic modeling or similarity computations.

Mappings can include other mappings. For example, a mapping that includes mapping 1508 and mapping 1506 can be used to link a user with a skill set. Similarly, a mapping that includes mappings 1508, 1506, and 1504 can be used to link a user with a topic. Likewise, a mapping that includes mappings 1508, 1506, 1504, and 1502 can be used to link a user with a document, e.g., a generative language model-generated document.

The examples shown in FIG. 15 and the accompanying description, above, are provided for illustration purposes. This disclosure is not limited to the described examples.

FIG. 16 is a flow diagram of an example method for processing post-publication contributions to a document using a generative collaborative publishing system in accordance with some embodiments of the present disclosure.

The method 1600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1600 is performed by one or more components of generative collaborative publishing system 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 16, generative language model 106 generates a document 1602 using the techniques described above. The document 1602 is arranged according to a segment architecture. The segment architecture divides the document 1602 into N segments, where N is a positive integer that represents the number of segments in the document.

A segment includes one or more blocks. A block includes digital content of at least one particular type, which has been output by a generative model, such as a generative language model. For example, in the document 1602, a segment 1 includes two blocks, a block 1 and a block 2, where block 1 includes a text heading and block 2 includes natural language text. The document 1602 also includes a segment 2, which includes a block 3 that contains a digital image. The document 1602 also includes a segment N, which includes two blocks, block 4 and block 5, where block 4 includes a text heading and block 5 includes text.

After document 1602 is distributed to publishing subsystem 120, one or more contributors can be invited to submit contributions to particular segments of the document 1604 via, for example, post-publication feedback subsystem 324. When a contributor submits a contribution to a segment, e.g., user 1 contribution, the contribution is linked to the segment, e.g., by a contribution thread that includes the segment identifier for the respective segment. As shown in FIG. 16, a new version of the document 1602, document 1604, includes the contribution (e.g., user 1 contribution). Based on post-publication measurements of social action data associated with the contribution, a segment-contribution pair 1606 can be created and returned to the generative language model 106 as post-publication feedback 1608. Using the techniques described above, post-publication feedback 1608 can be used by a prompt tuner to refine a prompt or select a prompt template, or can be used by a model trainer to re-train or fine tune the generative language model 106. The examples shown in FIG. 16 and the accompanying description, above, are provided for illustration purposes. This disclosure is not limited to the described examples.

FIG. 17 is a screen capture of an example contributor-document interface in accordance with some embodiments of the present disclosure.

In the example of FIG. 17, the example contributor-document interface display 1700 includes a display of a generative language model-generated document that includes contributions to specific segments of the document that have been received by the generative collaborative publishing system.

The display 1700 includes a document title 1702. In some implementations, document title 1702 is machine-generated by a generative language model based on a prompt that has been configured by a prompt generation component of the generative collaborative publishing system.

The display 1700 includes a non-contributable block 1704 and contributable segments 1706, 1708, 1710. The block 1704 includes a banner notification that contains a contributor invitation. The block 1704 also includes a piece of writing 1718. The piece of writing 1718 is machine generated by the generative language model based on the title 1702. For example, the title 1702 is incorporated into a prompt that is input to the generative language model, and the generative language model outputs the piece of writing 1718 based on the prompt that includes the title 1702. The block 1704 is not a contributable segment. As a result, there is no graphical user interface element associated with the block 1704 to enable contributions to be added to the block 1704.

The segment 1706 includes a segment title 1720. In some implementations, segment title 1720 is machine-generated by a generative language model based on a prompt that has been configured by a prompt generation component of the generative collaborative publishing system. The segment 1706 also includes a piece of writing 1722, e.g., segment text. The piece of writing 1722 is machine generated by the generative language model based on the segment title 1720. For example, the segment title 1720 is incorporated into a prompt that is input to the generative language model, and the generative language model outputs the piece of writing 1722 based on the prompt that includes the segment title 1720. The segment 1706 also includes a contribution 1724 received from, for example, an invited contributor. As part of the contribution 1724, the contributor (e.g., Firstname3 Lastname3) and a summary of the contributor's qualifications for making the contribution (e.g., Executive Coach, Project Manager, Keynote Speaker, etc.) are displayed. The contributor name and qualification data are extracted from the contributor's user profile, in some implementations.

A social reaction graphical user input control element 1728 is linked with the contribution 1724. The control element 1728 enables other users of the online system to input reactions (e.g., like, insightful, curious, etc.) on the contribution 1724 and also displays a count of the social reactions received on the contribution. The reactions received by the control element 1728 can be used to rank the contribution against other received contributions, to determine the graphical user interface position of display of the contribution 1724 relative to the segment text 1722 and relative to other contributions linked with the segment, and/or to determine whether the contribution and/or the segment should be used as post-publication feedback to a prompt generation system and/or generative language model trainer.

Another graphical user input control element 1730 is linked with the segment 1706. The control element 1730 enables contributors to create and add contributions, such as contribution 1724, to the segment 1706. For example, clicking on the control element 1730 opens a text input window through which a contribution on the segment can be created and submitted. Adjacent to the control element 1730 is a contribution count 1732. In the example, the contribution count 1732 indicates that there are two contributions on the segment 1706 although only one segment is displayed. The determination of which segment is displayed is made based on the social reaction data received via control element 1728.

The segment 1708 includes a segment title 1734. In some implementations, segment title 1734 is machine-generated by a generative language model based on a prompt that has been configured by a prompt generation component of the generative collaborative publishing system. The segment 1708 also includes a piece of writing 1736. The piece of writing 1736 is machine generated by the generative language model based on the segment title 1734. For example, the segment title 1734 is incorporated into a prompt that is input to the generative language model, and the generative language model outputs the piece of writing 1736 based on the prompt that includes the segment title 1734.

The segment 1708 does not include any contributions, however, a graphical user input control element 1738 is linked with the segment 1708. The control element 1738 enables contributors to create and add contributions to the segment 1708. For example, clicking on the control element 1738 opens a text input window through which a contribution on the segment 1708 can be created and submitted. In the example, the lack of a contribution count adjacent the control element 1738 indicates that there are no contributions on the segment.

The segment 1710 includes a segment title 1740. In some implementations, segment title 1740 is machine-generated by a generative language model based on a prompt that has been configured by a prompt generation component of the generative collaborative publishing system. The segment 1710 also includes a piece of writing 1742, e.g., segment text. The piece of writing 1742 is machine generated by the generative language model based on the segment title 1740. For example, the segment title 1740 is incorporated into a prompt that is input to the generative language model, and the generative language model outputs the piece of writing 1742 based on the prompt that includes the segment title 1740.

The segment 1710 also includes a contribution 1744 received from, for example, an invited contributor. As part of the contribution 1744, the contributor (e.g., Firstname4 Lastname4) and a summary of the contributor's qualifications for making the contribution (e.g., Partnerships at Company Z, etc.) are displayed. The contributor name and qualification data are extracted from the contributor's user profile or from an entity graph, in some implementations.

A social reaction graphical user input control element 1748 is linked with the contribution 1744. The control element 1748 enables other users of the online system to input reactions (e.g., like, insightful, curious, etc.) on the contribution 1744 and also displays a count of the social reactions received on the contribution. The reactions received by the control element 1748 can be used to rank the contribution against other received contributions, to determine the graphical user interface position of display of the contribution 1744 relative to the piece of writing, e.g., segment text 1742 and relative to other contributions linked with the segment, and/or to determine whether the contribution and/or the segment should be used as post-publication feedback to a prompt generation system and/or generative language model trainer.

Another graphical user input control element 1750 is linked with the segment 1710. The control element 1750 enables contributors to create and add contributions, such as contribution 1744, to the segment 1710. For example, clicking on the control element 1750 opens a text input window through which a contribution on the segment 1710 can be created and submitted.

The display 1700 includes a number of additional user feedback input control elements. For example, the display 1700 includes a user feedback section 1712. User feedback section 1712 includes feedback buttons 1752, 1754 as well as social action control buttons 1756, 1758. The display 1700 includes additional user feedback mechanisms 1714, 1726, 1746. The user feedback mechanisms 1714, 1726, 1746 can be selected to, for example, report the document or a particular contribution to, for instance, content moderation system 250. These and any of the user feedback mechanisms provided on display 1700 can be used to generate post-publication feedback that can be used to refine prompts, modify prompt templates, select new prompt templates, or re-train or fine tune the generative language model.

The examples shown in FIG. 17 and the accompanying description, above, are provided for illustration purposes. This disclosure is not limited to the described examples.

FIG. 18 is a flow diagram of an example method 1800 for prompt and content generation in accordance with some embodiments of the present disclosure.

The method 1800 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1800 is performed by one or more components of generative collaborative publishing system 240 of FIG. 2. For example, in some implementations, portions of the method 1800 are performed by one or more components of prompt generation subsystem 302, examples of which are shown in FIG. 3 and FIG. 4, described above. In some implementations, portions of the method 180 correspond to components of the method 800 shown in FIG. 8, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 1802, the processing device creates a first set of title prompts by applying a first set of title prompt templates to a seed, where the seed includes a topic descriptor. Examples of title prompts, title prompt templates, and seeds are described above, for example, with reference to FIG. 4, FIG. 5, FIG. 6, and FIG. 8. To apply a title prompt template to a seed, operation 1802 maps the seed to a seed placeholder of the title prompt template, in some implementations. In some implementations, the seed is generated based on skill set data extracted from a network. The first set of documents is published to the network, in some implementations.

In some implementations, an entity graph is used to determine the seed. For example, an entity graph is generated based on the network, where the entity graph includes a first node that represents a user of the network, a set of second nodes that represent skill sets, and a set of edges between the plurality of second nodes and the first node. The entity graph is used to compute affinity scores between the user and the skill sets, and the seed is selected based on the computed affinity scores. In some implementations, a skill set is used to select a prompt template. For example, the first set of title prompt templates is selected by matching the first set of title prompt templates to a skill set.

In some implementations, the title prompts are created based on one or more topics. For example, a set of topics is generated by applying a third generative language model to the topic descriptor; and the set of title prompts is output by the third generative language model based on the set of topics. In some implementations, the third generative language model is the same as the first generative language model. In other implementations, the third generative language model is different from the first generative language model. For example, the third generative language model could be a version of the first generative language model that is fine tuned to output a particular type or style of prompts.

In some implementations, a new set of title prompts is generated based on feedback input from one or more users of a network. For example, input on the first set of document titles is received from a network, wherein the input is generated by at least one user of the network, a second set of title prompts is generated based on the received input; and the first generative language model is applied to the second set of title prompts.

In some implementations, title prompts are determined based on search engine optimization data. For example, the seed is sent to a search engine optimization system, search engine optimization data including a set of frequently-used search terms related to the seed is received from the search engine optimization system, and the first set of title prompts is generated based on the search engine optimization data.

At operation 1804, the processing device, in response to input of the first set of title prompts to a first generative language model, outputs, by the first generative language model, based on the first set of title prompts, a first set of document titles. Examples of generative language models include generative language model 106, examples of which are described above with reference to FIG. 1 and FIG. 16, content generation subsystem 306, examples of which are shown in FIG. 3 and FIG. 7, and generative language model 706, examples of which are described above with reference to FIG. 7.

In some implementations, new document titles are output by the first generative language model in response to a previously-generated set of document titles, where the new document titles are generated by the first generative language model using a different title prompt template or a different set of title prompts. For example, a title prompt template is selected based on the first set of document titles, a second set of title prompts are generated based on the selected title prompt template, the first generative language model is applied to the second set of title prompts; and the first generative language model outputs, based on the second set of title prompts, a second set of document titles.

At operation 1806, the processing device creates a first set of document prompts by applying a first set of document prompt templates different from the first set of title prompt templates to the first set of document titles.

In some implementations, a new set of documents is output by the generative language model in response to a previously-generated set of documents, where the new set of documents is based on a different document prompt template or a different document prompt. For example, a document prompt template is selected based on the first set of documents, a second set of document prompts is generated based on the selected document prompt template, the second generative language model is applied to the second set of document prompts, and the second generative language model outputs, based on the second set of document prompts, a second set of documents.

In some implementations, a document prompt includes multiple prompts or sub-prompts. For example, a document prompt of the first set of document prompts includes an article prompt, a summary prompt, and a notification prompt, the article prompt includes a document title of the first set of document titles and an article prompt template, the summary prompt includes an article generated by the second generative language model based on the document title and a summary prompt template, and the notification prompt includes a summary generated by the second generative language model based on the article and a notification prompt template.

In some implementations, a document prompt includes segment-specific prompts, where a segment-specific prompt includes at least one prompt designed to cause the generative language model to output a specific segment of the document. For example, a document prompt of the first set of document prompts includes a first segment prompt and a second segment prompt different from the first segment prompt, the first segment prompt includes a first document title of the first set of document titles and a segment prompt template, and the second segment prompt includes a second document title of the first set of document titles and the segment prompt template.

At operation 1808, the processing device, in response to input of the first set of document prompts to a second generative language model, outputs, by the second generative language model, based on the first set of document prompts, a first set of documents.

In some implementations, the second generative language model is the same as the first generative language model. In other implementations, the second generative language model is different from the first generative language model. For example, the second generative language model could be a version of the first generative language model that is fine tuned to output a particular type or style of documents.

The examples shown in FIG. 18 and the accompanying description, above, are provided for illustration purposes. This disclosure is not limited to the described examples.

FIG. 19 is a flow diagram of an example method 1900 for pre-publication content processing in accordance with some embodiments of the present disclosure.

The method 1900 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1900 is performed by one or more components of generative collaborative publishing system 240 of FIG. 2. For example, in some implementations, portions of the method 190 are performed by one or more components of pre-publication content processing subsystem 316, examples of which are shown in FIG. 3 and FIG. 12, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 1902, the processing device generates a first version of a first document that includes digital content output by a generative language model. Examples of generative language models include generative language model 106, examples of which are described above with reference to FIG. 1, and FIG. 16, content generation subsystem 306, examples of which are shown in FIG. 3 and FIG. 7, and generative language model 706, examples of which are described above with reference to FIG. 7.

At operation 1904, the processing device generates a second version of the first document by dividing the first version of the first document into segments, where a first segment includes a subset of the digital content output by the generative language model. Examples of segments are shown in FIG. 13, FIG. 16, and FIG. 17, described above. For instance, a segment is identified by searching the first version of the first document for header text. When header text is identified in the first version of the first document and digital content related to the header text is also identified in the first version of the first document, a segment is created that contains the header text and the identified digital content related to the header text.

At operation 1906, the processing device enables contributions to the first segment by linking a first user input graphical user interface (GUI) control element with the first segment, and enable contributions to a second segment of the plurality of segments by linking a second user input GUI control element with the second segment. Examples of links between GUI control elements and segments are shown in FIG. 17, described above. In some implementations, links between GUI control elements and segments are created using segment identifiers, mappings, and/or entity graphs.

Examples of segment identifiers, mappings, and entity graphs are shown in FIG. 2, FIG. 5, FIG. 13, FIG. 15, and FIG. 16, described above.

In some implementations, a GUI control element is used to receive social action data, e.g., likes and other social reactions, for a contribution. For example, a third user input GUI control element is linked with the first contribution, and first social action data relating to the first contribution is received via the network and the third user input GUI control element.

In some implementations, social action data is used to assign received contributions to GUI positions. For example, a contribution that has received the most social action data is assigned to a GUI position that has the highest visibility on the GUI. As an example, a first GUI position is linked with the first segment, social action data relating to the first contribution is received via the network, and based on the social action data, the first contribution is assigned to the first GUI position.

In some implementations, social action data received for contributions to segments of a document are used to assign the segments to GUI positions. For example, a segment of the document that has a contribution that has received the most social action data (e.g., likes or other digital social reactions) is assigned to the highest visibility GUI position while other segments that have contributions with less social action data are assigned to lower visibility GUI positions. For instance, social action data relating to at least one of the first contribution or the second contribution is received via the network, and the respective segments are assigned to GUI positions based on the received social action data.

In some implementations, skill set data and/or other user profile data of a contributing user is linked with the user's contributions to segments of generative language model-generated documents. For example, skill set data associated with the first user is retrieved from at least one data store, and the retrieved skill set data is linked with the first contribution. Examples of links between skill set data and contributions are shown in FIG. 17, described above. In some implementations, links between skill set data and contributions are created using segment identifiers, mappings, and/or entity graphs. Examples of segment identifiers, mappings, and entity graphs are shown in FIG. 2, FIG. 5, FIG. 13, FIG. 15, and FIG. 16, described above.

At operation 1908, the processing device publishes the second version of the first document to a network. Examples of publishing subsystems that can be used to publish the second version of the first document to a network include, for example, publishing subsystem 120 shown in FIG. 1, described above, and publishing subsystem 320 shown in FIG. 3, described above. In some implementations, one or more received contributions are incorporated into a document and/or used to generate a new document using the generative language model. For example, a third version of the first document that includes the second version of the first document and at least of the first contribution or the second contribution is generated using the generative language model and the third version of the first document is published to the network.

At operation 1910, the processing device receives, via the network and the first user input GUI control element, a first contribution to the second version of the document, where the first contribution includes digital content generated by a first user of the network.

In some implementations, social action data is received and collected for each received contribution, and the social action data is used to generate a new version of a generative language model-generated document or to generate a new document using the generative language model. For example, social action data relating to the first contribution is received via the network, and based on the social action data, the generative language model outputs a first version of a second document, where the first version of the second document is based on at least one of the first segment or the first contribution.

At operation 1912, the processing device creates a first segment-contribution pair by linking the first contribution with the first segment. Examples of links between contributions and segments are shown in FIG. 13 and FIG. 16, described above. In some implementations, links are created using an entity graph, such as entity graph 232 shown in FIG. 2, described above, or entity graph 500 shown in FIG. 5, described above.

In some implementations, the generative language model is trained or fine-tuned based on social action data received for a contribution. For example, social action data relating to the first contribution is received via the network, training data is generated based on the social action data, where the training data is based on the first segment-contribution pair, and the generative language model is trained based on the training data.

At operation 1914, the processing device creates a second segment-contribution pair by linking the second contribution with the second segment, where at least one of the first segment-contribution pair or the second segment-contribution pair is capable of being used to generate, by the generative language model, a second document. In some implementations, a segment-contribution pair is used to create a new prompt for the generative language model. For example, a prompt for the generative language model is generated based on the at least one of the first segment-contribution pair or the second segment-contribution pair.

In some implementations, social action data (e.g., likes and/or other digital social reactions) are used to assign badges, such as "top contributor" and/or "topic expert" badges, to contributing users. For example, social action data relating to the first contribution is received via the network, and based on the received social action data, a badge is linked with the first user. Examples of badges include icons and other graphical elements that are displayed on or in connection with a user's profile in an online system such as a social network service.

The examples shown in FIG. 19 and the accompanying description, above, are provided for illustration purposes. This disclosure is not limited to the described examples.

FIG. 20 is a flow diagram of an example method for tuning prompt generation based on pre-publication feedback in accordance with some embodiments of the present disclosure.

The method 2000 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 2000 is performed by once or more components of generative collaborative publishing system 240 of FIG. 2. For example, portions of the method 2000 are performed by one or more components of filtering mechanism 110, grouping mechanism 112, rating tool 114, editing tool 116, and/or decision mechanism 118 shown in FIG. 1, described above, or one or more components of pre-publication processing subsystem 316 shown in FIG. 3, FIG. 9, FIG. 10, and FIG. 11, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 2002, the processing device, in response to input of a first prompt to a generative language model, outputs, by the generative language model, a first document that includes a first piece of writing, where the first piece of writing is based on the first prompt. Examples of generative language models include generative language model 106, examples of which are described above with reference to FIG. 1, and FIG. 16, content generation subsystem 306, examples of which are shown in FIG. 3 and FIG. 7, and generative language model 706, examples of which are described above with reference to FIG. 7. Examples of pieces of writing that can be output by the generative language model are shown in FIG. 10, and FIG. 11, and FIG. 17, described above. Additional examples of prompt and content generation are shown in FIG. 8, described above.

In some implementations, the first document includes multiple pieces of writing output by the generative language model, and one or more of the pieces of writing output by the generative language model include metadata. For example, the first document includes at least one first metadata item output by the generative language model in response to the first prompt, where the at least one first metadata item includes at least one of a first document title, a first summary, a first message text, or a first query description, or an instruction or example for a generative language model to generate a document title, a summary, message text, or query description, and based on the feedback, in response to the second prompt, the generative language model outputs at least one second metadata item different from the at least one first metadata item. Examples of metadata items are shown in FIG. 13, described above.

At operation 2004, the processing device receives feedback for the first document, where the feedback includes a rating for the first piece of writing. In some implementations, the feedback includes a rating instead of an edit; i.e., only a rating is received (without any edits to the first piece of writing). For example, receiving the feedback includes receiving a rating value instead of an edit to the first document. In other implementations, both the feedback includes both a rating and one or more edits to the first piece of writing.

In some implementations, a prompt includes a topic, received feedback is used to change the topic to a different topic, and the different topic is used to generate a new prompt. For example, the first prompt includes a first document topic, and based on the feedback, a second document topic different from the first document topic is determined, and the second prompt is generated based on the second document topic. Topics can be determined using entity graphs and/or mappings. Examples of entity graphs and mappings are shown in FIG. 1, FIG. 5, and FIG. 15, described above.

In some implementations, the feedback is generated by and received from one or more pre-publication filters. For example, a pre-publication filter is applied to the first piece of writing, where the pre-publication filter includes at least one machine learning model trained to at least one of classify or score digital content, at least one of a classification or a score for the first piece of writing is received from the pre-publication filter. In some implementations, the feedback is only received if a classification or score generated by a pre-publication filter satisfies a respective criterion. For example, the feedback is received in response to at least one of the received classification satisfying a classification criterion or the received score satisfying a score criterion.

In some implementations, the feedback is generated by and received from a user of an editing tool. For example, the first piece of writing is sent to a pre-publication editing tool, and the feedback is received from the pre-publication editing tool, where the feedback is generated by a user of the pre-publication editing tool. An example of an editing tool is shown in FIG. 10, described above.

In some implementations, the received feedback is used to train or fine tune a generative language model. For example, training data is based on the received pre-publication feedback, and the generative language model is trained based on the generated training data.

At operation 2006, the processing device, using the generative language model, generates a second prompt different from the first prompt, where the second prompt is based on the received feedback.

In some implementations, the prompt has a specific structure, such as a multi-step structure or a wrapper structure, and a specific portion of the prompt structure is modified based on received feedback. For example, the second prompt includes a seed and a second prompt template, the second prompt template includes a prefix, a placeholder for the seed, and a suffix, at least one of the first piece of writing or the feedback is included in the prefix, and/or the seed is modified based on the feedback, and/or at least one of a new instruction or a new example is included in the suffix, where the at least one of the new instruction or the new example is based on the feedback.

In some implementations, prompt templates are used to generate prompts, and the prompt templates are selected from a library or repository of prompt templates based on received feedback. For example, the second prompt includes a second prompt template, possible prompt templates are scored based on the feedback, and the second prompt template is selected from the scored set of possible prompt templates.

At operation 2008, the processing device, in response to input of the second prompt to the generative language model, outputs a second document different from the first document, where the second document includes a second piece of writing based on the second prompt. For example, the second piece of writing contains digital content output by the generative language model, where the output is based on the second prompt, and the second prompt is formulated based on pre-publication feedback received from, for instance, a pre-publication filtering mechanism, an editing tool, and/or a rating tool.

At operation 2010, the processing device publishes the second document to a network. Examples of publishing subsystems that can be used to publish the second version of the first document to a network include, for example, publishing subsystem 120 shown in FIG. 1, described above, and publishing subsystem 320 shown in FIG. 3, described above. In some implementations, publishing the second document to the network includes publishing the second piece of writing output by the generative language model instead of the first piece of writing output by the generative language model.

In some implementations, after the second document is published, contributions to portions of the second document are received from the network. For example, a contribution to the second piece of writing is received from the network, where a user of the network creates the contribution.

In some implementations, a post-publication contribution to a piece of writing output by the generative language model is used to cause the generative language model to generate a new prompt. For example, using the generative language model, a third prompt different from the first prompt and the second prompt is generated, where the third prompt is based on the received contribution. In some implementations, the new prompt is used to cause the generative language model to output a third piece of writing based on the new prompt. For example, the generative language model outputs a third document that includes a third piece of writing, where the third piece of writing is based on the received post-publication contribution.

The examples shown in FIG. 20 and the accompanying description, above, are provided for illustration purposes. This disclosure is not limited to the described examples.

FIG. 21 is a flow diagram of an example method for tuning prompt generation based on post-publication feedback in accordance with some embodiments of the present disclosure.

The method 2100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 2100 is performed by one or more components of generative collaborative publishing system 240 of FIG. 2. For example, a portions of the method 2100 are performed by one or more components of prompt generation subsystem 302, examples of which are shown in FIG. 3, FIG. 4, FIG. 7, and FIG. 8, described above, and or one or more components of post-publication feedback mechanism 122, 124, an example of which is shown in FIG. 1, described above, and/or one or more components of post-publication feedback subsystem 324, examples of which are shown in FIG. 3, FIG. 14, and FIG. 17, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 2102, the processing device, in response to input of a first prompt to a generative language model, outputs, by the generative language model, a first set of document packages, where a document package of the first set of document packages includes at least one of a document, a summary of the document, or a notification about the document, and where the at least one of the document, the summary of the document, or the notification about the document includes a first piece of writing output by the generative language model in response to the first prompt. Examples of generative language models include generative language model 106, examples of which are described above with reference to FIG. 1, and FIG. 16, content generation subsystem 306, examples of which are shown in FIG. 3 and FIG. 7, and generative language model 706, examples of which are described above with reference to FIG. 7. An example of a document package is shown in FIG. 13, described above.

At operation 2104, the processing device receives, from the network, a first contribution to the first piece of writing, where the first contribution includes a second piece of writing generated by a first user of the network in response to a publishing of the first set of document packages to the network. Examples of mechanisms by which post-publication contributions to a piece of writing output by a generative language model can be received include post-publication feedback mechanism 122, 124, an example of which is shown in FIG. 1, described above, and/or one or more components of post-publication feedback subsystem 324, examples of which are shown in FIG. 3, FIG. 14, and FIG. 17, described above.

In some implementations, post-publication contributions are used to train or fine tune a generative language model. For example, training data is generated based on the first prompt and the first contribution, and at least one of the first generative language model or the second generative language model is trained based on the training data.

At operation 2106, the processing device generates, based on the first contribution, a second prompt different from the first prompt. In some implementations, the first prompt, which is used by the generative language model to output the first piece of writing, includes a first seed, the first seed includes a document topic, the second prompt includes a second seed different from the first seed, and the second seed is determined based on the first contribution, which is received via a post-publication feedback mechanism. In some implementations, the first seed includes a first document title and the second seed includes a second document title different from the first document title. In other words, a document topic or a document title, which is used to formulate a prompt for a generative language model, is modified based on a post-publication contribution, in some implementations.

In some implementations, prompts include or are created using prompt templates, and post-publication contributions to writings previously output by a generative language model are used to modify the prompts or prompt templates. For example, the first prompt includes a first prompt template, the first prompt template includes at least one of a first instruction or a first example, the second prompt includes a second prompt template different from the first prompt template, the second prompt template includes at least one of a second instruction or a second example, and the at least one of the second instruction or the second example is determined based on the first contribution.

In some implementations, prompts are selected from a library or repository based on post-publication contributions to writings previously output by a generative language model. For example, the second prompt includes a second prompt template, prompt templates are scored based on the first contribution, and the second prompt template is selected based on the scored prompt templates.

In some implementations, prompts are generated or modified based on differences between post-publication contributions to writings output by a generative language model and the original writings themselves. For example, a difference between the first contribution received from the network and the first piece of writing generated by the generative language model is generated in response to the first prompt, and the second prompt is generated based on the difference between the first contribution received from the network and the first piece of writing generated by the generative language model in response to the first prompt.

At operation 2108, the processing device, in response to input of the second prompt to the generative language model, outputs, by the generative language model, based on the second prompt, a second set of document packages different from the first set of document packages.

In some implementations, contributions are scored or ranked based on respective social action data, and a particular contribution is selected to be used for post-publication feedback based on the scores or rankings of the contributions. For example, a contribution with the highest count of digital social actions may be selected and used for post-publication feedback while a different contribution with a lower count of digital social actions is not used for post-publication feedback. For instance, at least one second contribution to the first piece of writing is received from the network, a first contribution score that includes a first measurement of digital social action is generated and linked to the first contribution, a second contribution score that includes a second measurement of digital social action is generated and linked to a second contribution, and the first contribution is selected and used for post-publication feedback based on a comparison of the first contribution score with the second contribution score.

In some implementations, contributor scores are generated for the users who submit contributions to writings output by a generative language model, and the contributor scores are used to select contributions to be used for post-publication feedback. For example, a contribution made by a contributor with a high contributor score may be selected and used for post-publication feedback while a different contribution made by a contributor with a lower contributor score is not used for post-publication feedback. For instance, at least one second contribution to the first piece of writing is received from the network, where the at least one second contribution is generated by at least one second user of the network, a first contributor score is generated for a first contribution, where the first contributor score includes at least one of a first measurement of network activity associated with the first user or a first measurement of similarity between attribute data associated with the first user and metadata associated with the first piece of writing, a second contributor score for a second contribution, where the second contributor score includes at least one of a second measurement of network activity associated with the second user or a second measurement of similarity between attribute data associated with the second user and metadata associated with the first piece of writing, and the first contribution is selected and used for post-publication feedback instead of the second contribution based on a comparison of the first contributor score to the second contributor score.

In some implementations, filter output of a filtering mechanism is used to generate or modify a prompt. For example, a filter mechanism is applied to the first piece of writing output by the generative language model, where the filter mechanism includes at least one machine learning model trained to detect at least one particular type of content, in response to the first piece of writing, the filter mechanism generates at least one filter output, such as a label or a score, and the second prompt is generated based on the at least one filter output of the filter mechanism.

In some implementations, edits or rating values are used to generate or modify a prompt. For example, the first piece of writing output by the generative language model is sent to an editing tool, at least one of an edit or a rating is received from the editing tool, where the at least one of the edit or the rating is generated by a user of the editing tool, and the second prompt is generated based on the at least one of the edit or the rating received from the editing tool. In some implementations, scores, rankings, and labels, such as contribution scores and contributor scores, used in the method 2100, are computed or determined using, for example, user identifiers, segment identifiers, mappings, and/or entity graphs. Examples of identifiers, mappings, and entity graphs are shown in FIG. 2, FIG. 5, FIG. 13, FIG. 15, and FIG. 16, described above. The examples shown in FIG. 21 and the accompanying description, above, are provided for illustration purposes. This disclosure is not limited to the described examples.

FIG. 22 is a flow diagram of an example method for selecting a notification channel for contributors in accordance with some embodiments of the present disclosure.

The method 2200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 2200 is performed by one or more components of generative collaborative publishing system 240 of FIG. 2. For example, portions of the computing system 200 are performed by one or more components of post-publication feedback mechanism 122, 124, an example of which is shown in FIG. 1, described above, and/or one or more components of post-publication feedback subsystem 324, examples of which are shown in FIG. 3, FIG. 14, and FIG. 17, described above. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 2202, the processing device identifies a user of a network as a possible contributor of digital content to a document that is published via the network. In some implementations, the document is output by a generative language model, and a contribution to the document is received via the network, where the contribution is generated by the user in response to the invitation. Examples of generative language models include generative language model 106, examples of which are described above with reference to FIG. 1, and FIG. 16, content generation subsystem 306, examples of which are shown in FIG. 3 and FIG. 7, and generative language model 706, examples of which are described above with reference to FIG. 7.

In some implementations, the user is identified and selected to be invited to contribute to a document output by a generative language model based on the user's history of generating and publishing content to an online system, such as a social network service, relating to one or more particular topics. For example, content generation data that includes historical data about generation, by the user, of content relating to a topic associated with the document is generated, based on the content generation data, a contributor score for the user is computed, where the contributor score includes an estimate of a likelihood of the user contributing content associated with the topic to the document, and based on the contributor score, the user is selected from a set of users of the network.

In some implementations, the user is identified and selected to be invited to contribute to a document output by a generative language model based on the user's history of receiving social actions on the user's previous publications of content to an online system, such as a social network service, relating to one or more particular topics. For example, social action data is received, where the social action data includes historical data about digital social actions received by the network in response to publication, by the user, via the network, of content relating to a topic associated with the document, a contributor score for the user is computed based on the social action data, where the contributor score includes an estimate of a likelihood of a contribution to the document, by the user, receiving digital social actions, and based on the contributor score, the user is selected, from a set of users of the network, to be invited to contribute to a document output by a generative language model.

In some implementations, the user is identified and selected to be invited to contribute to a document output by a generative language model based on the user's history of receiving a particular type of badge. For example, if the user has previously been awarded a badge as a result of a previous contribution by the user to a document output by a generative language model related to a particular topic, the user may be selected, instead of other users, to receive an invitation to contribute to a different document output by the generative language model. For instance, entity profile data published on the network is searched for a badge or an indicator of a badge, in response to determining that entity profile data associated with the user includes the searched-for badge, the user is selected, from a set of users of the network, to receive a new invitation to contribute to a document output by a generative language model.

In some implementations, the user is selected to receive an invitation to contribute to a document output by a generative language model based on the relevance of the user's skill set to a topic associated with the document output by the generative language model. For example, document topic to skill set mappings are generated, and based on the document topic to skill set mappings, the user is selected, from a set of users of the network, to receive an invitation to contribute to a document output by a generative language model.

In some implementations, the document topic to skill set mappings are created using data extracted from an online system, such as a social network service. For example, document topic data is extracted from documents output by a generative language model, skill set data is extracted from entity profiles published on the network, and the document topic to skill set mappings are generated by matching the document topic data to the skill set data.

In some implementations, a user's historical interaction data pertaining to particular skill sets and/or invitations is measured and used to determine whether to send an invitation to the user to contribute to a new document output by a generative language model. For example, interaction data between the user and the document output by the generative language model is received, via the network, where the interaction data is generated by the user in response to the invitation, attribute data associated with the interaction data is determined, where the attribute data comprises skill set data, based on the attribute data associated with the interaction data, a contributor score is computed for the user, where the contributor score includes an estimate of a likelihood of the user contributing content associated with the skill set data to output of a generative language model, and based on the contributor score, sending a second invitation to the user.

At operation 2204, the processing device identifies at least two different channels on the network that are each capable of sending, to the user, an invitation for the user to contribute to the document. Examples of channels include software-based channels, such as web applications and mobile apps as well as different in-app channels such as notification centers, inboxes, and feeds, hardware-based channels, such as hardware devices made by different device manufacturers, and channels that are a combination of hardware and software, such as different operating systems and user interfaces. In some implementations, the at least two different channels are identified as those notification channels that are made available through a particular online system, for example, the various notification delivery channels provided by a social network service (e.g., feed, notification center, home page, inbox, etc.).

At operation 2206, the processing device determines respective channel usage data for each of the at least two different channels, where the channel usage data includes, for a channel of the at least two different channels, historical data relating to use of the channel by the user to interact with content. In some implementations, channel usage data is determined using mappings or entity graphs, for example portions of the entity graph shown in FIG. 5, described above and/or one or more of the mappings shown in FIG. 15, described above.

At operation 2208, the processing device computes respective channel affinity scores for each of the at least two different channels based on the respective channel usage data, where a channel affinity score includes, for a channel of the at least two different channels, an estimate of a likelihood of the user contributing to the document through the channel. In some implementations, channel affinity scores are determined using mappings or entity graphs, for example portions of the entity graph shown in FIG. 5, described above and/or one or more of the mappings shown in FIG. 15, described above.

In some implementations, the channel usage data and channel affinity scores are updated based on the user's responses (or lack of responses) to invitations to contribute to documents output by generative language models, based on whether the user responded to an invitation through the same channel as was used to send the invitation to the user. For example, a contribution to the document is received, via the network, where the contribution is generated by the user in response to the invitation sent through a particular channel, such as an optimal channel, the channel usage data is updated based on the receiving of the contribution in response to the invitation sent through the particular channel, and the respective channel affinity scores are recomputed based on the updated channel usage data.

In some implementations, the channel usage data and channel affinity scores are updated based on the user's responses (or lack of responses) to invitations to contribute to documents output by generative language models, based on whether the user responded to an invitation through a different channel than the channel that was used to send the invitation to the user. For example, a contribution to the document is received via the network, where the contribution is generated by the user through a channel selected by the user, the channel usage data is updated based on the channel selected by the user to generate the contribution, and the respective channel affinity scores are recomputed based on the updated channel usage data.

At operation 2210, the processing device, based on the respective channel affinity scores, selects an optimal channel from the at least two different channels. The optimal channel is selected, in some implementations, based on ranking of the channel affinity scores. For example, the channel affinity scores are sorted in order so that the channel with the highest channel affinity score (e.g., the channel that the user uses most often to interact with content related to a particular topic) is the highest ranking channel, and the highest ranking channel is selected as the optimal channel.

At operation 2212, the processing device sends the invitation to the user through the optimal channel. To send an invitation, the processing device engages with a service that handles communications over the optimal channel, such as a feed ranker, a messaging service, a notification service, an email service, or an application front end, such as a graphical user interface. Examples of invitations are described above with reference to FIG. 1 and FIG. 17.

In some implementations, users who are not selected as invited contributors are identified and assigned to a waitlist. For example, after a document output by a generative language model is published to the network, a digital social action associated with the published document is received via the network, based on the received digital social action, a second user different from the first user is identified as a possible contributor to the document, and an invitation to join a waitlist to contribute to the document is sent to the second user.

In some implementations, scores, rankings, and labels, such as contribution scores, rankings, and contributor scores, used in the method 2200, are computed or determined using, for example, user identifiers, segment identifiers, mappings, and/or entity graphs. Examples of identifiers, mappings, and entity graphs are shown in FIG. 2, FIG. 5, FIG. 13, FIG. 15, and FIG. 16, described above. The examples shown in FIG. 22 and the accompanying description, above, are provided for illustration purposes. This disclosure is not limited to the described examples.

FIG. 23 is a block diagram of an example computer system including components of a generative collaborative publishing system in accordance with some embodiments of the present disclosure.

In FIG. 23, an example machine of a computer system 2300 is shown, within which a set of instructions, for causing the machine to perform any of the methodologies discussed herein, can be executed. In some embodiments, the computer system 2300 can correspond to a component of a networked computer system (e.g., as a component of the computer system 100 of FIG. 2) that includes, is coupled to, or utilizes a machine to execute an operating system to perform operations corresponding to one or more components of the generative collaborative publishing system 240 of FIG. 2. For example, computer system 2300 corresponds to a portion of computing system when the computing system is executing a portion of generative collaborative publishing system 240.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 2300 includes a processing device 2302, a main memory 2304 (e.g., read-only memory (ROM), flash memory, dynamic random access memory (DRAM) such as synchronous DRAM (SDRAM) or Rambus DRAM (RDRAM), etc.), a memory 23023 (e.g., flash memory, static random access memory (SRAM), etc.), an input/output system 2310, and a data storage system 2340, which communicate with each other via a bus 2330.

Processing device 2302 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2302 can also be at least one special-purpose processing device such as an application specific integrated circuit (ASIC), a field programmable gate array (FPGA), a digital signal processor (DSP), network processor, or the like. The processing device 2302 is configured to execute instructions 2312 for performing the operations and steps discussed herein.

In FIG. 23, generative collaborative publishing system 2350 represents portions of generative collaborative publishing system 240 when the computer system 2300 is executing those portions of generative collaborative publishing system 240. Instructions 2312 include portions of generative collaborative publishing system 2350 when those portions of the generative collaborative publishing system 2350 are being executed by processing device 2302. Thus, the generative collaborative publishing system 2350 is shown in dashed lines as part of instructions 2312 to illustrate that, at times, portions of the generative collaborative publishing system 2350 are executed by processing device 2302. For example, when at least some portion of the generative collaborative publishing system 2350 is embodied in instructions to cause processing device 2302 to perform the method(s) described above, some of those instructions can be read into processing device 2302 (e.g., into an internal cache or other memory) from main memory 2304 and/or data storage system 2340. However, it is not required that all of the generative collaborative publishing system 2350 be included in instructions 2312 at the same time and portions of the generative collaborative publishing system 2350 are stored in at least one other component of computer system 2300 at other times, e.g., when at least one portion of the generative collaborative publishing system 2350 are not being executed by processing device 2302.

The computer system 2300 further includes a network interface device 2308 to communicate over the network 2320. Network interface device 2308 provides a two-way data communication coupling to a network. For example, network interface device 2308 can be an integrated-services digital network (ISDN) card, cable modem, satellite modem, or a modem to provide a data communication connection to a corresponding type of telephone line. As another example, network interface device 2308 can be a local area network (LAN) card to provide a data communication connection to a compatible LAN. Wireless links can also be implemented. In any such implementation network interface device 2308 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 2300.

Computer system 2300 can send messages and receive data, including program code, through the network(s) and network interface device 2308. In the Internet example, a server can transmit a requested code for an application program through the Internet and network interface device 2308. The received code can be executed by processing device 2302 as it is received, and/or stored in data storage system 2340, or other non-volatile storage for later execution.

The input/output system 2310 includes an output device, such as a display, for example a liquid crystal display (LCD) or a touchscreen display, for displaying information to a computer user, or a speaker, a haptic device, or another form of output device. The input/output system 2310 can include an input device, for example, alphanumeric keys and other keys configured for communicating information and command selections to processing device 2302. An input device can, alternatively or in addition, include a cursor control, such as a mouse, a trackball, or cursor direction keys for communicating direction information and command selections to processing device 2302 and for controlling cursor movement on a display. An input device can, alternatively or in addition, include a microphone, a sensor, or an array of sensors, for communicating sensed information to processing device 2302. Sensed information can include voice commands, audio signals, geographic location information, and/or digital imagery, for example.

The data storage system 2340 includes a machine-readable storage medium 2342 (also known as a computer-readable medium) on which is stored at least one set of instructions 2344 or software embodying any of the methodologies or functions described herein. The instructions 2344 can also reside, completely or at least partially, within the main memory 2304 and/or within the processing device 2302 during execution thereof by the computer system 2300, the main memory 2304 and the processing device 2302 also constituting machine-readable storage media.

In one embodiment, the instructions 2344 include instructions to implement functionality corresponding to a generative collaborative publishing system (e.g., the generative collaborative publishing system 240 of FIG. 2).

Dashed lines are used in FIG. 23 to indicate that it is not required that the generative collaborative publishing system be embodied entirely in instructions 2312, 2314, and 2344 at the same time. In one example, portions of the generative collaborative publishing system are embodied in instructions 2344, which are read into main memory 2304 as instructions 2314, and portions of instructions 2314 are read into processing device 2302 as instructions 2312 for execution. In another example, some portions of the generative collaborative publishing system are embodied in instructions 2344 while other portions are embodied in instructions 2314 and still other portions are embodied in instructions 2312.

While the machine-readable storage medium 2342 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 23 and the accompanying description, above, are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 200, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described below, or any combination of any of the examples described below, or any combination of any portions of the examples described below.

In an example 101, a method includes, in response to input of a first prompt to a generative language model, outputting, by the generative language model, a first document including a first piece of writing, where the first piece of writing is based on the first prompt; receiving feedback for the first document, where the feedback includes a rating for the first piece of writing; using the generative language model, generating a second prompt different from the first prompt, where the second prompt is based on the feedback; in response to input of the second prompt to the generative language model, outputting a second document different from the first document, where the second document includes a second piece of writing based on the second prompt; and publishing the second document to a network.

An example 102 includes the subject matter of example 101, where publishing the second document to the network includes publishing the second piece of writing instead of the first piece of writing. An example 103 includes the subject matter of example 101 or example 102, where receiving the feedback includes receiving a rating value instead of an edit to the first document. An example 104 includes the subject matter of any of examples 101-103, further including: receiving, from the network, a contribution to the second piece of writing, where the contribution is created by a user of the network. An example 105 includes the subject matter of example 104, further including: using the generative language model, generating a third prompt different from the first prompt and the second prompt, where the third prompt is based on the received contribution. An example 106 includes the subject matter of example 104, further including: outputting, by the generative language model, a third document including a third piece of writing, where the third piece of writing is based on the received contribution. An example 107 includes the subject matter of any of examples 101-106, where the first prompt includes a first document topic, and the method further includes: based on the feedback, determining a second document topic different from the first document topic; and generating the second prompt based on the second document topic. An example 108 includes the subject matter of any of examples 101-107, where the first document includes at least one first metadata item output by the generative language model in response to the first prompt, the at least one first metadata item includes at least one of a first document title, a first summary, a first message text, or a first query description, and the method further includes: based on the feedback, generating, by the generative language model, in response to the second prompt, at least one second metadata item different from the at least one first metadata item. An example 109 includes the subject matter of any of examples 101-108, where the second prompt includes a seed and a second prompt template, the second prompt template includes a prefix, a placeholder for the seed, and a suffix, and the method further includes at least one of: including at least one of the first piece of writing or the feedback in the prefix; modifying the seed based on the feedback; or including at least one of a new instruction or a new example in the suffix, where the at least one of the new instruction or the new example is based on the feedback. An example 110 includes the subject matter of any of examples 101-109, where the second prompt includes a second prompt template, and the method further includes: scoring a plurality of possible prompt templates based on the feedback; and selecting the second prompt template from the scored plurality of possible prompt templates. An example 111 includes the subject matter of any of examples 101-110, further including: generating training data based on the feedback; and training the generative language model based on the generated training data. An example 112 includes the subject matter of any of examples 101-111, further including: applying a pre-publication filter to the first piece of writing, where the pre-publication filter includes at least one machine learning model trained to at least one of classify or score digital content; receiving, from the pre-publication filter, for the first piece of writing, at least one of a classification or a score; and receiving the feedback in response to at least one of the received classification satisfying a classification criterion or the received score satisfying a score criterion. An example 113 includes the subject matter of any of examples 101-102, further including: sending the first piece of writing to a pre-publication editing tool; receiving the feedback from the pre-publication editing tool, where the feedback is generated by a user of the pre-publication editing tool.

In an example 114, a system includes at least one processor; and at least one memory coupled to the at least one processor; where the at least one memory includes instructions which, when executed by the at least one processor, cause the at least one processor to perform operations including: in response to input of a first prompt to a generative language model, outputting, by the generative language model, a first document including a first piece of writing, where the first piece of writing is based on the first prompt; receiving feedback for the first document, where the feedback includes a rating for the first piece of writing; using the generative language model, generating a second prompt different from the first prompt, where the second prompt is based on the feedback; in response to input of the second prompt to the generative language model, outputting a second document different from the first document, where the second document includes a second piece of writing based on the second prompt; and publishing the second document to a network.

An example 115 includes the subject matter of example 114, where the instructions, when executed by the at least one processor, cause the at least one processor to perform operations further including: publishing the second piece of writing instead of the first piece of writing. An example 116 includes the subject matter of example 114 or example 115, where the instructions, when executed by the at least one processor, cause the at least one processor to perform operations further including: receiving a rating value instead of an edit to the first document. An example 117 includes the subject matter of any of examples 114-116, where the first prompt includes a first document topic, and the instructions, when executed by the at least one processor, cause the at least one processor to perform operations further including: based on the feedback, determining a second document topic different from the first document topic; and generating the second prompt based on the second document topic. An example 118 includes the subject matter of any of examples 114-117, where the first document includes at least one first metadata item output by the generative language model in response to the first prompt, the at least one first metadata item includes at least one of a first document title, a first summary, a first message text, or a first query description, and the instructions, when executed by the at least one processor, cause the at least one processor to perform operations further including: based on the feedback, generating, by the generative language model, in response to the second prompt, at least one second metadata item different from the at least one first metadata item. An example 119 includes the subject matter of any of examples 114-118, where the second prompt includes a seed and a second prompt template, the second prompt template includes a prefix, a placeholder for the seed, and a suffix, and the instructions, when executed by the at least one processor, cause the at least one processor to perform operations further including at least one of: including at least one of the first piece of writing or the feedback in the prefix; modifying the seed based on the feedback; or including at least one of a new instruction or a new example in the suffix, where the at least one of the new instruction or the new example is based on the feedback. An example 120 includes the subject matter of any of examples 114-119, where the second prompt includes a second prompt template, and the instructions, when executed by the at least one processor, cause the at least one processor to perform operations further including: scoring a plurality of possible prompt templates based on the feedback; and selecting the second prompt template from the scored plurality of possible prompt templates.

In an example 201, a method includes: creating a first set of title prompts by applying a first set of title prompt templates to a seed, where the seed includes a topic descriptor; applying a first generative language model to the first set of title prompts; outputting, by the first generative language model, based on the first set of title prompts, a first set of document titles; creating a first set of document prompts by applying a first set of document prompt templates different from the first set of title prompt templates to the first set of document titles; applying a second generative language model to the first set of document prompts; and outputting, by the second generative language model, based on the first set of document prompts, a first set of documents.

An example 202 includes the subject matter of example 201, further including: generating the seed based on skill set data extracted from a network; and publishing the first set of documents to a network. An example 203 includes the subject matter of example 202, further including: generating an entity graph based on the network, where the entity graph includes a first node that represents a user of the network, a plurality of second nodes that represent skill sets, and a plurality of edges between the plurality of second nodes and the first node; using the entity graph, computing affinity scores between the user and the skill sets; and selecting the seed based on the computed affinity scores. An example 204 includes the subject matter of any of examples 201-203, further including: generating a set of topics by applying a third generative language model to the topic descriptor; and using the set of topics to create the first set of title prompts. An example 205 includes the subject matter of any of examples 201-204, further including: selecting a title prompt template based on the first set of document titles; generating a second set of title prompts based on the selected title prompt template; applying the first generative language model to the second set of title prompts; and outputting, by the first generative language model, based on the second set of title prompts, a second set of document titles. An example 206 includes the subject matter of any of examples 201-205, further including: selecting a document prompt template based on the first set of documents; generating a second set of document prompts based on the selected document prompt template; applying the second generative language model to the second set of document prompts; and outputting, by the second generative language model, based on the second set of document prompts, a second set of documents. An example 207 includes the subject matter of any of examples 201-206, further including: selecting the first set of title prompt templates by matching the first set of title prompt templates to the skill set. An example 208 includes the subject matter of any of examples 201-207, further including: receiving input on the first set of document titles from a network, where the input is generated by at least one user of the network; generating a second set of title prompts based on the received input; and applying the first generative language model to the second set of title prompts. An example 209 includes the subject matter of any of examples 201-208, further including: sending the seed to a search engine optimization system; receiving, from the search engine optimization system, search engine optimization data including a set of frequently-used search terms related to the seed; and generating the first set of title prompts based on the search engine optimization data. An example 210 includes the subject matter of any of examples 201-209, where a document prompt of the first set of document prompts includes an article prompt, a summary prompt, and a notification prompt, the article prompt includes a document title of the first set of document titles and an article prompt template, the summary prompt includes an article generated by the second generative language model based on the document title and a summary prompt template, and the notification prompt includes a summary generated by the second generative language model based on the article and a notification prompt template. An example 211 includes the subject matter of any of examples 201-210, where a document prompt of the first set of document prompts includes a first segment prompt and a second segment prompt different from the first segment prompt, the first segment prompt includes a first document title of the first set of document titles and a segment prompt template, and the second segment prompt includes a second document title of the first set of document titles and the segment prompt template.

In an example 212, a system includes: at least one processor; and at least one memory coupled to the at least one processor; where the at least one memory includes instructions which, when executed by the at least one processor, cause the at least one processor to perform operations including: creating a first set of title prompts by applying a first set of title prompt templates to a seed, where the seed includes a topic descriptor; applying a first generative language model to the first set of title prompts; outputting, by the first generative language model, based on the first set of title prompts, a first set of document titles; creating a first set of document prompts by applying a first set of document prompt templates different from the first set of title prompt templates to the first set of document titles; applying a second generative language model to the first set of document prompts; and outputting, by the second generative language model, based on the first set of document prompts, a first set of documents.

An example 213 includes the subject matter of example 212, where the instructions, when executed by the at least one processor, cause the at least one processor to perform operations further including: generating the seed based on skill set data extracted from a network; and publishing the first set of documents to a network. An example 214 includes the subject matter of example 213, where the instructions, when executed by the at least one processor, cause the at least one processor to perform operations further including: generating an entity graph based on the network, where the entity graph includes a first node that represents a user of the network, a plurality of second nodes that represent skill sets, and a plurality of edges between the plurality of second nodes and the first node; using the entity graph, computing affinity scores between the user and the skill sets; and selecting the seed based on the computed affinity scores. An example 215 includes the subject matter of any of examples 212-214, where the instructions, when executed by the at least one processor, cause the at least one processor to perform operations further including: selecting a title prompt template based on the first set of document titles; generating a second set of title prompts based on the selected title prompt template; applying the first generative language model to the second set of title prompts; and outputting, by the first generative language model, based on the second set of title prompts, a second set of document titles. An example 216 includes the subject matter of any of examples 212-215, where the instructions, when executed by the at least one processor, cause the at least one processor to perform operations further including: selecting a document prompt template based on the first set of documents; generating a second set of document prompts based on the selected document prompt template; applying the second generative language model to the second set of document prompts; and outputting, by the second generative language model, based on the second set of document prompts, a second set of documents. An example 217 includes the subject matter of any of examples 212-216, where the instructions, when executed by the at least one processor, cause the at least one processor to perform operations further including: selecting the first set of title prompt templates by matching the first set of title prompt templates to the skill set. An example 218 includes the subject matter of any of examples 212-217, where the instructions, when executed by the at least one processor, cause the at least one processor to perform operations further including: receiving input on the first set of document titles from a network, where the input is generated by at least one user of the network; generating a second set of title prompts based on the received input; and applying the first generative language model to the second set of title prompts. An example 219 includes the subject matter of any of examples 212-218, where the instructions, when executed by the at least one processor, cause the at least one processor to perform operations further including: creating a query description based on the seed; sending the query description to a search engine optimization system; receiving, from the search engine optimization system, search engine optimization data including a set of frequently-used search terms related to the query description and generating the first set of title prompts based on the search engine optimization data. An example 220 includes the subject matter of any of examples 212-219, where a document prompt of the first set of document prompts includes a first segment prompt and a second segment prompt different from the first segment prompt, the first segment prompt includes a first document title of the first set of document titles and a segment prompt template, and the second segment prompt includes a second document title of the first set of document titles and the segment prompt template.

In an example 301, a method includes: generating a first version of a first document that includes digital content output by a generative language model; generating a second version of the first document by dividing the first version of the first document into a plurality of segments, where a first segment of the plurality of segments includes a subset of the digital content generated by the generative language model; enabling contributions to the first segment by linking a first user input graphical user interface (GUI) control element with a first segment of the plurality of segments; enabling contributions to a second segment of the plurality of segments by linking a second user input GUI control element with the second segment; publishing the second version of the first document to a network; receiving, via the network and the first user input GUI control element, a first contribution to the second version of the first document, where the first contribution includes digital content generated by a first user of the network; creating a first segment-contribution pair by linking the first contribution with the first segment; receiving, via the network and the second user input GUI control element, a second contribution to the second version of the first document, where the second contribution includes digital content generated by the first user or a second user of the network; and creating a second segment-contribution pair by linking the second contribution with the second segment, where at least one of the first segment-contribution pair or the second segment-contribution pair is capable of being used to generate, by the generative language model, a second document.

An example 302 includes the subject matter of example 301, further including: generating a prompt for the generative language model based on the at least one of the first segment-contribution pair or the second segment-contribution pair. An example 303 includes the subject matter of example 301 or example 302, further including: generating a third version of the first document including the second version of the first document and at least of the first contribution or the second contribution; and publishing the third version of the first document to the network. An example 304 includes the subject matter of any of examples 301-303, further including: linking a third user input GUI control element with the first contribution; and receiving, via the network and the third user input GUI control element, first social action data relating to the first contribution. An example 305 includes the subject matter of any of examples 301-304, further including: linking a first GUI position with the first segment; receiving, via the network, social action data relating to the first contribution; and based on the social action data, assigning the first contribution to the first GUI position. An example 306 includes the subject matter of any of examples 301-305, further including: receiving, via the network, social action data relating to the first contribution; and based on the social action data, generating, by the generative language model, a first version of a second document, where the first version of the second document is based on at least one of the first segment or the first contribution. An example 307 includes the subject matter of any of examples 301-306, further including: receiving, via the network, social action data relating to the first contribution; based on the social action data, generating training data, where the training data is based on the first segment-contribution pair; and training the generative language model based on the training data. An example 308 includes the subject matter of any of examples 301-307, further including: receiving, via the network, social action data relating to the first contribution; and based on the social action data, linking a badge with the first user. An example 309 includes the subject matter of any of examples 301-308, further including: receiving, via the network, social action data relating to at least one of the first contribution or the second contribution; and assigning the plurality of segments to GUI positions based on the social action data. An example 310 includes the subject matter of any of examples 301-309, further including: identifying the plurality of segments by searching the first version of the first document for header text. An example 311 includes the subject matter of any of examples 301-310, further including: identifying header text in the first version of the first document; identifying, in the first version of the first document, digital content related to the header text; and creating a segment including the header text and the identified digital content related to the header text. An example 312 includes the subject matter of any of examples 301-311, further including: retrieving, from at least one data store, skill set data associated with the first user; and linking the retrieved skill set data with the first contribution.

In an example 313, a system includes: at least one processor; and at least one memory coupled to the at least one processor; where the at least one memory includes instructions which, when executed by the at least one processor, cause the at least one processor to perform operations including: generating, by a generative language model, a first version of a first document, where the first version of the first document includes digital content output by a generative language model; generating a second version of the first document by dividing the first version of the first document into a plurality of segments, where a first segment of the plurality of segments includes a subset of the digital content generated by the generative language model; enabling contributions to the first segment by linking a first user input graphical user interface (GUI) control element with a first segment of the plurality of segments; enabling contributions to a second segment of the plurality of segments by linking a second user input GUI control element with the second segment; publishing the second version of the first document to a network; receiving, via the network and the first user input GUI control element, a first contribution, where the first contribution includes digital content generated by a first user of the network; creating a first segment-contribution pair by linking the first contribution with the first segment; receiving, via the network and the second user input GUI control element, a second contribution, where the second contribution includes digital content generated by the first user or a second user of the network; and creating a second segment-contribution pair by linking the second contribution with the second segment, where at least one of the first segment-contribution pair or the second segment-contribution pair is capable of being used to generate, by the generative language model, a second document.

An example 314 includes the subject matter of example 313, where the instructions, when executed by the at least one processor, cause the at least one processor to perform operations further including: generating a prompt for the generative language model based on the at least one of the first segment-contribution pair or the second segment-contribution pair. An example 315 includes the subject matter of example 313 or example 314, where the instructions, when executed by the at least one processor, cause the at least one processor to perform operations further including: linking a first GUI position with the first segment; receiving, via the network, social action data relating to the first contribution; and based on the social action data, assigning the first contribution to the first GUI position. An example 316 includes the subject matter of any of examples 313-315, where the instructions, when executed by the at least one processor, cause the at least one processor to perform operations further including: receiving, via the network, social action data relating to the first contribution; and based on the social action data, generating, by the generative language model, a first version of a second document, where the first version of the second document is based on at least one of the first segment or the first contribution. An example 317 includes the subject matter of any of examples 313-316, where the instructions, when executed by the at least one processor, cause the at least one processor to perform operations further including: receiving, via the network, social action data relating to the first contribution; based on the social action data, generating training data, where the training data is based on the first segment-contribution pair; and training the generative language model based on the training data. An example 318 includes the subject matter of any of examples 313-317, where the instructions, when executed by the at least one processor, cause the at least one processor to perform operations further including: receiving, via the network, social action data relating to at least one of the first contribution or the second contribution; and assigning the plurality of segments to GUI positions based on the social action data. An example 319 includes the subject matter of any of examples 313-318, where the instructions, when executed by the at least one processor, cause the at least one processor to perform operations further including: identifying header text in the first version of the first document; identifying, in the first version of the first document, digital content related to the header text; and creating a segment including the header text and the identified digital content related to the header text. An example 320 includes the subject matter of any of examples 313-319, where the instructions, when executed by the at least one processor, cause the at least one processor to perform operations further including: retrieving, from at least one data store, skill set data associated with the first user; and linking the retrieved skill set data with the first contribution.

In an example 401, a method includes: identifying a user of a network as a possible contributor of digital content to a document that is published via the network; identifying at least two different channels on the network that are each capable of sending, to the user, an invitation for the user to contribute to the document; for each of the at least two different channels, determining respective channel usage data, where the channel usage data includes, for a channel of the at least two different channels, historical data relating to use of the channel by the user to interact with content; for each of the at least two different channels, computing respective channel affinity scores based on the respective channel usage data, where a channel affinity score includes, for a channel of the at least two different channels, an estimate of a likelihood of the user contributing to the document through the channel; based on the respective channel affinity scores, selecting an optimal channel from the at least two different channels; and sending the invitation to the user through the optimal channel.

An example 402 includes the subject matter of example 401, further including: generating, by a generative language model, the document; and receiving, via the network, a contribution to the document, where the contribution is generated by the user in response to the invitation. An example 403 includes the subject matter of example 401 or example 402, further including: receiving, via the network, a contribution to the document, where the contribution is generated by the user in response to the invitation sent through the optimal channel; updating the channel usage data based on the receiving of the contribution in response to the invitation sent through the optimal channel; and recomputing the respective channel affinity scores based on the updated channel usage data. An example 404 includes the subject matter of any of examples 401-403, further including: receiving, via the network, a contribution to the document, where the contribution is generated by the user through a channel selected by the user; updating the channel usage data based on the channel selected by the user to generate the contribution; and recomputing the respective channel affinity scores based on the updated channel usage data. An example 405 includes the subject matter of any of examples 401-404, further including: determining content generation data including historical data about generation, by the user, of content relating to a topic associated with the document; based on the content generation data, computing a contributor score for the user, where the contributor score includes an estimate of a likelihood of the user contributing content associated with the topic to the document; and based on the contributor score, selecting the user from a plurality of users of the network. An example 406 includes the subject matter of any of examples 401-405, further including: determining social action data including historical data about digital social actions received by the network in response to publication, by the user, via the network, of content relating to a topic associated with the document; based on the social action data, computing a contributor score for the user, where the contributor score includes an estimate of a likelihood of a contribution to the document, by the user, receiving digital social actions; and based on the contributor score, selecting the user from a plurality of users of the network. An example 407 includes the subject matter of any of examples 401-406, further including: searching entity profile data published on the network for a badge; in response to determining that entity profile data associated with the user includes the badge, selecting the user from a plurality of users of the network. An example 408 includes the subject matter of any of examples 401-407, further including: generating document topic to skill set mappings; and based on the document topic to skill set mappings, selecting the user from a plurality of users of the network. An example 409 includes the subject matter of examples 401-408, further including: extracting document topic data from documents output by a generative language model; extracting skill set data from entity profiles published on the network; and generating the document topic to skill set mappings based on the document topic data and the skill set data. An example 410 includes the subject matter of any of examples 401-409, further including: publishing the document to the network; receiving, via the network, a digital social action associated with the published document; based on the received digital social action, identifying a second user as a possible contributor to the document; and sending, to the second user, an invitation to join a waitlist to contribute to the document. An example 411 includes the subject matter of any of examples 401-410, further including: receiving, via the network, interaction data between the user and the document, where the interaction data is generated by the user in response to the invitation; determining attribute data associated with the interaction data, where the attribute data includes skill set data; and based on the attribute data associated with the interaction data, computing a contributor score for the user, where the contributor score includes an estimate of a likelihood of the user contributing content associated with the skill set data to output of a generative language model.

In an example 412, a system includes: at least one processor; and at least one memory coupled to the at least one processor; where the at least one memory includes instructions which, when executed by the at least one processor, cause the at least one processor to perform operations including: identifying a user of a network as a possible contributor of digital content to a document that is published via the network; identifying at least two different channels on the network that are each capable of sending, to the user, an invitation for the user to contribute to the document; for each of the at least two different channels, determining respective channel usage data, where the channel usage data includes, for a channel of the at least two different channels, historical data relating to use of the channel by the user to interact with content; for each of the at least two different channels, computing respective channel affinity scores based on the respective channel usage data, where a channel affinity score includes, for a channel of the at least two different channels, an estimate of a likelihood of the user contributing to the document through the channel; based on the respective channel affinity scores, selecting an optimal channel from the at least two different channels; and sending the invitation to the user through the optimal channel.

An example 413 includes the subject matter of example 412, where the instructions, when executed by the at least one processor, cause the at least one processor to perform operations further including: generating, by a generative language model, the document; and receiving, via the network, a contribution to the document, where the contribution is generated by the user in response to the invitation. An example 414 includes the subject matter of example 412 or example 413, where the instructions, when executed by the at least one processor, cause the at least one processor to perform operations further including: receiving, via the network, a contribution to the document, where the contribution is generated by the user in response to the invitation sent through the optimal channel; updating the channel usage data based on the receiving of the contribution in response to the invitation sent through the optimal channel; and recomputing the respective channel affinity scores based on the updated channel usage data. An example 415 includes the subject matter of any of examples 412-414, where the instructions, when executed by the at least one processor, cause the at least one processor to perform operations further including: receiving, via the network, a contribution to the document, where the contribution is generated by the user through a channel selected by the user; updating the channel usage data based on the channel selected by the user to generate the contribution; and recomputing the respective channel affinity scores based on the updated channel usage data. An example 416 includes the subject matter of any of examples 412-415, where the instructions, when executed by the at least one processor, cause the at least one processor to perform operations further including: determining content generation data including historical data about generation, by the user, of content relating to a topic associated with the document; based on the content generation data, computing a contributor score for the user, where the contributor score includes an estimate of a likelihood of the user contributing content associated with the topic to the document; and based on the contributor score, selecting the user from a plurality of users of the network. An example 417 includes the subject matter of any of examples 412-416, where the instructions, when executed by the at least one processor, cause the at least one processor to perform operations further including: determining social action data including historical data about digital social actions received by the network in response to publication, by the user, via the network, of content relating to a topic associated with the document; based on the social action data, computing a contributor score for the user, where the contributor score includes an estimate of a likelihood of a contribution to the document, by the user, receiving digital social actions; and based on the contributor score, selecting the user from a plurality of users of the network. An example 418 includes the subject matter of any of examples 412-417, where the instructions, when executed by the at least one processor, cause the at least one processor to perform operations further including: generating document topic to skill set mappings; based on the document topic to skill set mappings, selecting the user from a plurality of users of the network; extracting document topic data from documents output by a generative language model; extracting skill set data from entity profiles published on the network; and generating the document topic to skill set mappings based on the document topic data and the skill set data. An example 419 includes the subject matter of any of examples 412-418, where the instructions, when executed by the at least one processor, cause the at least one processor to perform operations further including: publishing the document to the network; receiving, via the network, a digital social action associated with the published document; based on the received digital social action, identifying a second user as a possible contributor to the document; and sending, to the second user, an invitation to join a waitlist to contribute to the document. An example 420 includes the subject matter of any of examples 412-419, where the instructions, when executed by the at least one processor, cause the at least one processor to perform operations further including: receiving, via the network, interaction data between the user and the document, where the interaction data is generated by the user in response to the invitation; determining attribute data associated with the interaction data, where the attribute data includes skill set data; and based on the attribute data associated with the interaction data, computing a contributor score for the user, where the contributor score includes an estimate of a likelihood of the user contributing content associated with the skill set data to output of a generative language model.

In an example 501, a method includes applying a generative language model to a first prompt; outputting, by the generative language model, in response to the first prompt, a first plurality of document packages, where a document package of the first plurality of document packages includes at least one of a document, a summary of the document, or a notification about the document, and where the at least one of the document, the summary of the document, or the notification about the document includes a first piece of writing generated by the generative language model in response to the first prompt; publishing the first plurality of document packages to a network; receiving, from the network, a first contribution to the first piece of writing, where the first contribution includes a second piece of writing generated by a first user of the network; generating, based on the first contribution, a second prompt different from the first prompt; applying the generative language model to the second prompt; and outputting, by the generative language model, in response to the second prompt, a second plurality of document packages different from the first plurality of document packages.

An example 502 includes the subject matter of example 501, where the first prompt includes a first seed, the first seed includes a document topic, the second prompt includes a second seed different from the first seed, and the method further includes: determining the second seed based on the first contribution. An example 503 includes the subject matter of example 502, where the first seed includes a first document title and the second seed includes a second document title different from the first document title. An example 504 includes the subject matter of any of examples 501-503, where the first prompt includes a first prompt template, the first prompt template includes at least one of a first instruction or a first example, the second prompt includes a second prompt template different from the first prompt template, the second prompt template includes at least one of a second instruction or a second example, and the method further includes: determining the at least one of the second instruction or the second example based on the first contribution. An example 505 includes the subject matter of any of examples 501-504, where the second prompt includes a seed and a second prompt template, the second prompt template includes a prefix, a placeholder for the seed, and a suffix, and the method further includes at least one of: including at least some of the first piece of writing in the prefix; including at least some of the first contribution in the seed; or including at least one of a new instruction or a new example in the suffix, where the at least one of the new instruction or the new example is based on a difference between the first piece of writing and the first contribution. An example 506 includes the subject matter of any of examples 501-505, where the second prompt includes a second prompt template, and the method further includes: scoring a plurality of prompt templates based on the first contribution; and selecting the second prompt template based on the scored plurality of prompt templates. An example 507 includes the subject matter of any of examples 501-506, further including: generating a difference between the first contribution received from the network and the first piece of writing generated by the generative language model in response to the first prompt; and generating the second prompt based on the difference between the first contribution received from the network and the first piece of writing generated by the generative language model in response to the first prompt. An example 508 includes the subject matter of any of examples 501-507, further including: receiving, from the network, at least one second contribution to the first piece of writing; generating a first contribution score including a first measurement of digital social action linked to the first contribution; generating, for a second contribution of the at least one second contribution, a second contribution score including a second measurement of digital social action linked to the second contribution; and selecting the first contribution based on a comparison of the first contribution score to the second contribution score. An example 509 includes the subject matter of any of examples 501-508, further including: receiving, from the network, at least one second contribution to the first piece of writing, where the at least one second contribution is generated by at least one second user of the network; generating a first contributor score including at least one of a first measurement of network activity associated with the first user or a first measurement of similarity between attribute data associated with the first user and metadata associated with the first piece of writing; generating, for a second contribution of the at least one second contribution, a second contributor score including at least one of a second measurement of network activity associated with the second user or a second measurement of similarity between attribute data associated with the second user and metadata associated with the first piece of writing; and selecting the first contribution based on a comparison of the first contributor score to the second contributor score. An example 510 includes the subject matter of any of examples 501-509, further including: generating training data based on the first prompt and the first contribution; and training at least one of the first generative language model or the second generative language model based on the training data. An example 511 includes the subject matter of any of examples 501-510, further including: applying a pre-publication filter to the first piece of writing, where the pre-publication filter includes at least one machine learning model trained to detect at least one particular type of content; generating, by the pre-publication filter, in response to the first piece of writing, at least one filter output; and generating the second prompt based on the at least one filter output. An example 512 includes the subject matter of any of examples 501-511, further including: sending the first piece of writing to a pre-publication editing tool; receiving, from the pre-publication editing tool, at least one of an edit or a rating, where the at least one of the edit or the rating is generated by a user of the pre-publication editing tool; and generating the second prompt based on the at least one of the edit or the rating. A system includes: at least one processor; and at least one memory coupled to the at least one processor; where the at least one memory includes instructions that, when executed by the at least one processor, cause the at least one processor to perform operations including any of the above examples. A non-transitory computer readable medium includes at least one memory capable of being coupled to at least one processor; where the at least one memory includes instructions that, when executed by the at least one processor, cause the at least one processor to perform operations including any of the above examples.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
in response to input of a first prompt to a generative language model, outputting, by the generative language model, a first document comprising a first piece of writing, wherein the first piece of writing is based on the first prompt;
receiving feedback for the first document, wherein the feedback comprises a rating for the first piece of writing;
outputting, by the generative language model, a second prompt different from the first prompt, wherein the second prompt is based on the received feedback;
in response to input of the second prompt to the generative language model, outputting a second document different from the first document, wherein the second document comprises a second piece of writing based on the second prompt; and
publishing the second document to a network.

2. The method of claim 1, wherein publishing the second document to the network comprises publishing the second piece of writing instead of the first piece of writing.

3. The method of claim 1, wherein receiving the feedback comprises receiving a rating value instead of an edit to the first document.

4. The method of claim 1, further comprising:
receiving, from the network, a contribution to the second piece of writing, wherein a user of the network creates the contribution.

5. The method of claim 4, further comprising:
outputting, by the generative language model, a third prompt different from the first prompt and the second prompt, wherein the third prompt is based on the received contribution.

6. The method of claim 4, further comprising:
outputting, by the generative language model, a third document comprising a third piece of writing, wherein the third piece of writing is based on the received contribution.

7. The method of claim 1, wherein the first prompt comprises a first document topic, and the method further comprises:
based on the feedback, determining a second document topic different from the first document topic; and
generating the second prompt based on the second document topic.

8. The method of claim 1, wherein the first document comprises at least one first metadata item output by the generative language model in response to the first prompt, the at least one first metadata item comprises at least one of a first document title, a first summary, a first message text, or a first query description, and the method further comprises:
based on the feedback, outputting, by the generative language model, in response to the second prompt, at least one second metadata item different from the at least one first metadata item.

9. The method of claim 1, wherein the second prompt comprises a seed and a second prompt template, the second prompt template comprises a prefix, a placeholder for the seed, and a suffix, and the method further comprises at least one of:
including at least one of the first piece of writing or the feedback in the prefix;
modifying the seed based on the feedback; or
including at least one of a new instruction or a new example in the suffix, wherein the at least one of the new instruction or the new example is based on the feedback.

10. The method of claim 1, wherein the second prompt comprises a second prompt template, and the method further comprises:
scoring a plurality of possible prompt templates based on the feedback; and
selecting the second prompt template from the scored plurality of possible prompt templates.

11. The method of claim 1, further comprising:
generating training data based on the feedback; and
training the generative language model based on the generated training data.

12. The method of claim 1, further comprising:
applying a pre-publication filter to the first piece of writing, wherein the pre-publication filter comprises at least one machine learning model trained to at least one of classify or score digital content;
receiving, from the pre-publication filter, for the first piece of writing, at least one of a classification or a score; and receiving the feedback in response to at least one of the received classification satisfying a classification criterion or the received score satisfying a score criterion.

13. The method of claim 1, further comprising:
sending the first piece of writing to a pre-publication editing tool;
receiving the feedback from the pre-publication editing tool, wherein the feedback is generated by a user of the pre-publication editing tool.

14. A system comprising:
at least one processor; and
at least one memory coupled to the at least one processor;
wherein the at least one memory comprises instructions which, when executed by the at least one processor, cause the at least one processor to perform operations comprising:
in response to input of a first prompt to a generative language model, outputting, by the generative language model, a first document comprising a first piece of writing, wherein the first piece of writing is based on the first prompt;
receiving feedback for the first document, wherein the feedback comprises a rating for the first piece of writing;
outputting, by the generative language model, a second prompt different from the first prompt, wherein the second prompt is based on the feedback;
in response to input of the second prompt to the generative language model, outputting a second document different from the first document, wherein the second document comprises a second piece of writing based on the second prompt; and
publishing the second document to a network.

15. The system of claim 14, wherein the instructions, when executed by the at least one processor, cause the at least one processor to perform operations further comprising:
publishing the second piece of writing instead of the first piece of writing.

16. The system of claim 14, wherein the instructions, when executed by the at least one processor, cause the at least one processor to perform operations further comprising:
receiving a rating value instead of an edit to the first document.

17. The system of claim 14, wherein the first prompt comprises a first document topic, and the instructions, when executed by the at least one processor, cause the at least one processor to perform operations further comprising:
based on the feedback, determining a second document topic different from the first document topic; and
generating the second prompt based on the second document topic.

18. The system of claim 14, wherein the first document comprises at least one first metadata item output by the generative language model in response to the first prompt, the at least one first metadata item comprises at least one of a first document title, a first summary, a first message text, or a first query description, and the instructions, when executed by the at least one processor, cause the at least one processor to perform operations further comprising:
based on the feedback, outputting, by the generative language model, in response to the second prompt, at least one second metadata item different from the at least one first metadata item.

19. The system of claim 14, wherein the second prompt comprises a seed and a second prompt template, the second prompt template comprises a prefix, a placeholder for the seed, and a suffix, and the instructions, when executed by the at least one processor, cause the at least one processor to perform operations further comprising at least one of:
including at least one of the first piece of writing or the feedback in the prefix;
modifying the seed based on the feedback; or
including at least one of a new instruction or a new example in the suffix, wherein the at least one of the new instruction or the new example is based on the feedback.

20. The system of claim 14, wherein the second prompt comprises a second prompt template, and the instructions, when executed by the at least one processor, cause the at least one processor to perform operations further comprising:
scoring a plurality of possible prompt templates based on the feedback; and
selecting the second prompt template from the scored plurality of possible prompt templates.

* * * * *